March 31, 1936.  F. CAMPOS  2,035,590
CALCULATING MACHINE
Filed Feb. 2, 1931  57 Sheets-Sheet 4

Inventor
Francisco Campos
By his Attorney
H. A. Sparks

March 31, 1936.  F. CAMPOS  2,035,590
CALCULATING MACHINE
Filed Feb. 2, 1931   57 Sheets-Sheet 5
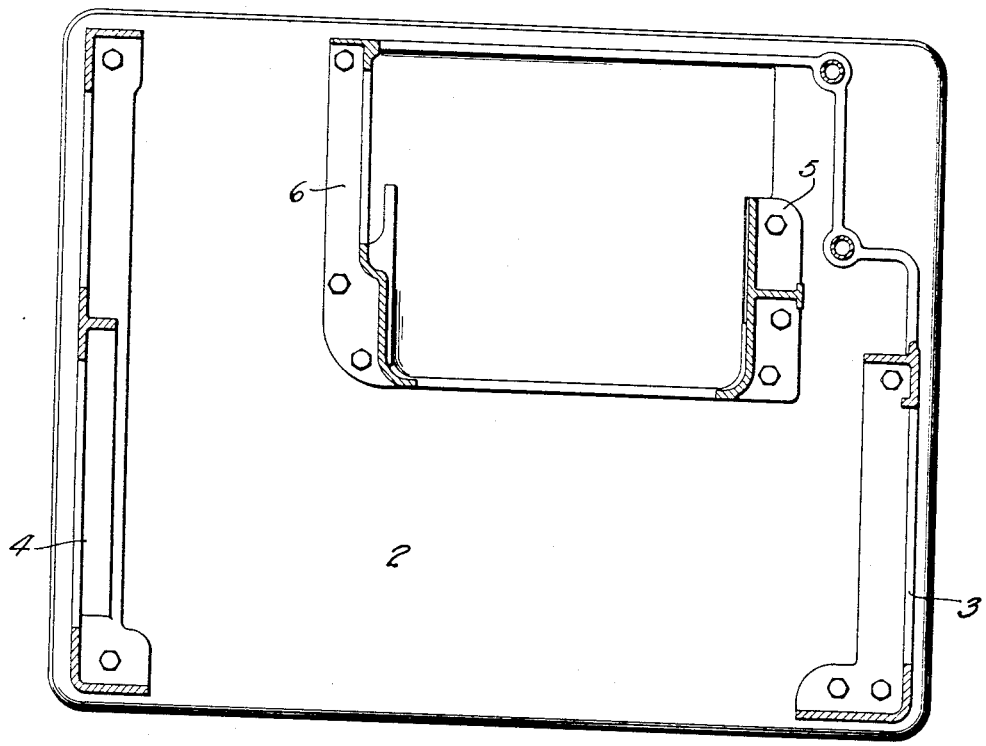
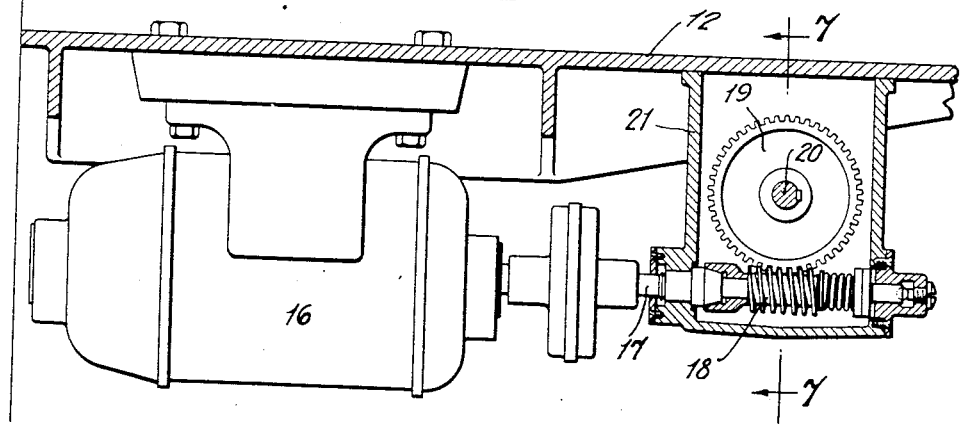
Inventor
Francisco Campos
By his Attorney
H. A. Sparks March 31, 1936. F. CAMPOS 2,035,590
CALCULATING MACHINE
Filed Feb. 2, 1931 57 Sheets-Sheet 6

Inventor
Francisco Campos
By his Attorney
W. A. Sparks

March 31, 1936.    F. CAMPOS    2,035,590
CALCULATING MACHINE
Filed Feb. 2, 1931    57 Sheets-Sheet 8

Inventor
Francisco Campos
By his Attorney
W. A. Sparks

March 31, 1936.  F. CAMPOS  2,035,590

CALCULATING MACHINE

Filed Feb. 2, 1931  57 Sheets-Sheet 11

Inventor
Francisco Campos
By his Attorney
H. A. Sparks

March 31, 1936.  F. CAMPOS  2,035,590

CALCULATING MACHINE

Filed Feb. 2, 1931  57 Sheets-Sheet 12

Inventor
Francisco Campos
By his Attorney
W. A. Sparks

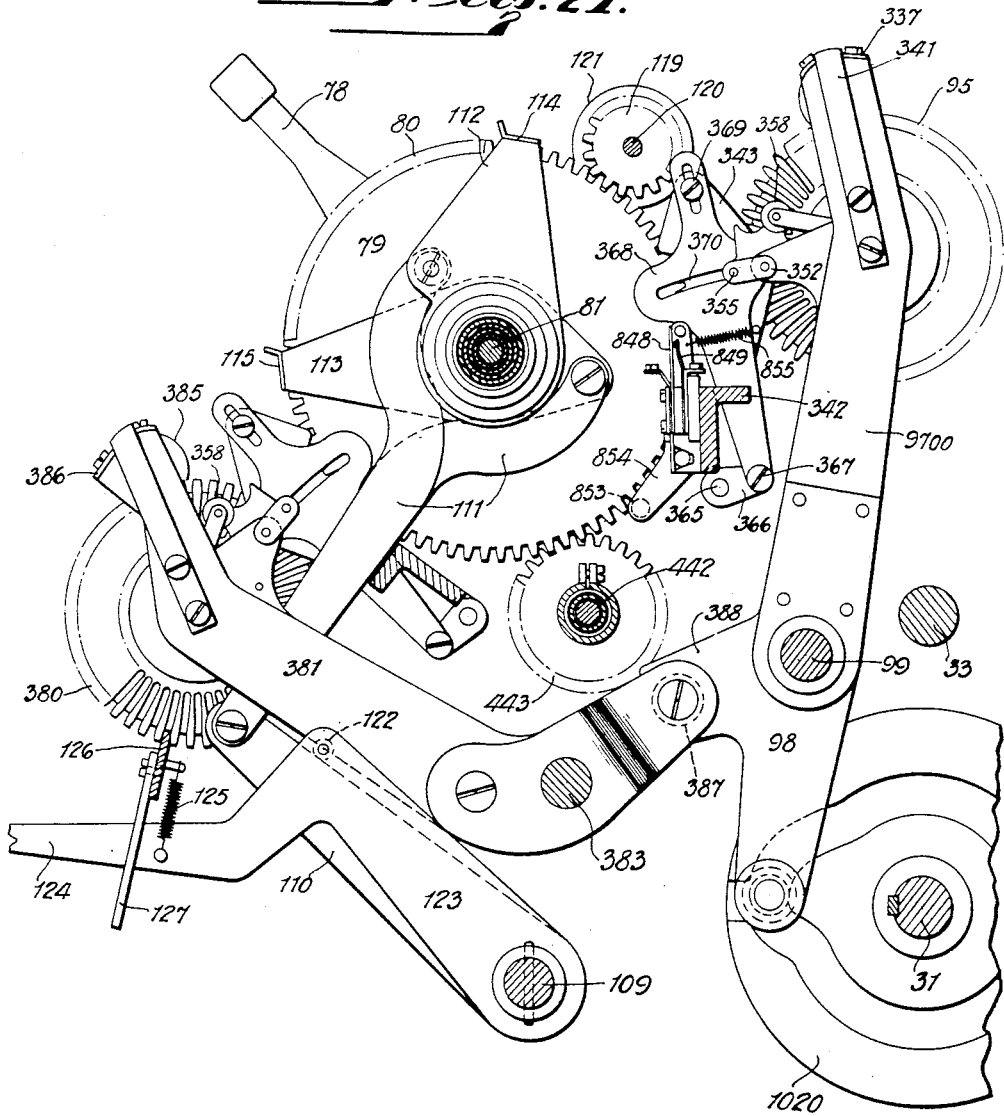

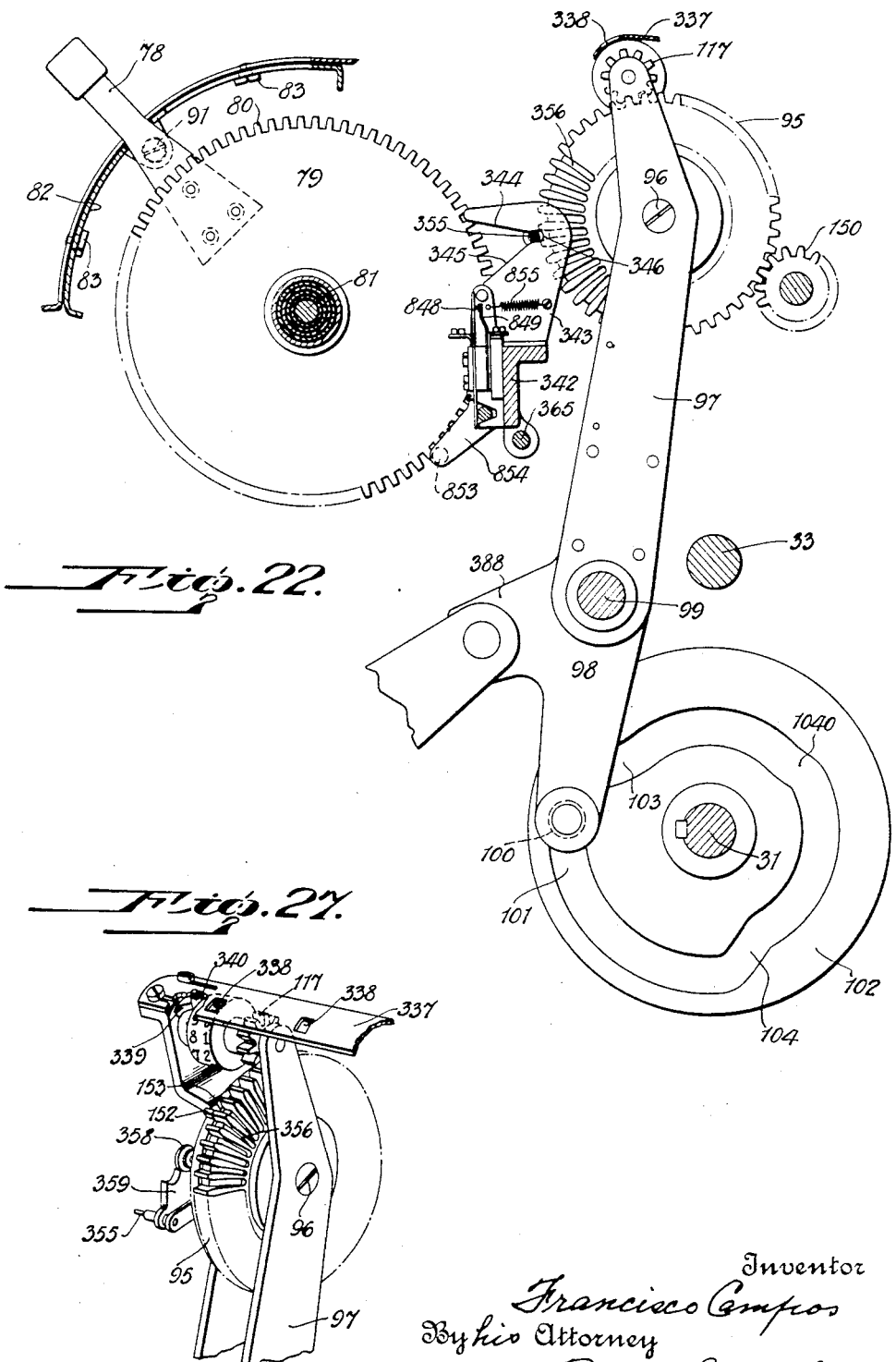

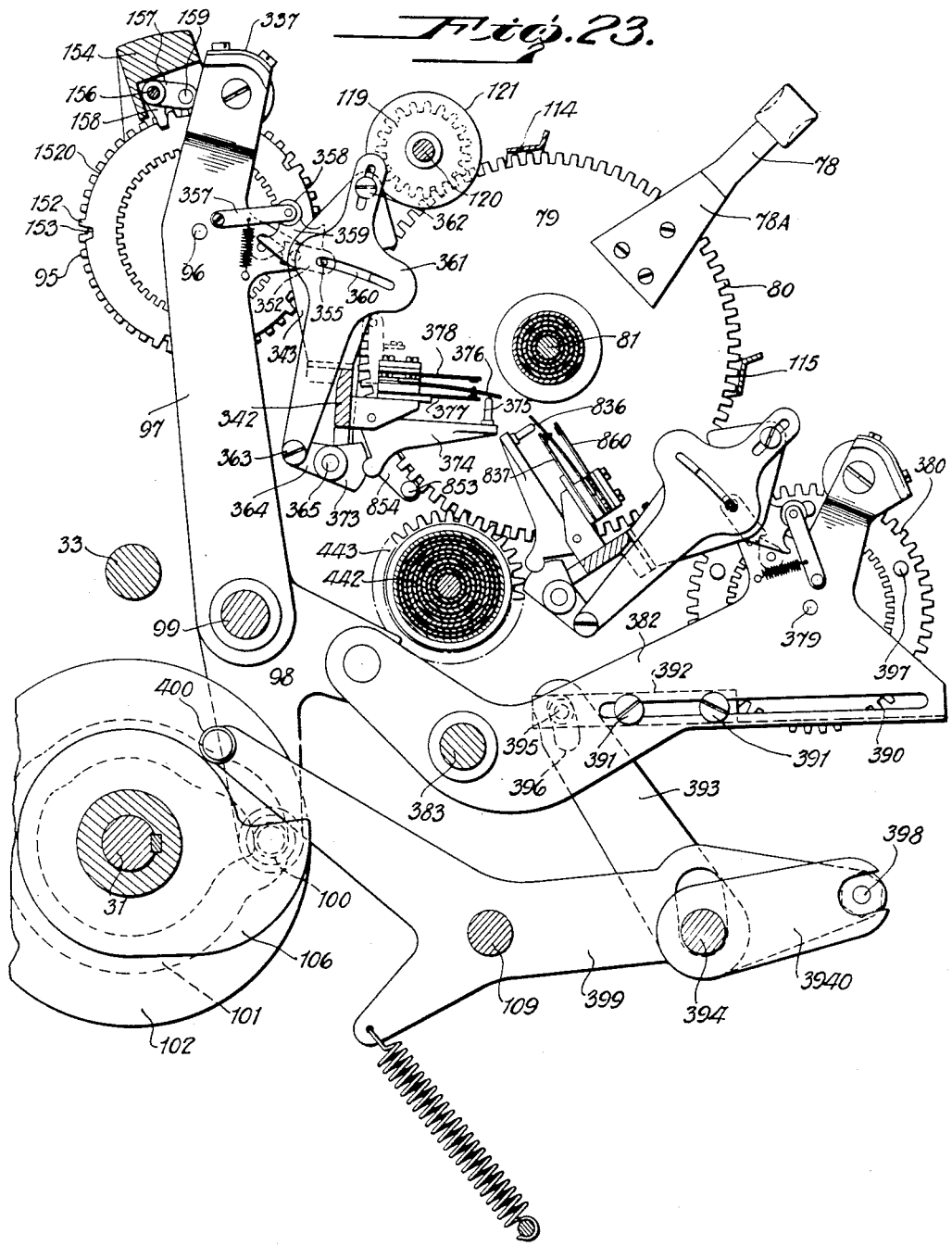

March 31, 1936.        F. CAMPOS        2,035,590
CALCULATING MACHINE
Filed Feb. 2, 1931        57 Sheets-Sheet 16
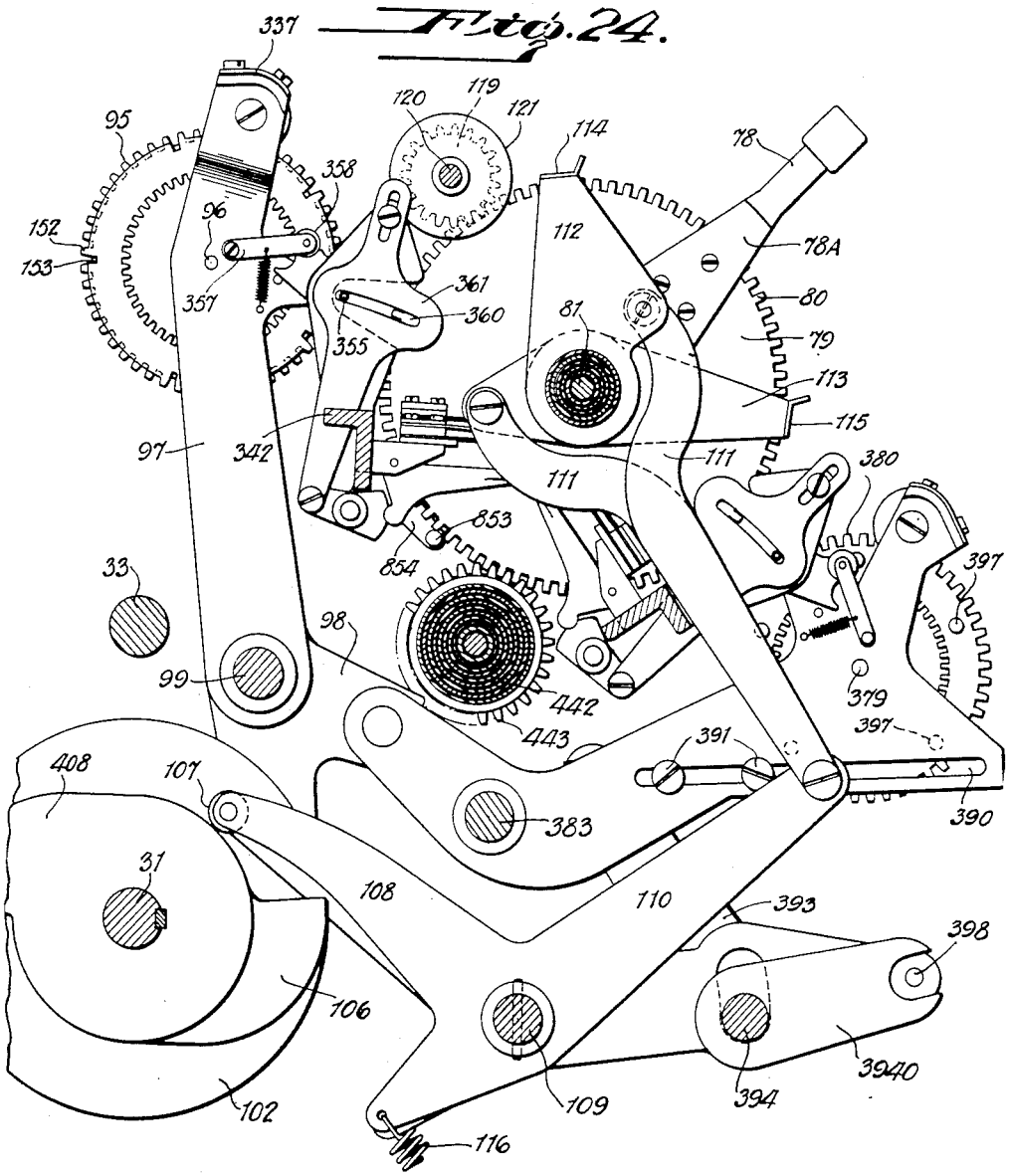
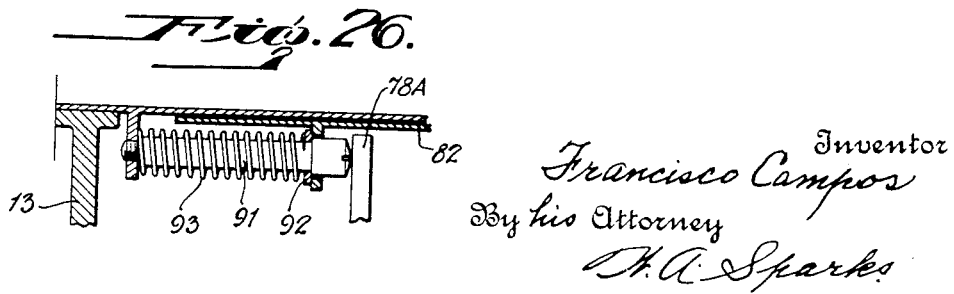
Francisco Campos Inventor
By his Attorney
H. A. Sparks March 31, 1936.  F. CAMPOS  2,035,590

CALCULATING MACHINE

Filed Feb. 2, 1931   57 Sheets-Sheet 17

Inventor
Francisco Campos
By his Attorney
H. A. Sparks

March 31, 1936.　　　F. CAMPOS　　　2,035,590
CALCULATING MACHINE
Filed Feb. 2, 1931　　　57 Sheets-Sheet 18

Inventor
Francisco Campos
By his Attorney
F. A. Sparks

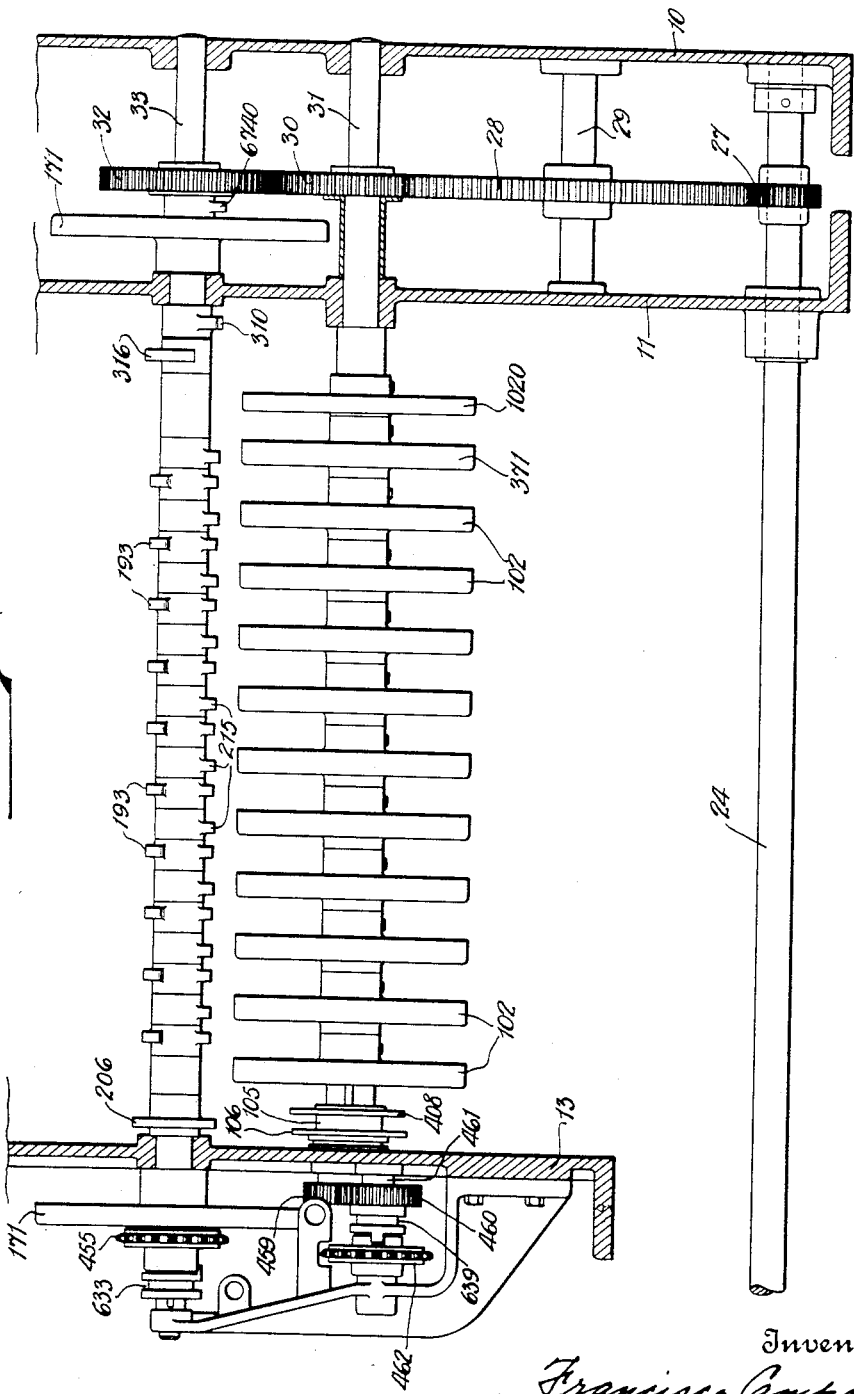

March 31, 1936.  F. CAMPOS  2,035,590
CALCULATING MACHINE
Filed Feb. 2, 1931  57 Sheets-Sheet 20
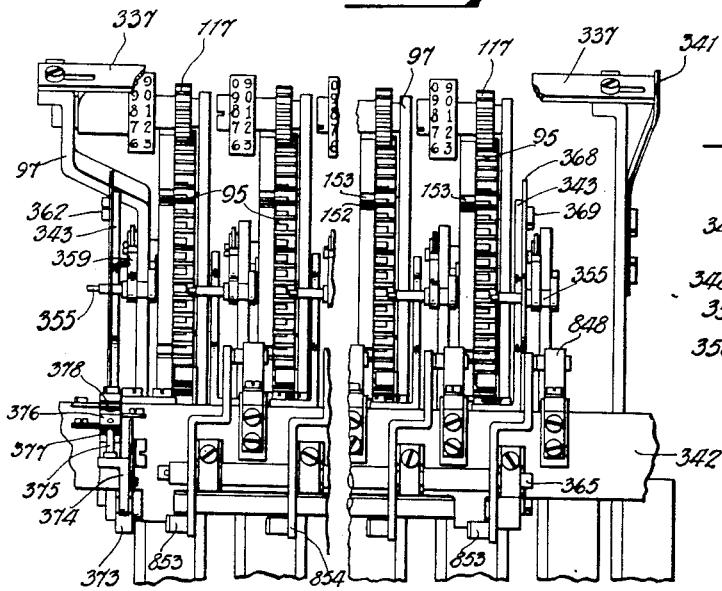
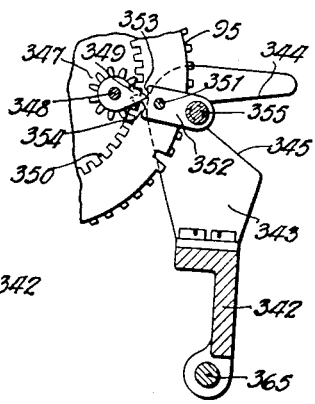
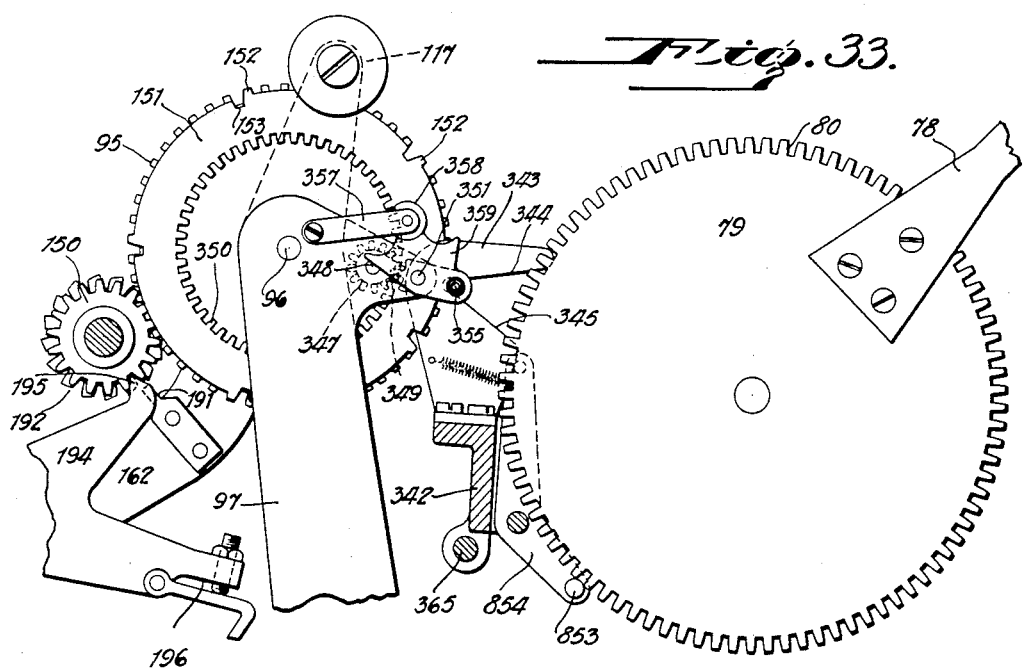
Inventor
Francisco Campos
By his Attorney
H. C. Sparks

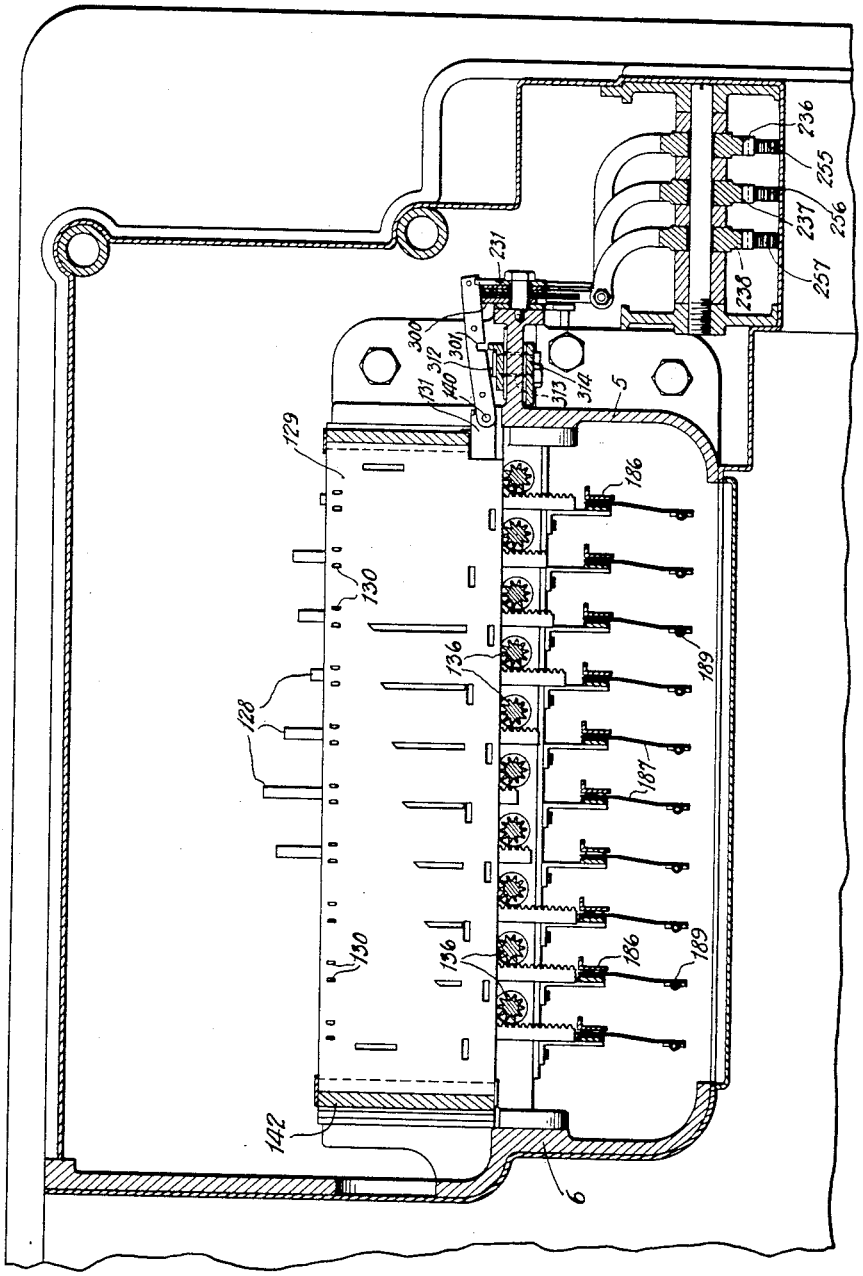

March 31, 1936.   F. CAMPOS   2,035,590
CALCULATING MACHINE
Filed Feb. 2, 1931   57 Sheets-Sheet 22
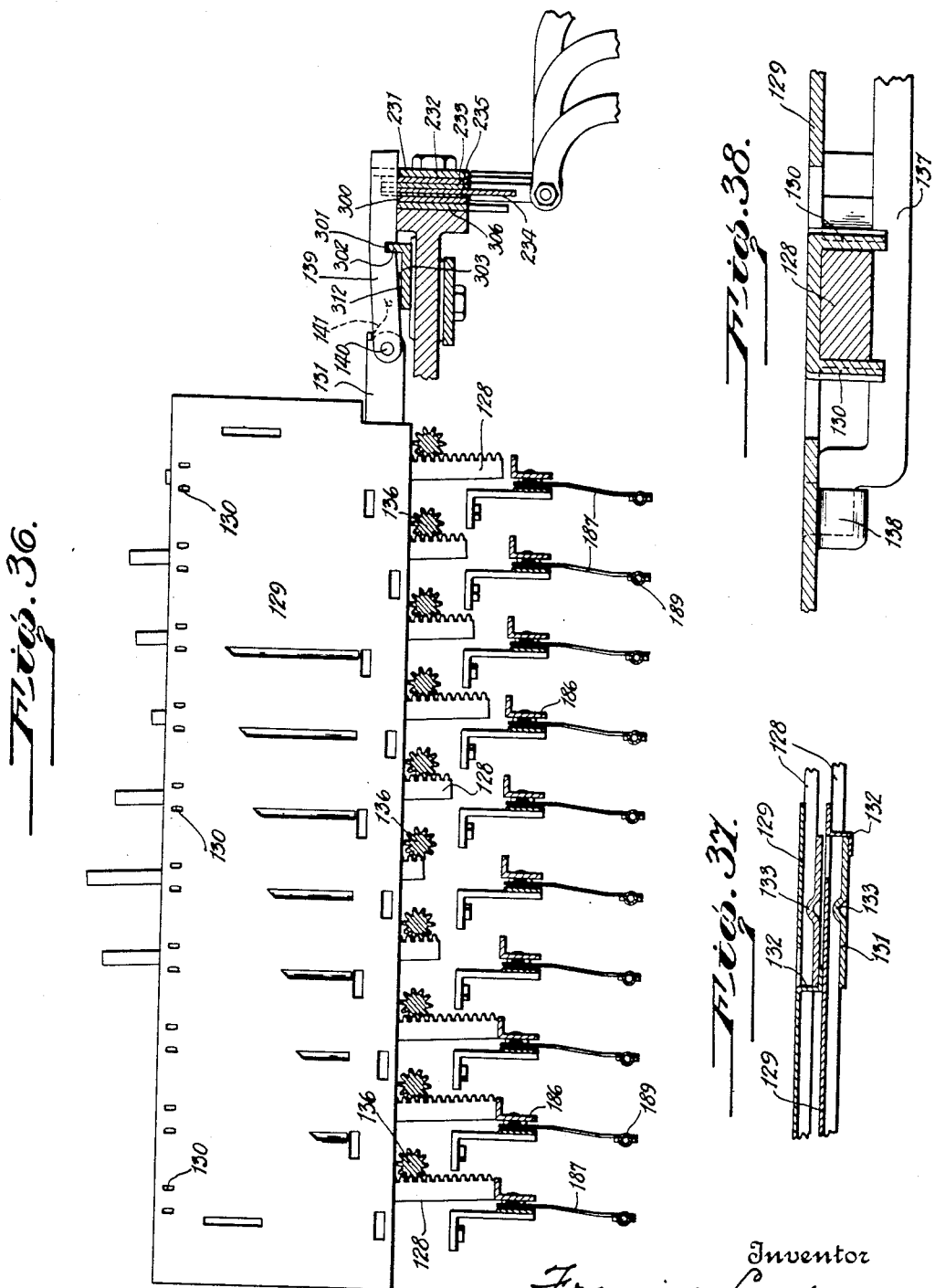
Inventor
Francisco Campos
By his Attorney
H. A. Sparks March 31, 1936.    F. CAMPOS    2,035,590
CALCULATING MACHINE
Filed Feb. 2, 1931    57 Sheets-Sheet 23
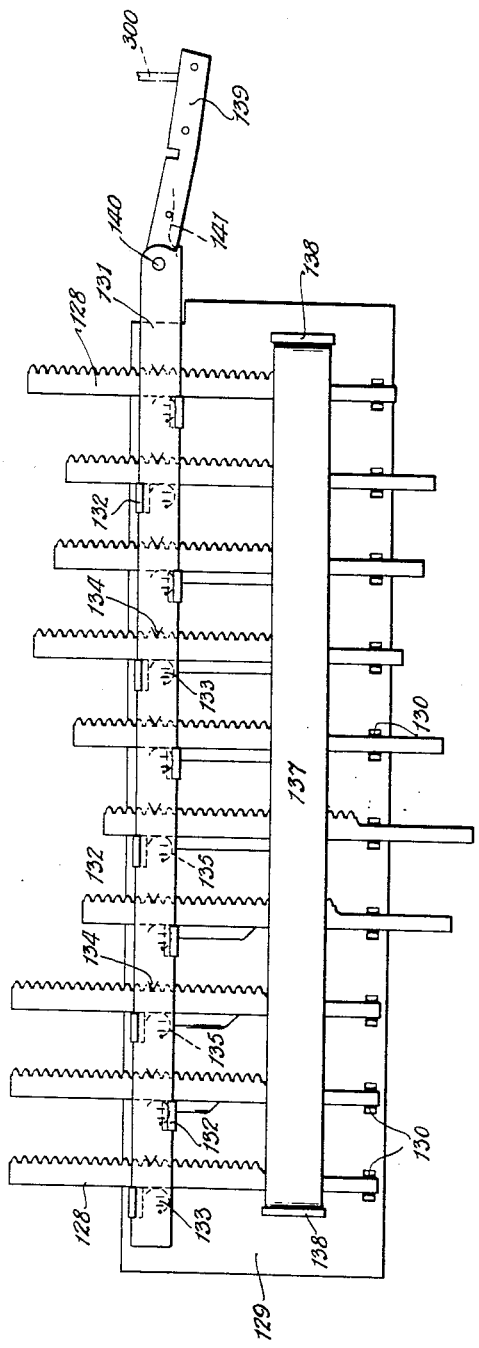
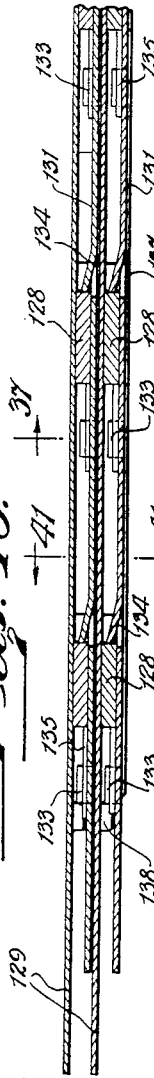
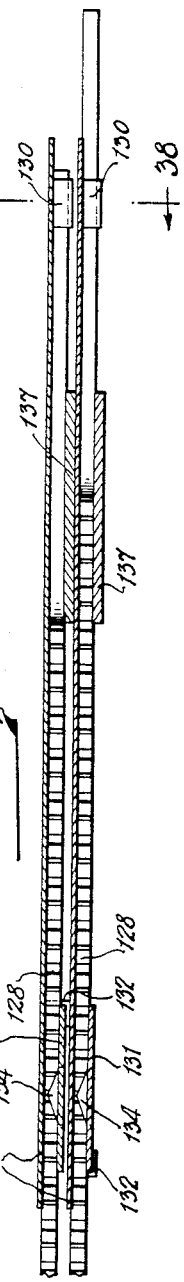
Inventor
Francisco Campos
By his Attorney
W. A. Sparks March 31, 1936. F. CAMPOS 2,035,590
CALCULATING MACHINE
Filed Feb. 2, 1931  57 Sheets-Sheet 24
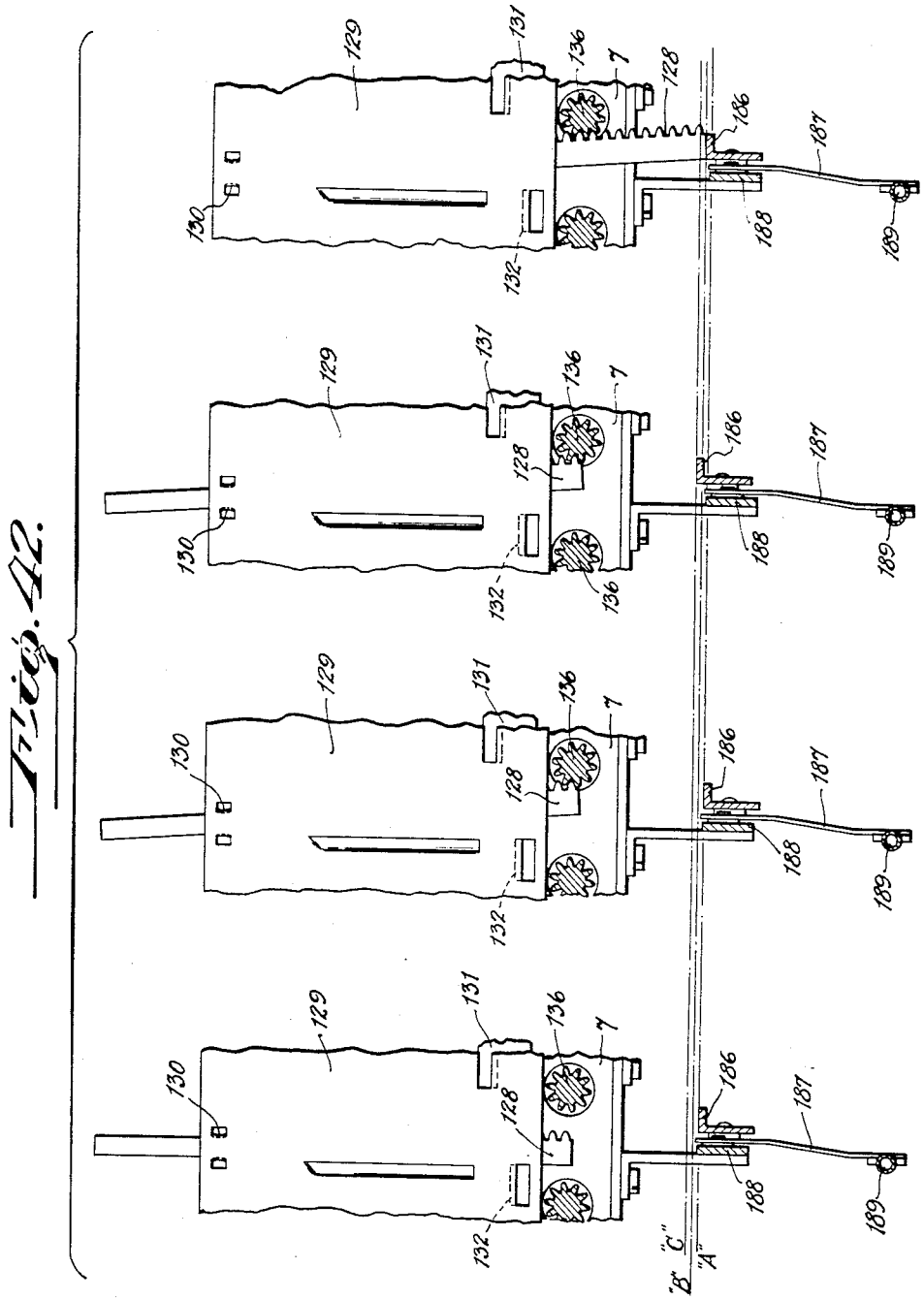
Inventor
Francisco Campos
By his Attorney
W. A. Sparks March 31, 1936.  F. CAMPOS  2,035,590
CALCULATING MACHINE
Filed Feb. 2, 1931  57 Sheets-Sheet 25

Fig. 43.

Inventor
Francisco Campos
By his Attorney
F. A. Sparks

March 31, 1936.  F. CAMPOS  2,035,590
CALCULATING MACHINE
Filed Feb. 2, 1931  57 Sheets-Sheet 25

Inventor
Francisco Campos
By his Attorney
H. A. Sparks

March 31, 1936.                F. CAMPOS                2,035,590
                          CALCULATING MACHINE
                          Filed Feb. 2, 1931            57 Sheets-Sheet 23

Fig. 46.

Inventor
Francisco Campos
By his Attorney
H. A. Sparks

March 31, 1936. F. CAMPOS 2,035,590
CALCULATING MACHINE
Filed Feb. 2, 1931 57 Sheets-Sheet 29

Inventor
Francisco Campos
By his Attorney
F. A. Sparks

March 31, 1936.	F. CAMPOS	2,035,590
CALCULATING MACHINE
Filed Feb. 2, 1931	57 Sheets-Sheet 30
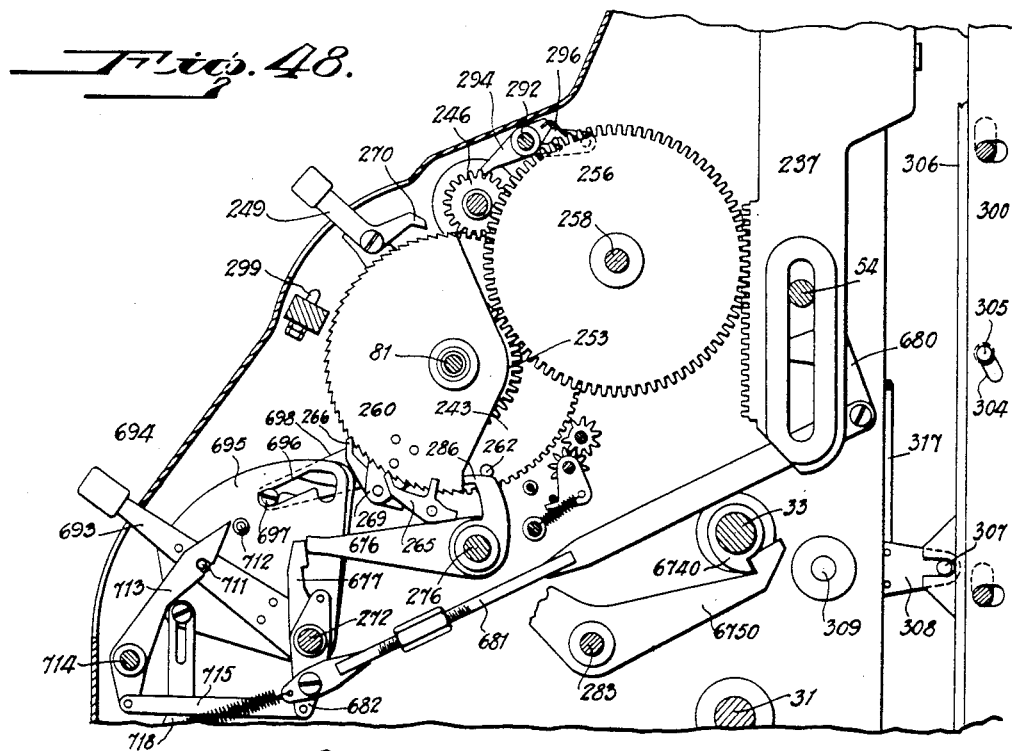
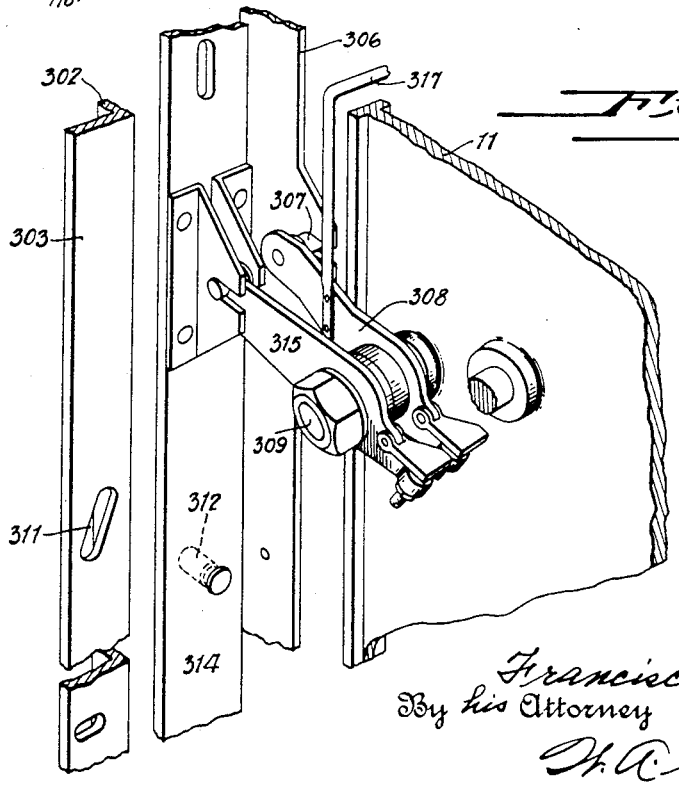
Inventor
Francisco Campos
By his Attorney
F. A. Sparks March 31, 1936.　　　F. CAMPOS　　　2,035,590
CALCULATING MACHINE
Filed Feb. 2, 1931　　　57 Sheets-Sheet 31
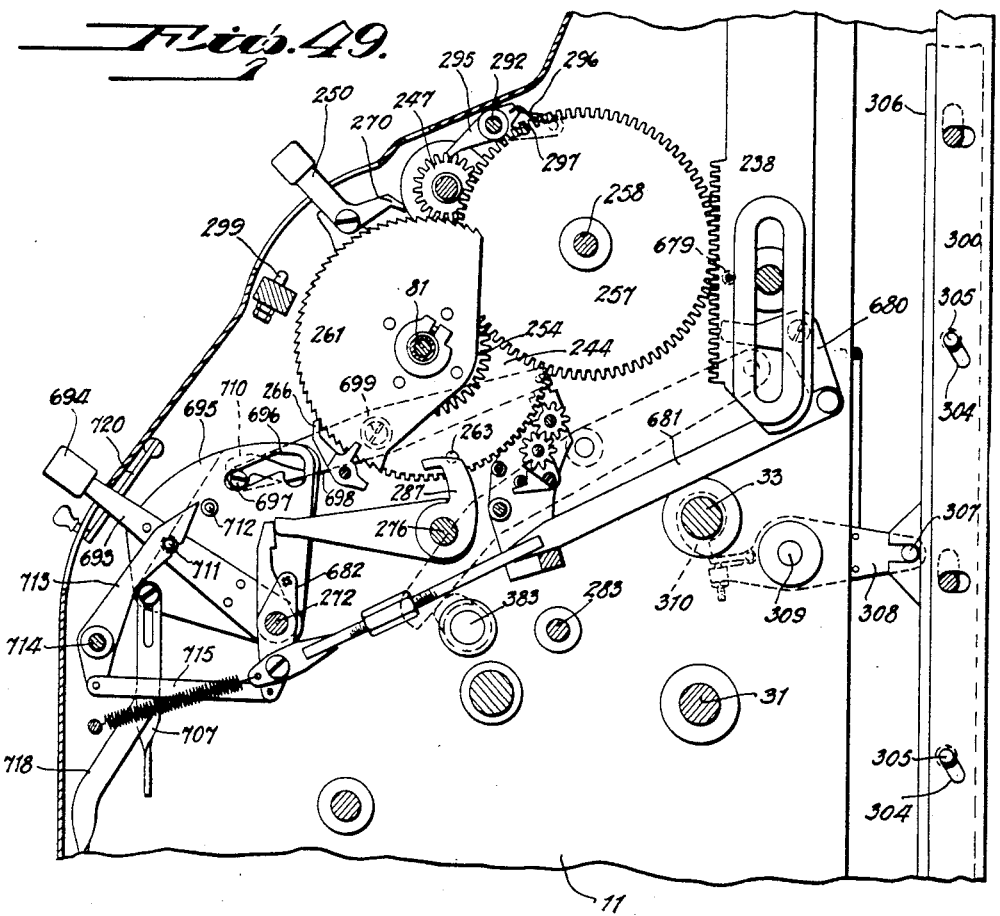
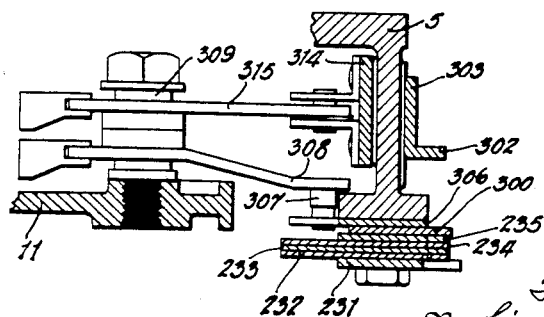
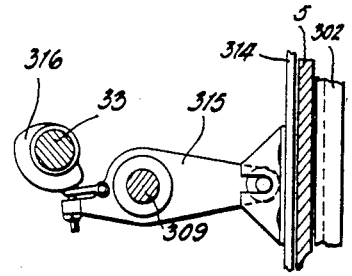
Inventor
Francisco Campos
By his Attorney
W. A. Sparks March 31, 1936. F. CAMPOS 2,035,590
CALCULATING MACHINE
Filed Feb. 2, 1931 57 Sheets-Sheet 32

Inventor
Francisco Campos
By his Attorney
W. A. Sparks

March 31, 1936.                F. CAMPOS                2,035,590
                         CALCULATING MACHINE
                         Filed Feb. 2, 1931            57 Sheets-Sheet 33

Inventor
Francisco Campos
By his Attorney
F. A. Sparks

March 31, 1936.   F. CAMPOS   2,035,590
CALCULATING MACHINE
Filed Feb. 2, 1931   57 Sheets-Sheet 34
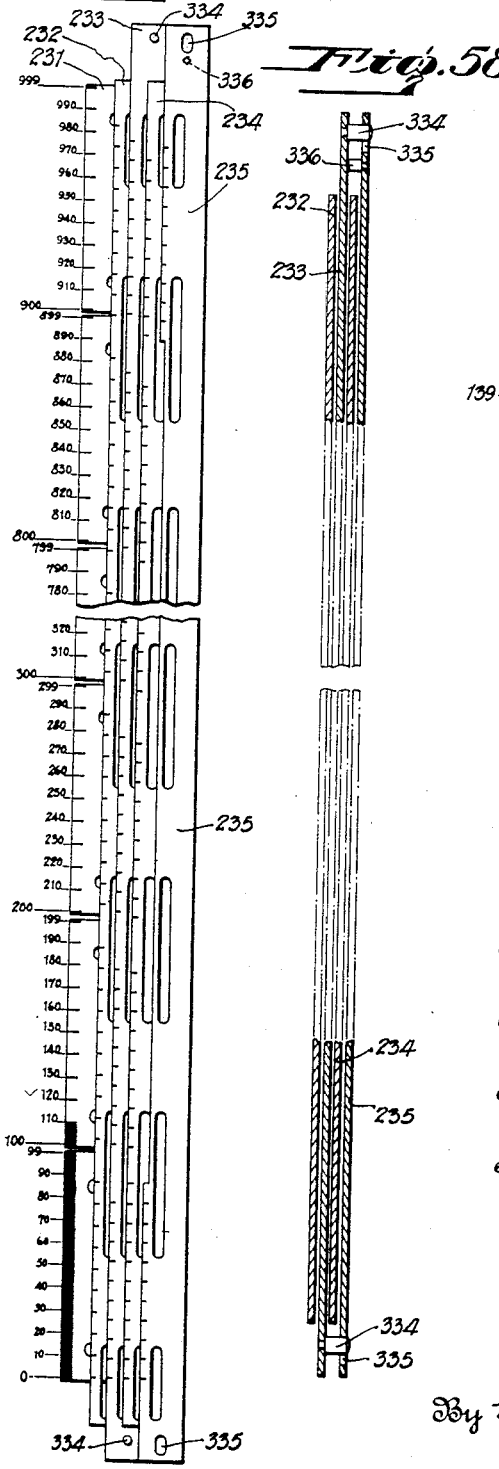
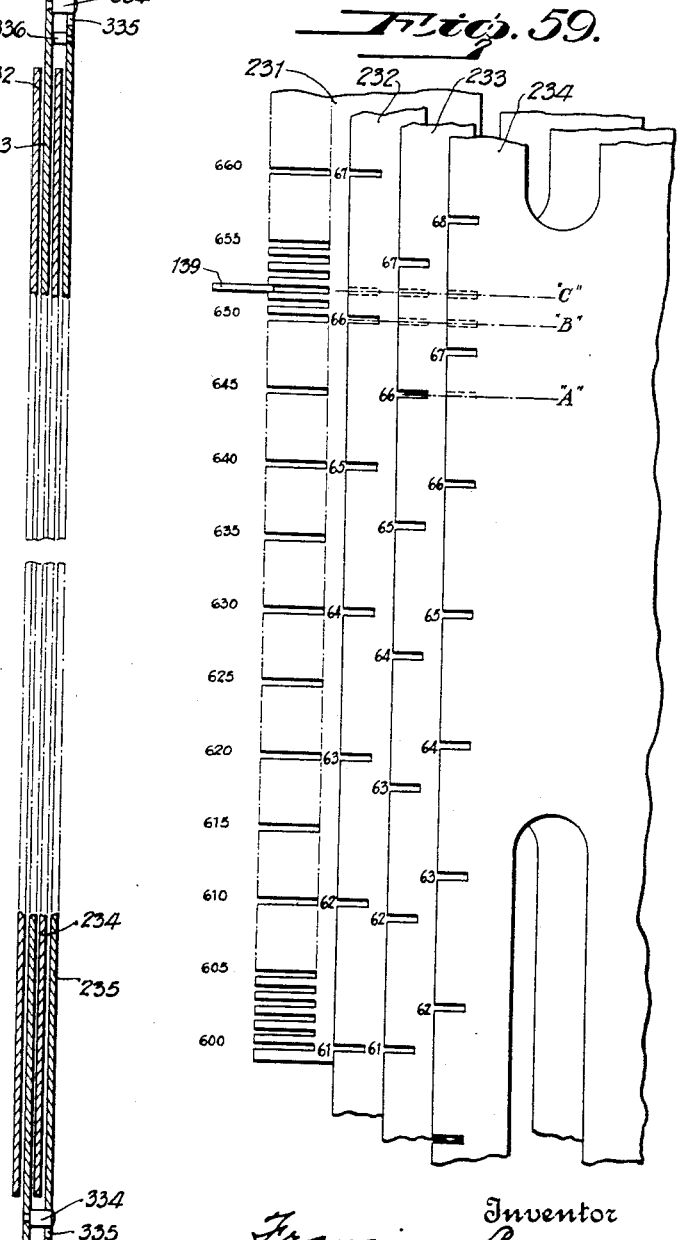
Inventor
Francisco Campos
By his Attorney
H. A. Sparks March 31, 1936.   F. CAMPOS   2,035,590
CALCULATING MACHINE
Filed Feb. 2, 1931   57 Sheets-Sheet 35

Inventor
Francisco Campos
By his Attorney
H. A. Sparks.

March 31, 1936.     F. CAMPOS     2,035,590
CALCULATING MACHINE
Filed Feb. 2, 1931     57 Sheets-Sheet 36

March 31, 1936.	F. CAMPOS	2,035,590
CALCULATING MACHINE
Filed Feb. 2, 1931	57 Sheets-Sheet 43

Francisco Campos, Inventor
By his Attorney H. A. Sparks

March 31, 1936.  F. CAMPOS  2,035,590
CALCULATING MACHINE
Filed Feb. 2, 1931   57 Sheets-Sheet 45

March 31, 1936.  F. CAMPOS  2,035,590
CALCULATING MACHINE
Filed Feb. 2, 1931   57 Sheets-Sheet 46

Francisco Campos Inventor
By his Attorney H. A. Sparks

March 31, 1936.  F. CAMPOS  2,035,590

CALCULATING MACHINE

Filed Feb. 2, 1931   57 Sheets-Sheet 48

Francisco Campos Inventor

By his Attorney H. A. Sparks

March 31, 1936.  F. CAMPOS  2,035,590
CALCULATING MACHINE
Filed Feb. 2, 1931  57 Sheets-Sheet 49

Francisco Campos Inventor
By his Attorney H. A. Sparks

March 31, 1936.  F. CAMPOS  2,035,590
CALCULATING MACHINE
Filed Feb. 2, 1931   57 Sheets-Sheet 50
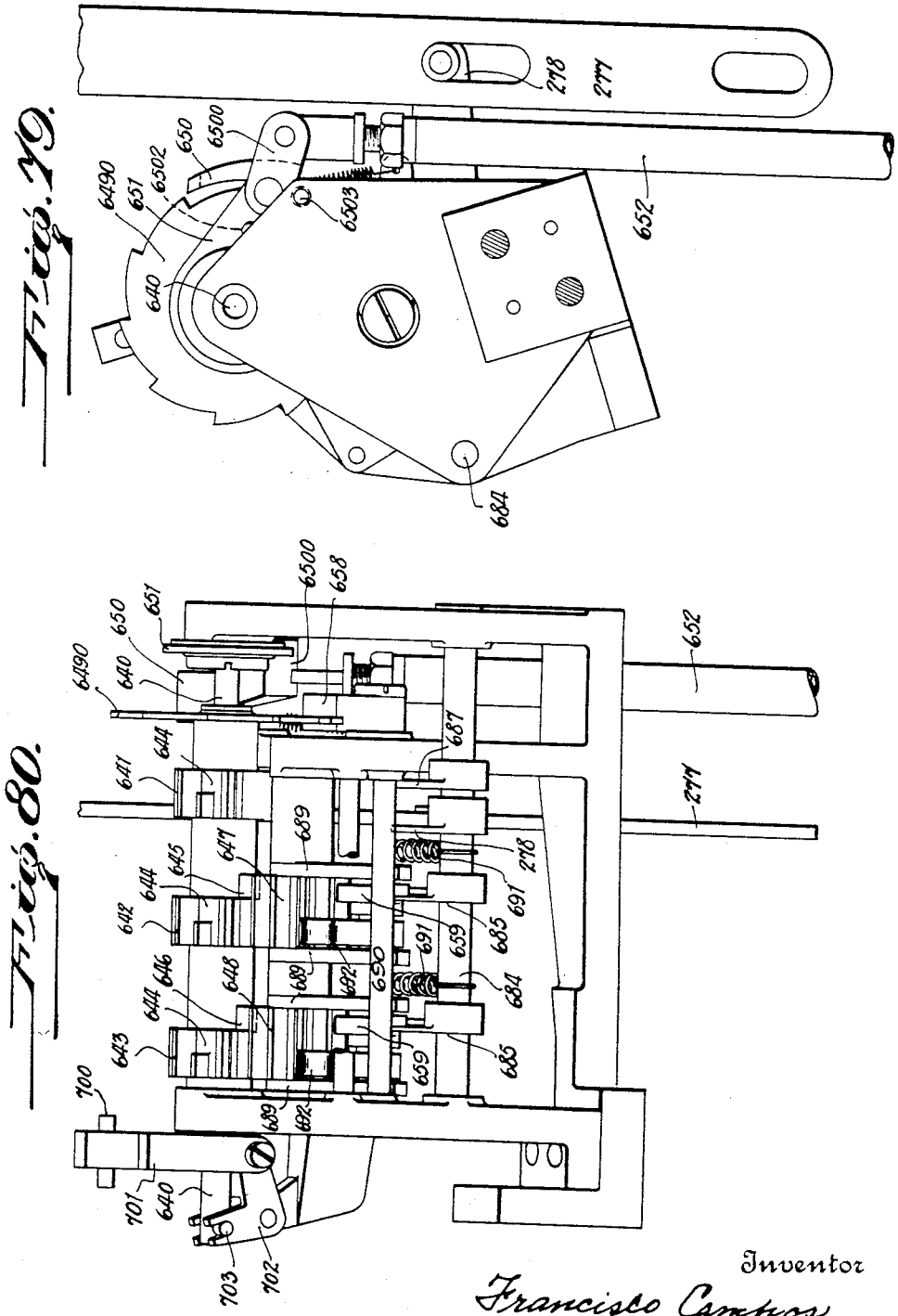
Inventor
Francisco Campos
By his Attorney
H. A. Sparks March 31, 1936.    F. CAMPOS    2,035,590
CALCULATING MACHINE
Filed Feb. 2, 1931    57 Sheets-Sheet 51
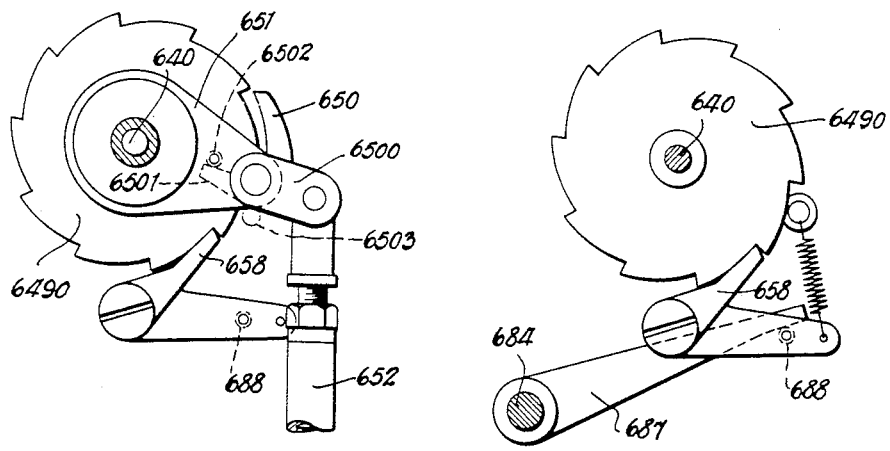
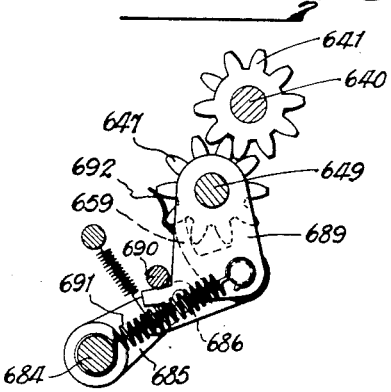
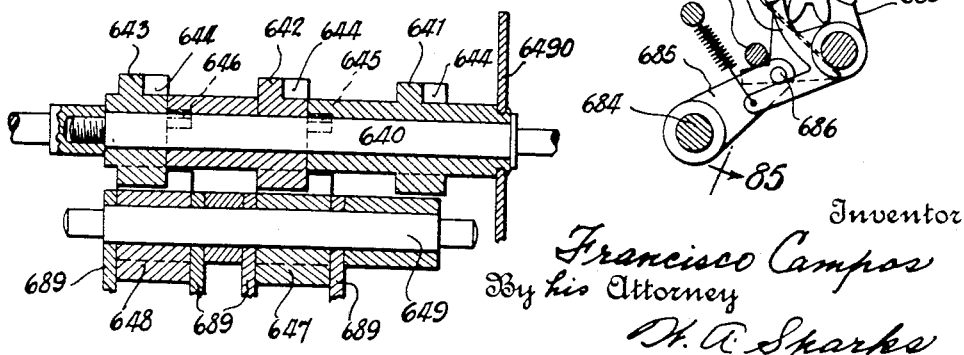
Inventor
Francisco Campos
By his Attorney
H. A. Sparks March 31, 1936.   F. CAMPOS   2,035,590
CALCULATING MACHINE
Filed Feb. 2, 1931   57 Sheets-Sheet 52

Inventor
Francisco Campos
By his Attorney
H. A. Sparks

March 31, 1936. F. CAMPOS 2,035,590
CALCULATING MACHINE
Filed Feb. 2, 1931 57 Sheets-Sheet 53

Francisco Campos Inventor
By his Attorney H. A. Sparks

March 31, 1936.  F. CAMPOS  2,035,590
CALCULATING MACHINE
Filed Feb. 2, 1931   57 Sheets-Sheet 54
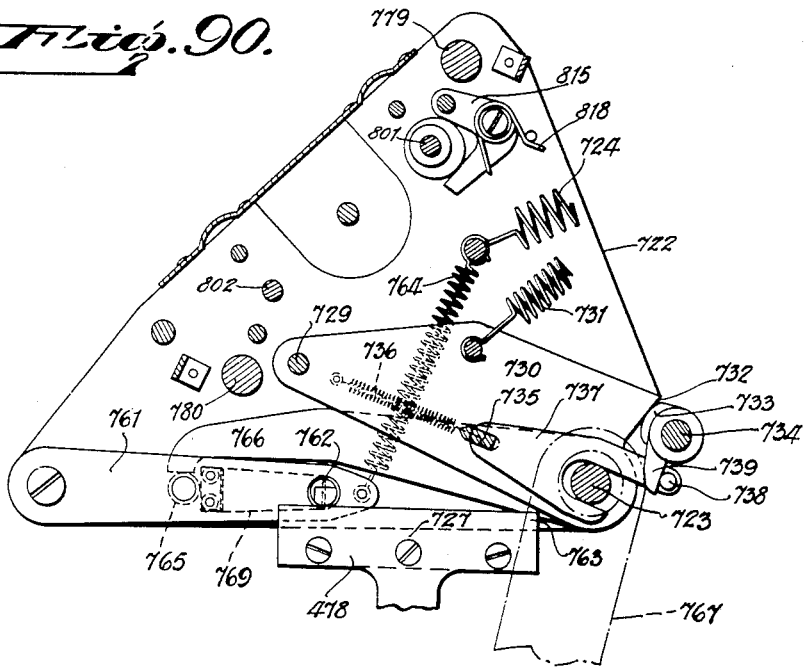
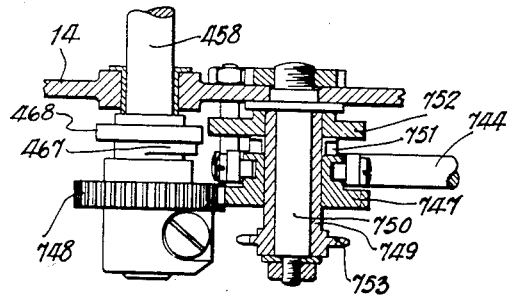
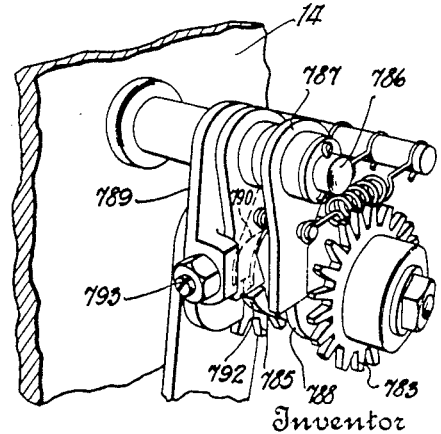
Inventor
Francisco Campos
By his Attorney
H. A. Sparks March 31, 1936.  F. CAMPOS  2,035,590
CALCULATING MACHINE
Filed Feb. 2, 1931   57 Sheets-Sheet 55
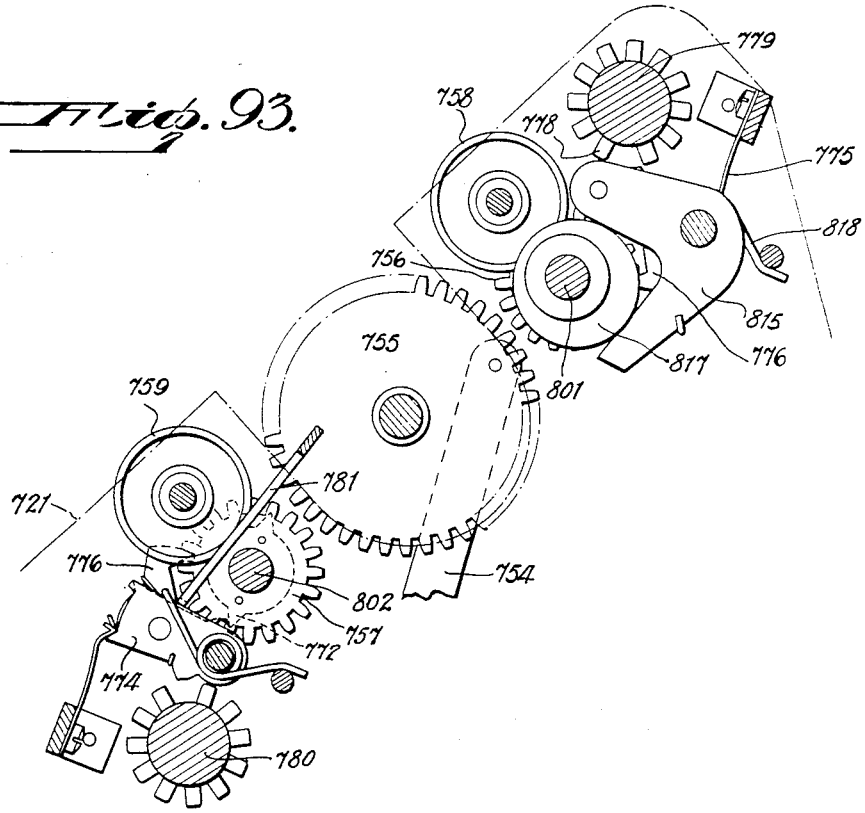
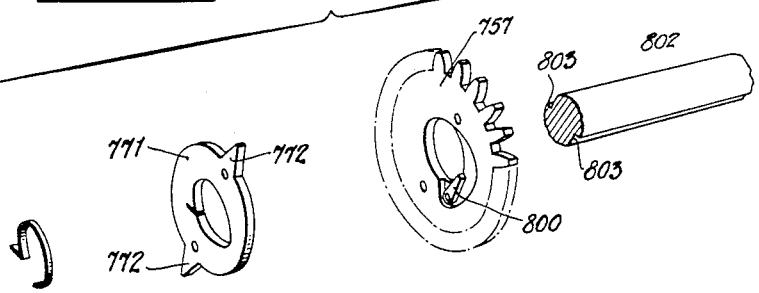
Francisco Campos Inventor
By his Attorney
H. A. Sparks March 31, 1936. F. CAMPOS 2,035,590
CALCULATING MACHINE
Filed Feb. 2, 1931 57 Sheets-Sheet 56

Inventor
Francisco Campos
By his Attorney
W. A. Sparks

March 31, 1936. F. CAMPOS 2,035,590
CALCULATING MACHINE
Filed Feb. 2, 1931 57 Sheets-Sheet 57

Inventor
Francisco Campos
By his Attorney
H. A. Sparks

Patented Mar. 31, 1936

2,035,590

UNITED STATES PATENT OFFICE 2,035,590

CALCULATING MACHINE

Francisco Campos, Croydon, England, assignor to Accounting Machines Ltd., London, England, a corporation of Great Britain Application February 2, 1931, Serial No. 513,010
In Great Britain April 9, 1930

92 Claims. (Cl. 235—60)

This invention relates to automatic book-keeping machines or accounting machines, and one of the objects of the invention is to produce a machine in which a large number of accounts, as many as a thousand or more, may be stored mechanically in a comparatively small amount of space.

Another object of the invention is to produce a device of this nature having account-sets or storage sets in which both positive and negative amounts may be stored according to the exigencies of the business for which the machine is used.

Another object of the invention is to provide manipulative selecting means whereby an account-set may be selected by setting up the number of the account-set on manipulative members.

Another object of the invention is to provide means driven from the power mechanism of the machine for rendering the selected account-set effective.

Another object of the invention is to provide a device wherein double-entry book-keeping may be done automatically, and wherein the entry of an item in one account causes the retention of such item with the opposite sign thus enforcing a double-entry of any item entered in the machine.

Another object of the invention is to produce novel printing mechanism automatically operable to print account numbers, old balances, items entered and new balances; and to print under manual control dates and code indicia.

Another object of the invention is to provide a machine of this nature with means for taking an automatic trial balance.

Another object is to provide totalizing means for separately totalizing the debit and credit items during the automatic taking of a trial balance.

Other objects will appear from the following description and will be particularly pointed out in the appended claims. All of these objects are attained by mechanism shown in the accompanying drawings, in which:

Fig. 5 is a section taken substantially on line 5—5 of Fig. 2, and looking downwardly.

Fig. 6 is a fragmentary vertical section showing the motor drive.

Figure 1:
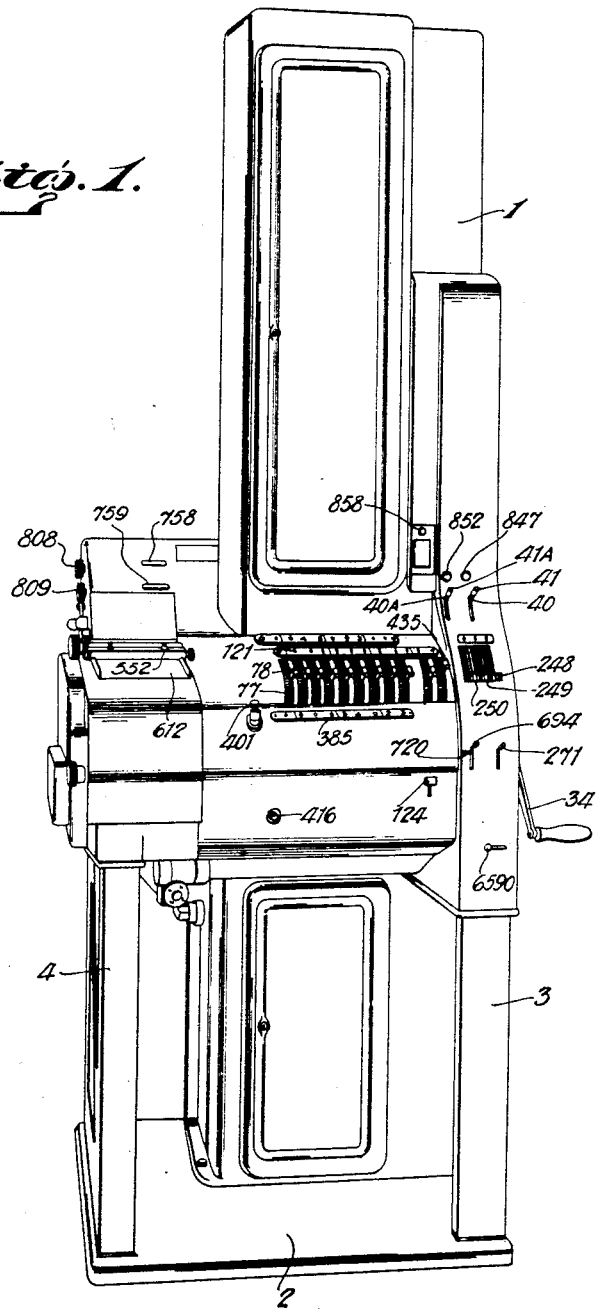
Fig. 1 is a perspective view of the entire machine.
Figure 2:
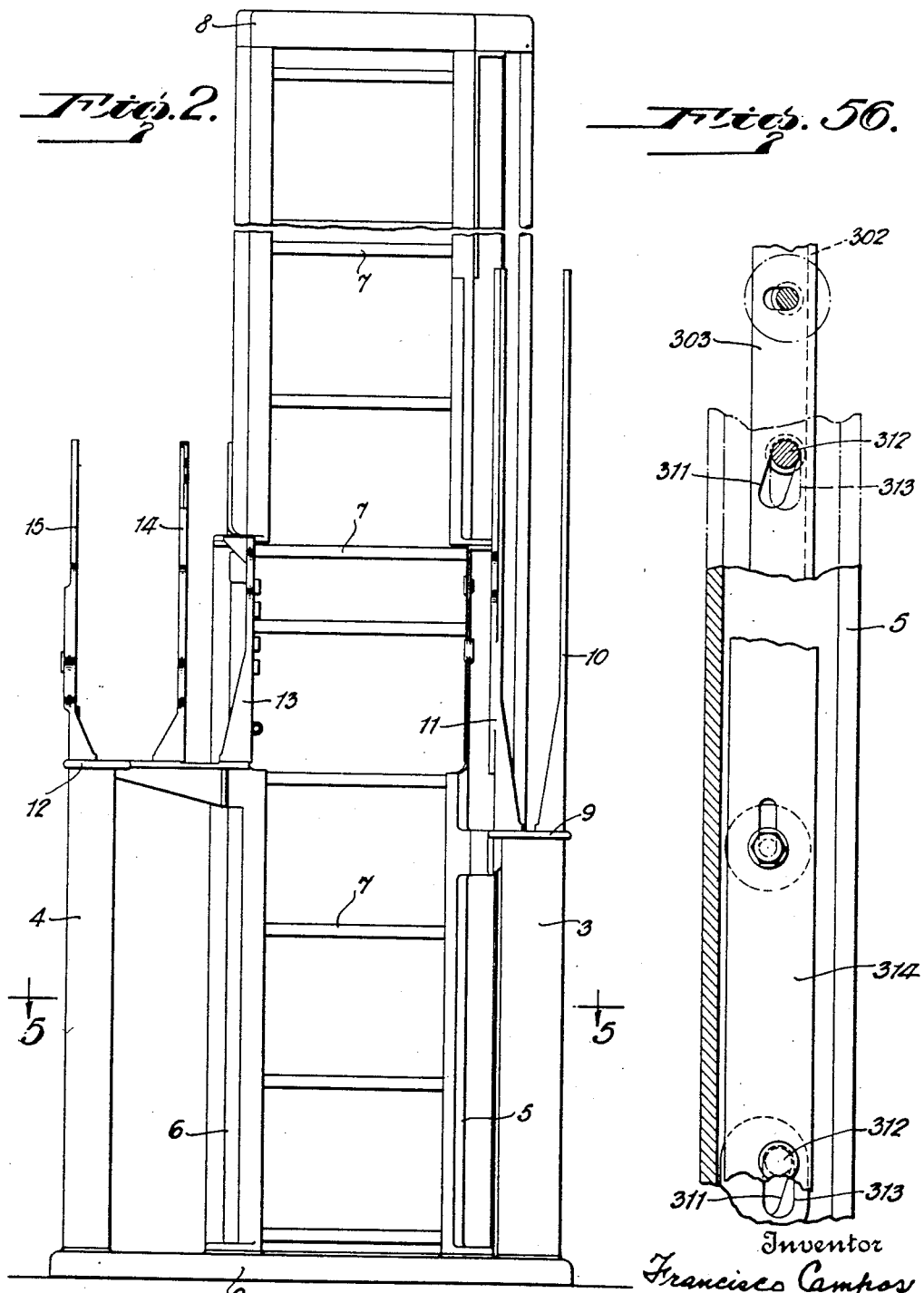
Fig. 2 is a front view of the main machine frames with the working parts removed.
Figure 3:
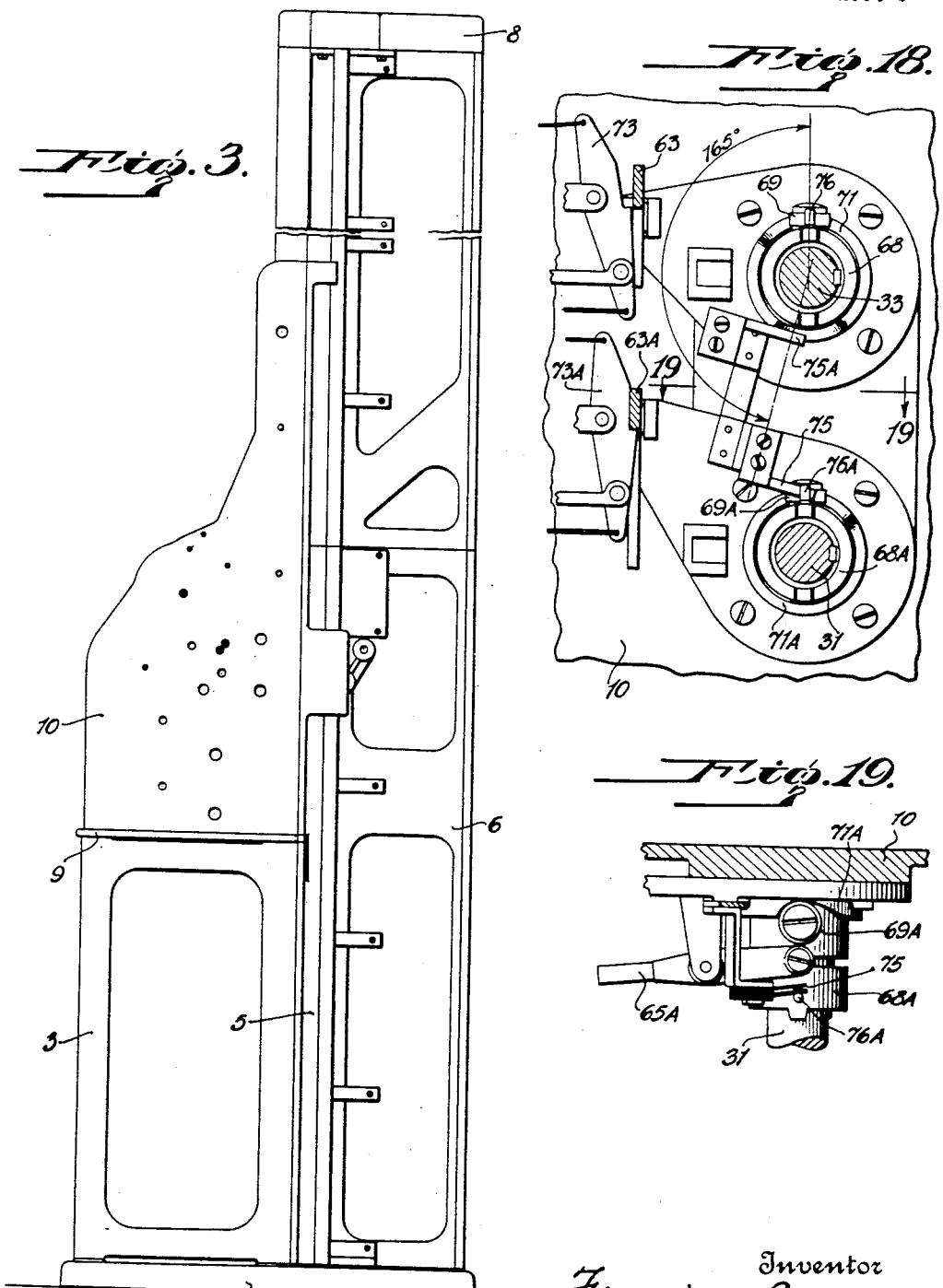
Fig. 3 is a right side elevation of the same.
Figure 4:
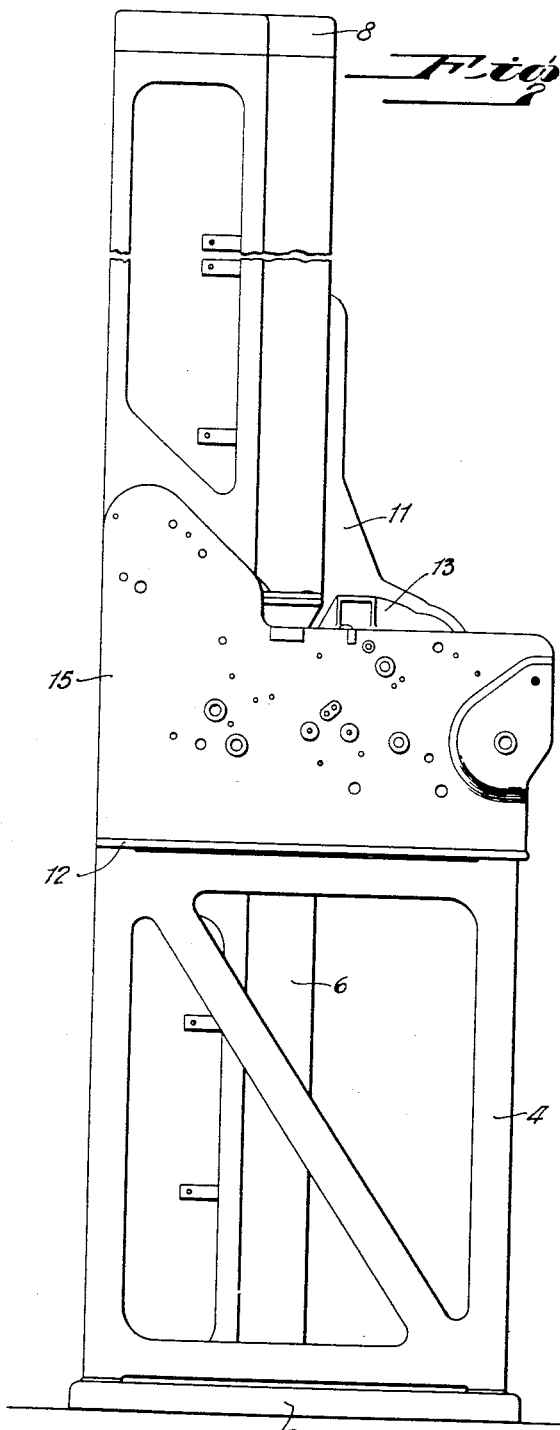
Fig. 4 is a left side elevation of the same.
Figure 7:
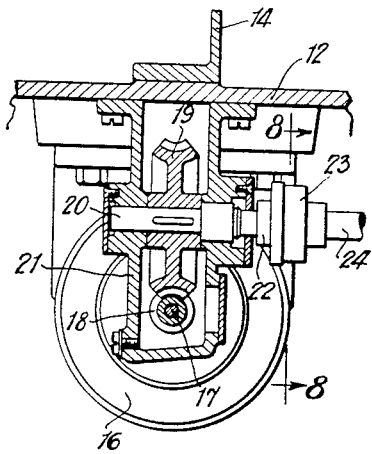
Fig. 7 is a section taken substantially on line 7—7 of Fig. 6, and looking toward the left.
Figure 8:
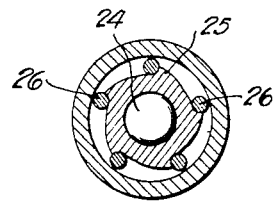
Fig. 8 is a detail section of the driving clutch.
Figure 9:
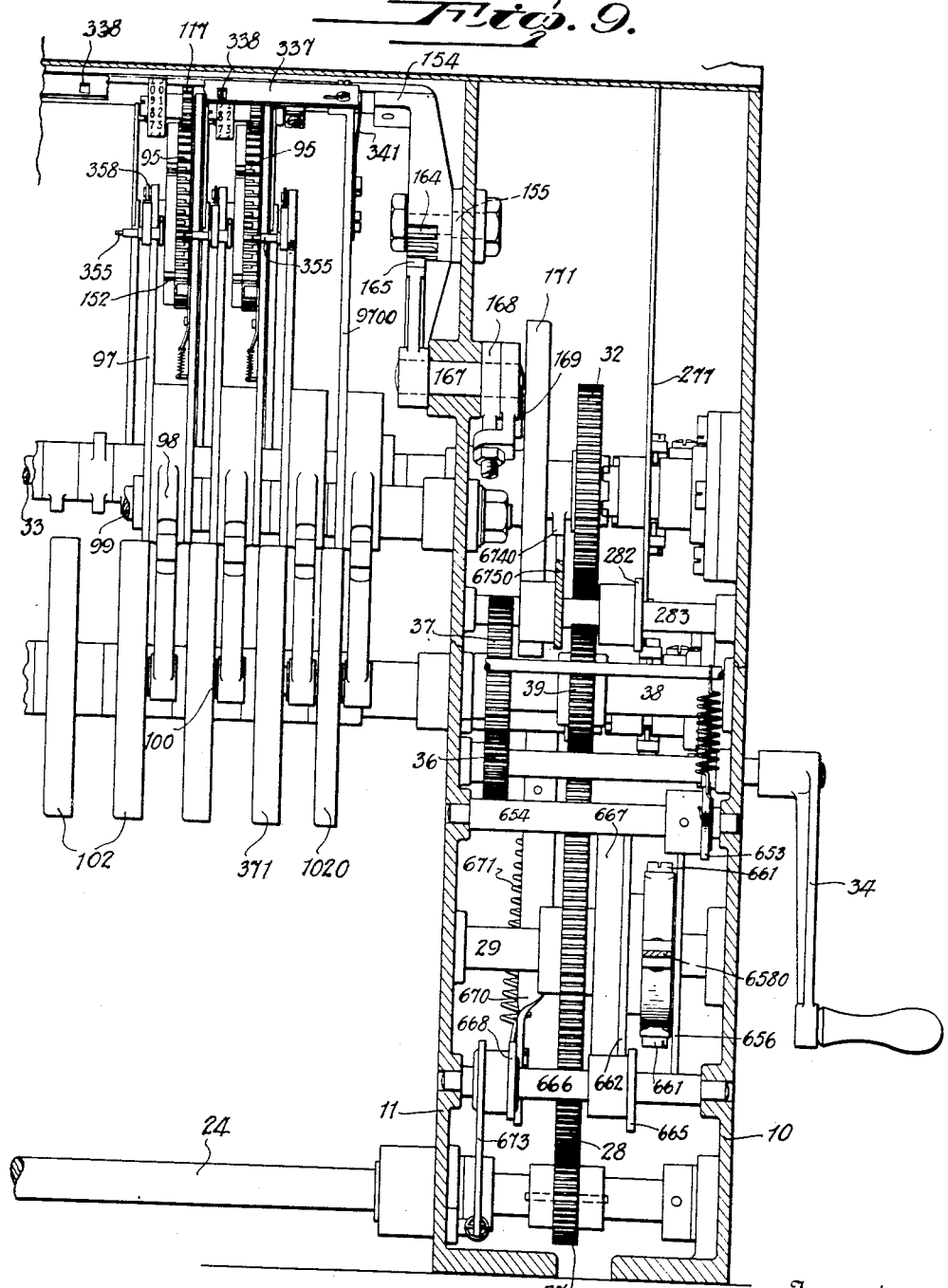
Figure 10:
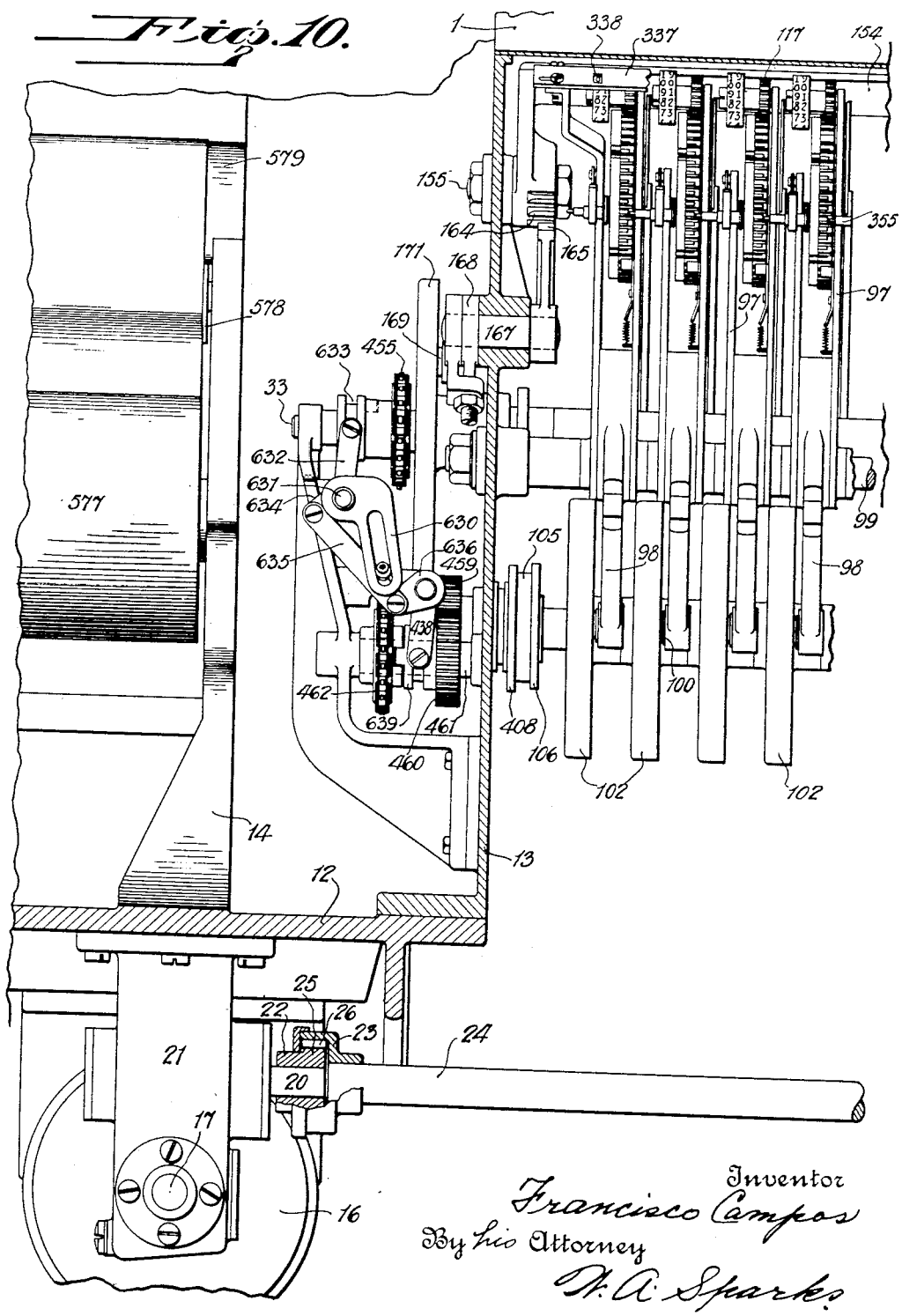

Figs. 9 and 10 together form a fragmentary vertical right-to-left section of the main portion of the machine showing principally the driving mechanism and accumulator-shifting cams.

Figure 11:
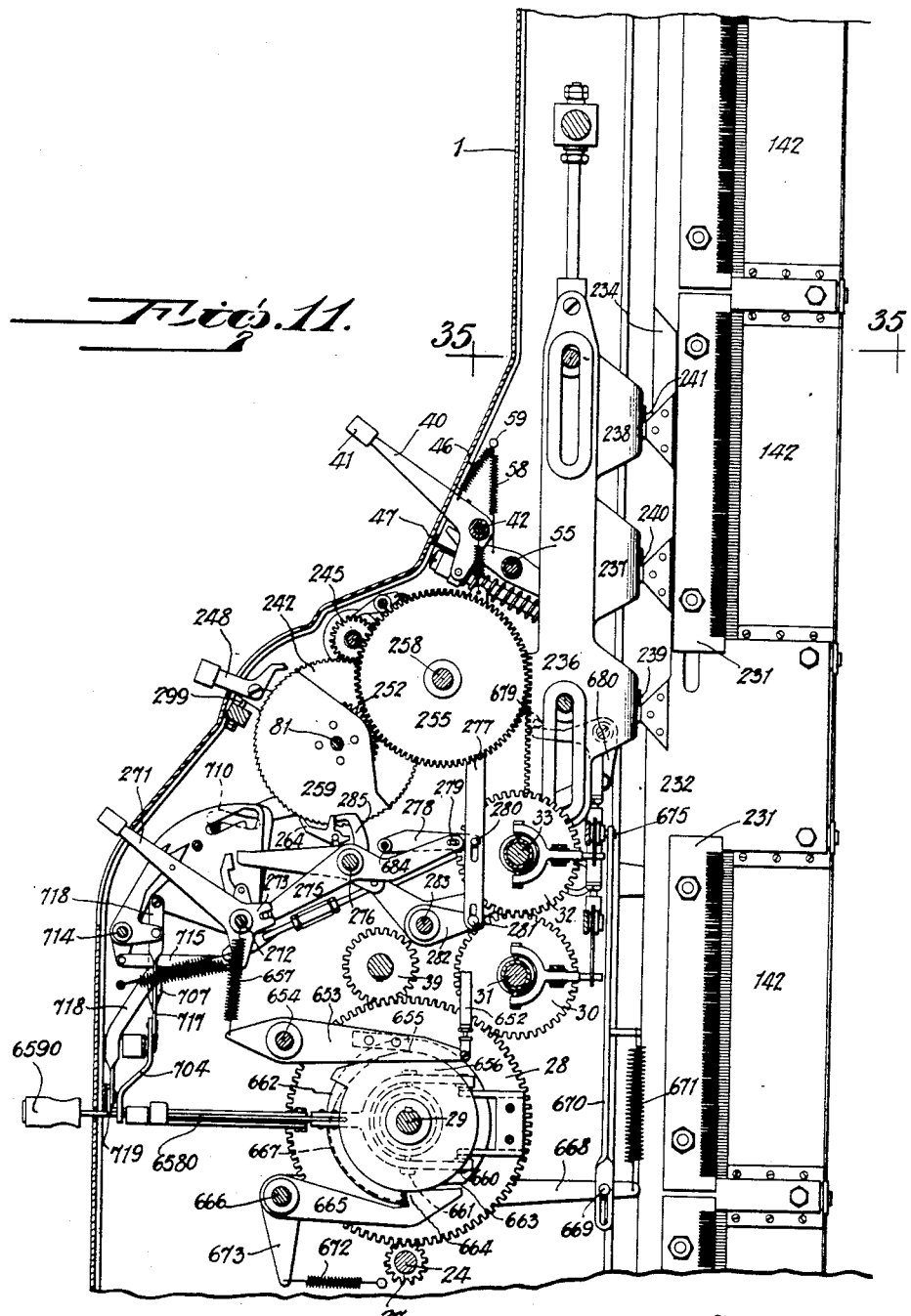

Fig. 11 is a fragmentary vertical front-to-rear section taken a short distance inside the right-hand main frame.

Figure 12:
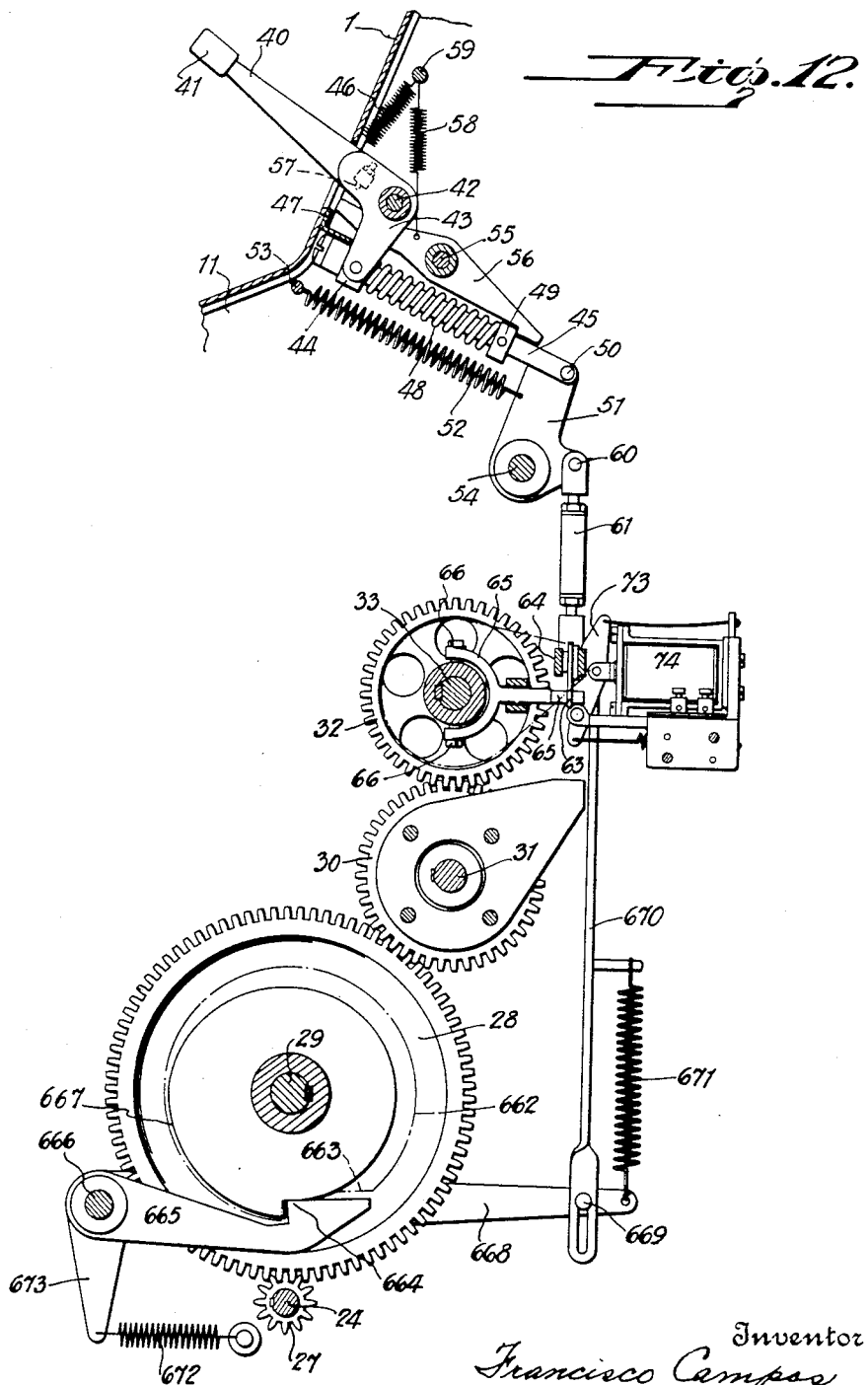
Figure 13:
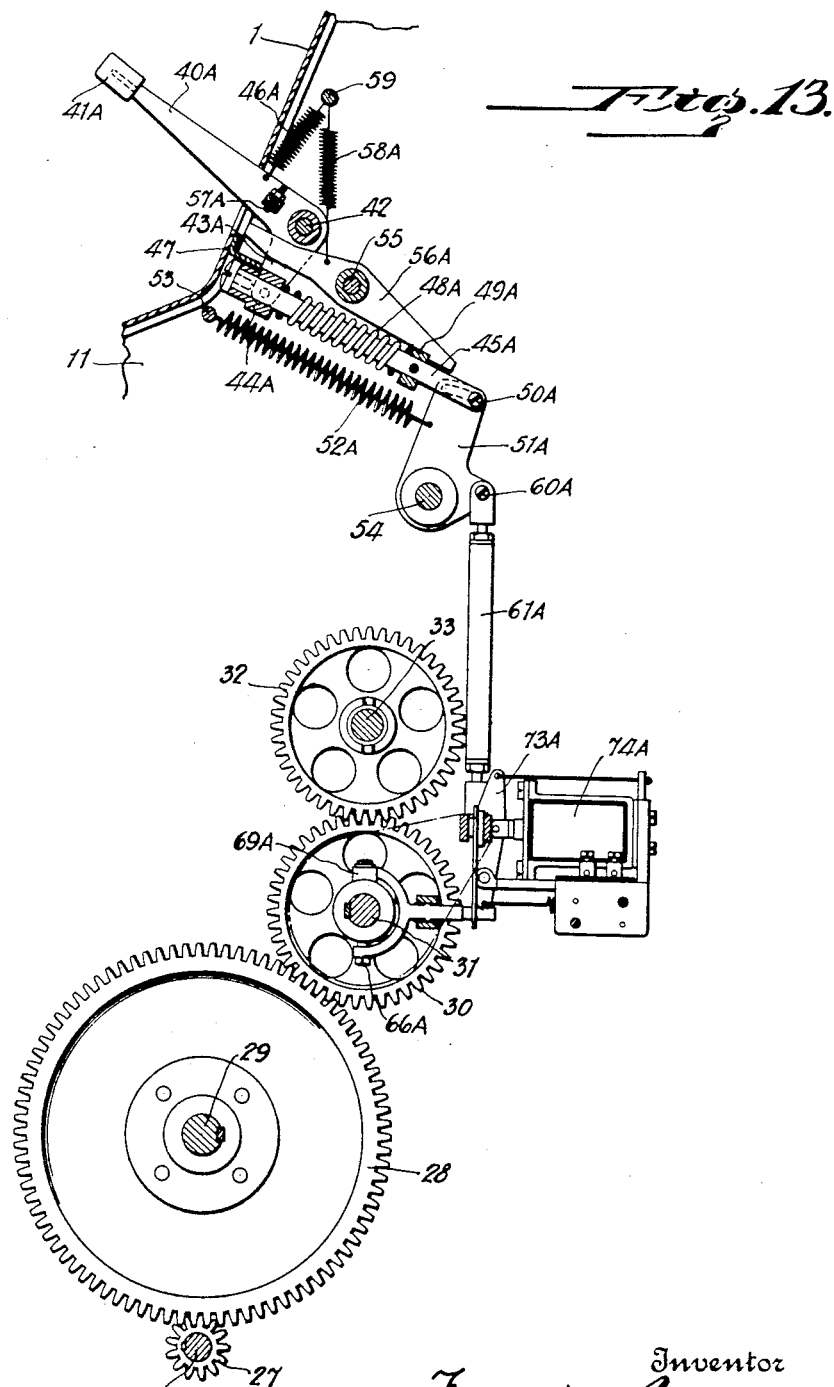

Figs. 12 and 13 are detail vertical sectional views showing the means for clutching respective main operating shafts.

Figure 14:
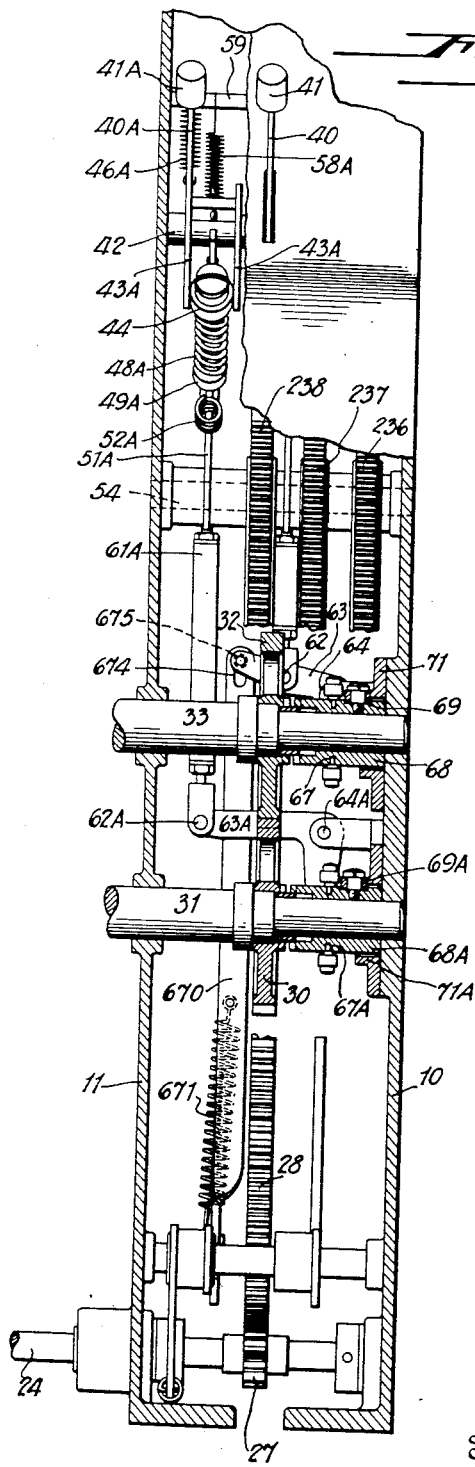

Fig. 14 is a front elevation of the mechanism shown in Figs. 12 and 13, parts being cut away for the sake of clearness.

Figure 15:
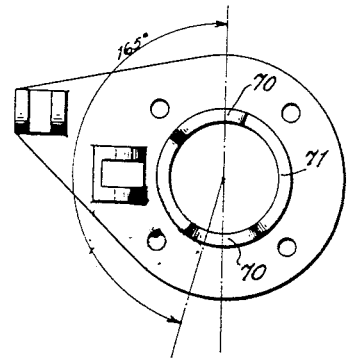

Fig. 15 is a detail of the retaining device for one of the main shaft clutches.

Figure 16:
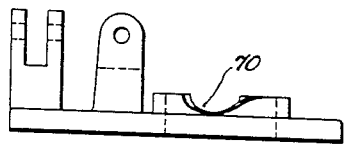

Fig. 16 is an edge view of the same.

Figure 17:
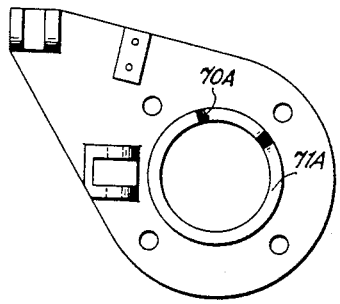

Fig. 17 is a view similar to Fig. 15 but for the other main shaft clutch.

Fig. 18 is a fragmentary sectional view showing the relative positions of the parts detailed in Figs. 15 and 17, and associated parts.

Fig. 19 is a view taken substantially on line 19—19 of Fig. 18.

Figure 20:
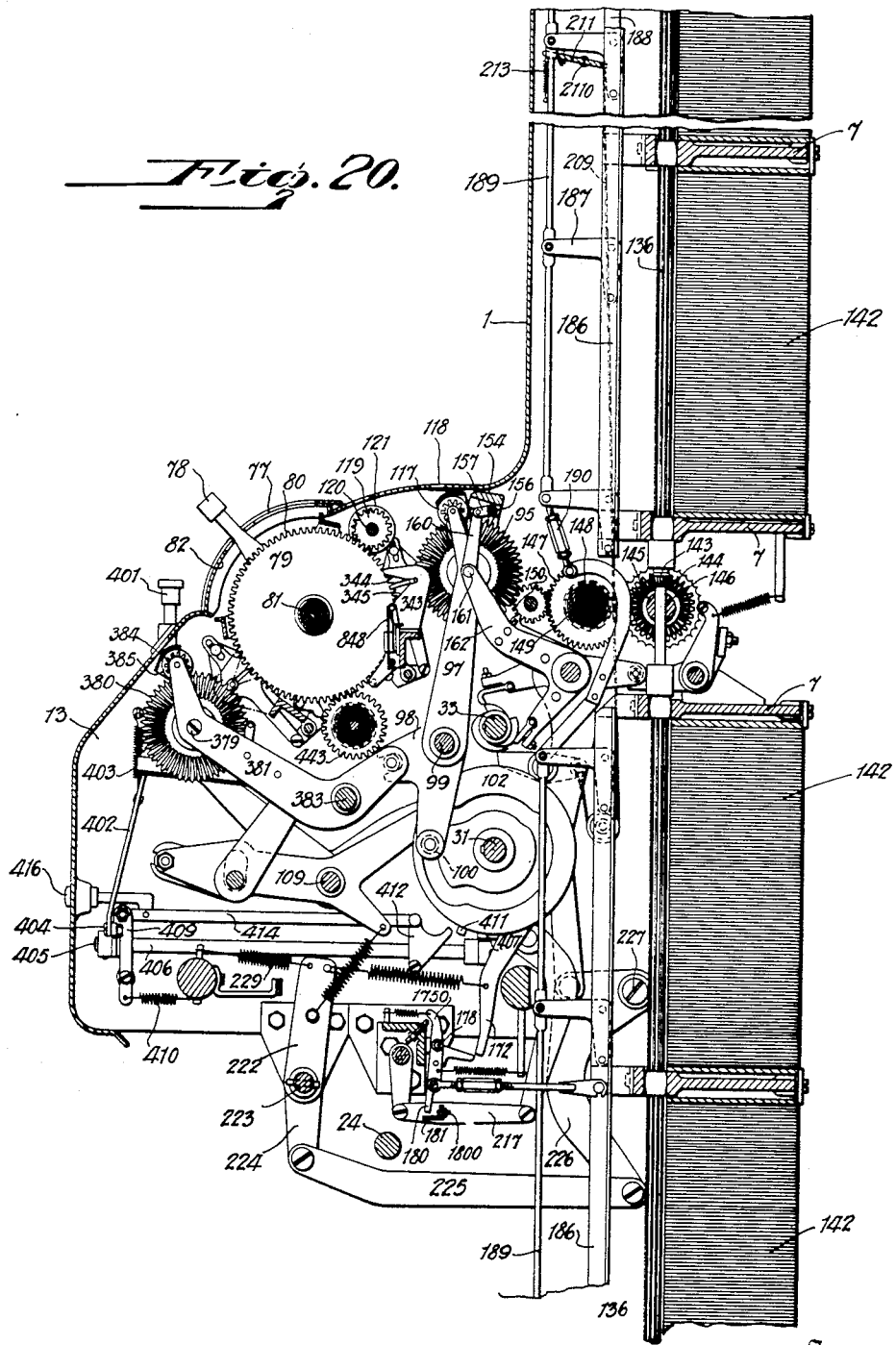

Fig. 20 is a fragmentary vertical front-to-rear section taken on a plane between the seventh and eighth denominational elements.

Fig. 21 is a fragmentary enlarged detail view showing the main and double-entry accumulators and associated parts.

Fig. 22 is a fragmentary enlarged view showing one of the main accumulator wheels and associated parts.

Fig. 23 is a view similar to Fig. 21 but taken from the left-hand side.

Fig. 24 is a similar view but showing key-return mechanism.

Figure 25:
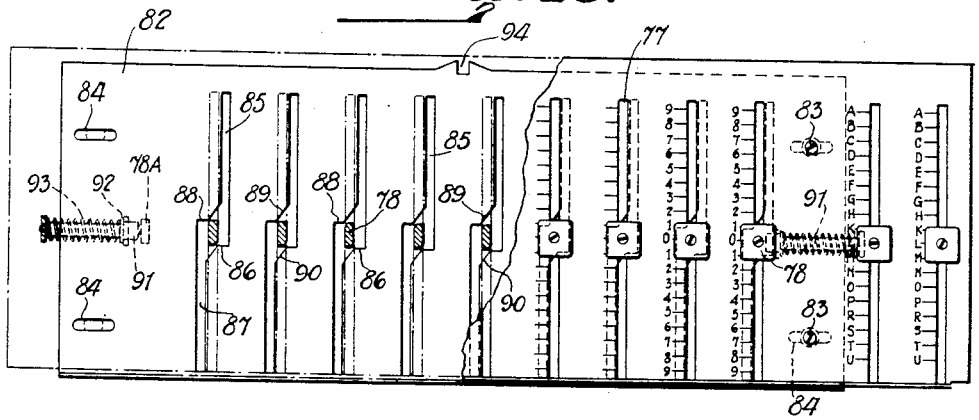

Fig. 25 is a detail view of the key interlock.

Fig. 26 is a detail of one of the spring impelled centering devices of Fig. 25.

Fig. 27 is a detail perspective of the highest order main accumulator wheel and indicator plate operating means.

Figure 28:
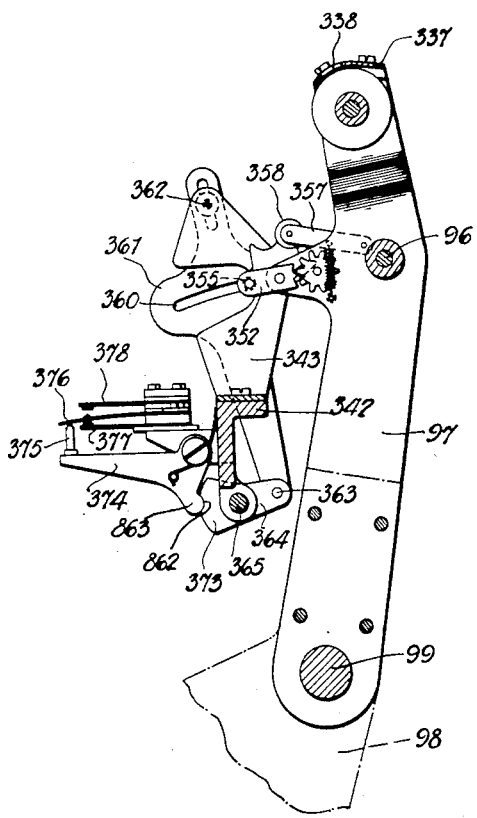

Fig. 28 is a detail of the highest accumulator wheel support and the associated compensating carry mechanism.

Figure 29:
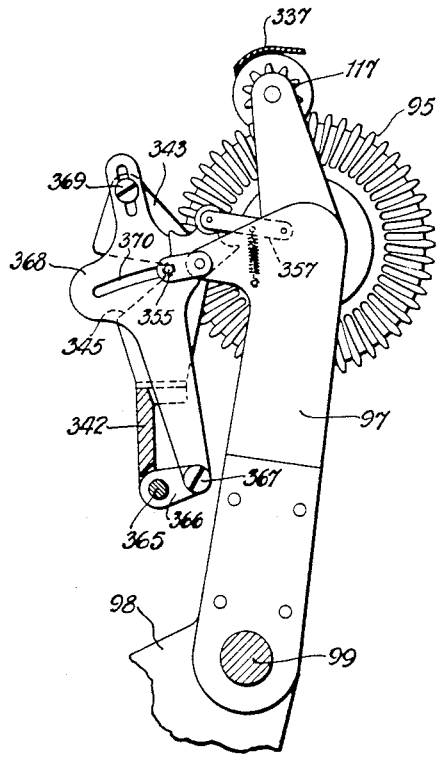

Fig. 29 is a similar view but of the lowest order mechanism.

Figure 30:
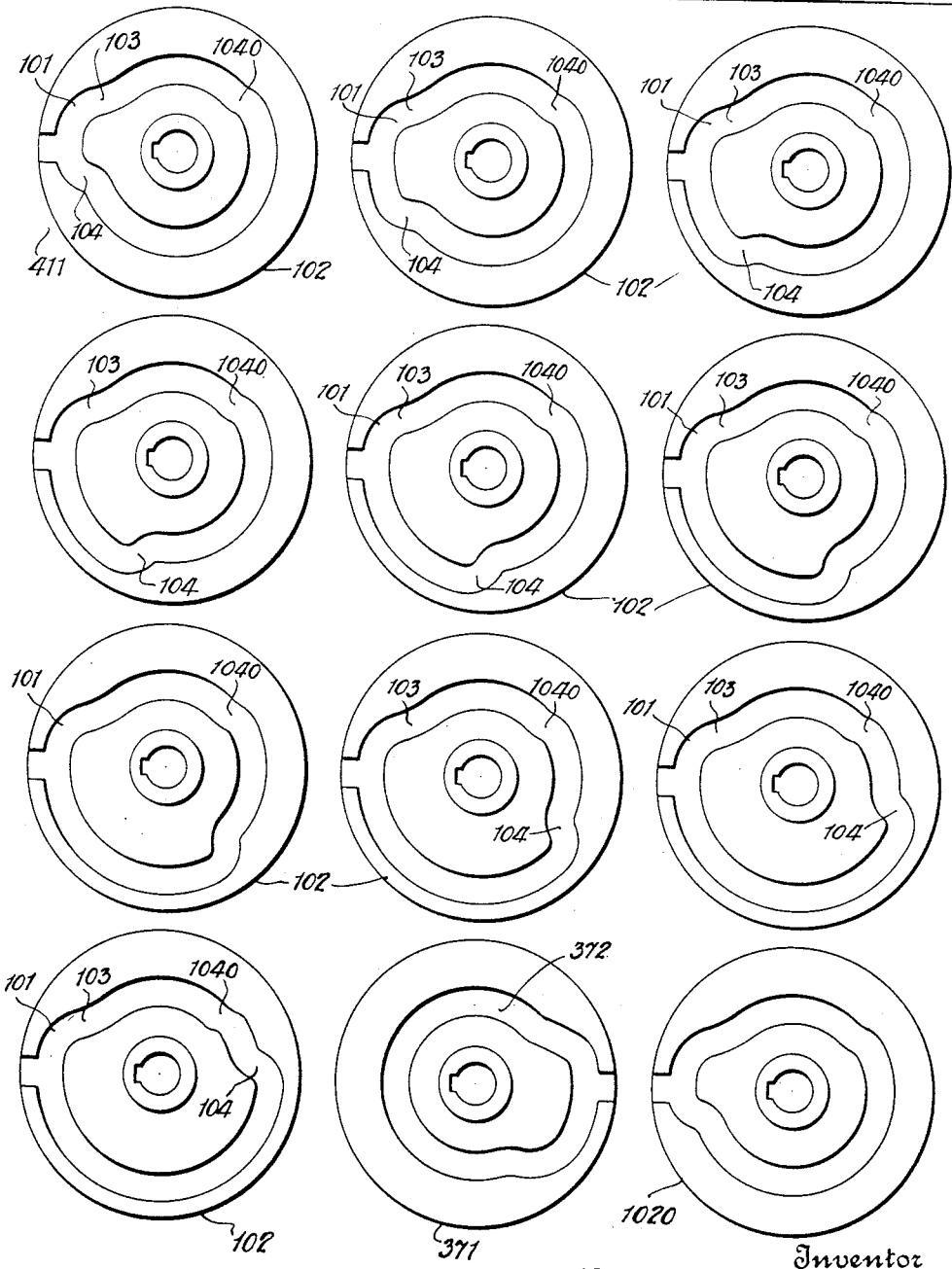

Fig. 30 is a collective view of the faces of all the cams on the main shaft for entering items.

Fig. 31 is a view showing the two main driving shafts and their cams.

Fig. 32 is a fragmentary front elevation of parts of the main accumulating mechanism showing principally some of the carrying or tens-transfer mechanism.

Fig. 33 is a fragmentary left-side view of one of the accumulator wheels and associated parts illustrating principally the gear-locking and the tens-transfer mechanisms.

Fig. 34 is a fragmentary detail of parts of the tens-transfer mechanism.

Fig. 35 is a horizontal section taken substantially on line 35—35 of Fig. 11 and illustrating the account selecting mechanism.

Fig. 36 is a top plan view of one of the account sheets and associated parts.

Fig. 37 is a fragmentary enlarged section substantially on line 37—37 of Fig. 40.

Fig. 38 is a fragmentary enlarged section substantially on line 38—38 of Fig. 41.

Fig. 39 is a bottom plan view of an account sheet.

Fig. 40 is an enlarged fragmentary section taken substantially on line 40—40 of Fig. 36.

Fig. 41 is an enlarged fragmentary section taken substantially on line 41—41 of Fig. 40.

Fig. 42 is a collective view showing an account rack and associated parts in four successive positions—normal, engaged, engaged and control bar active, and fully extended to operate the control bar.

Fig. 43 is an enlarged fragmentary vertical section showing the means for controlling entry of an account from a set to the main accumulator. All parts are in normal position.

Figure 44:
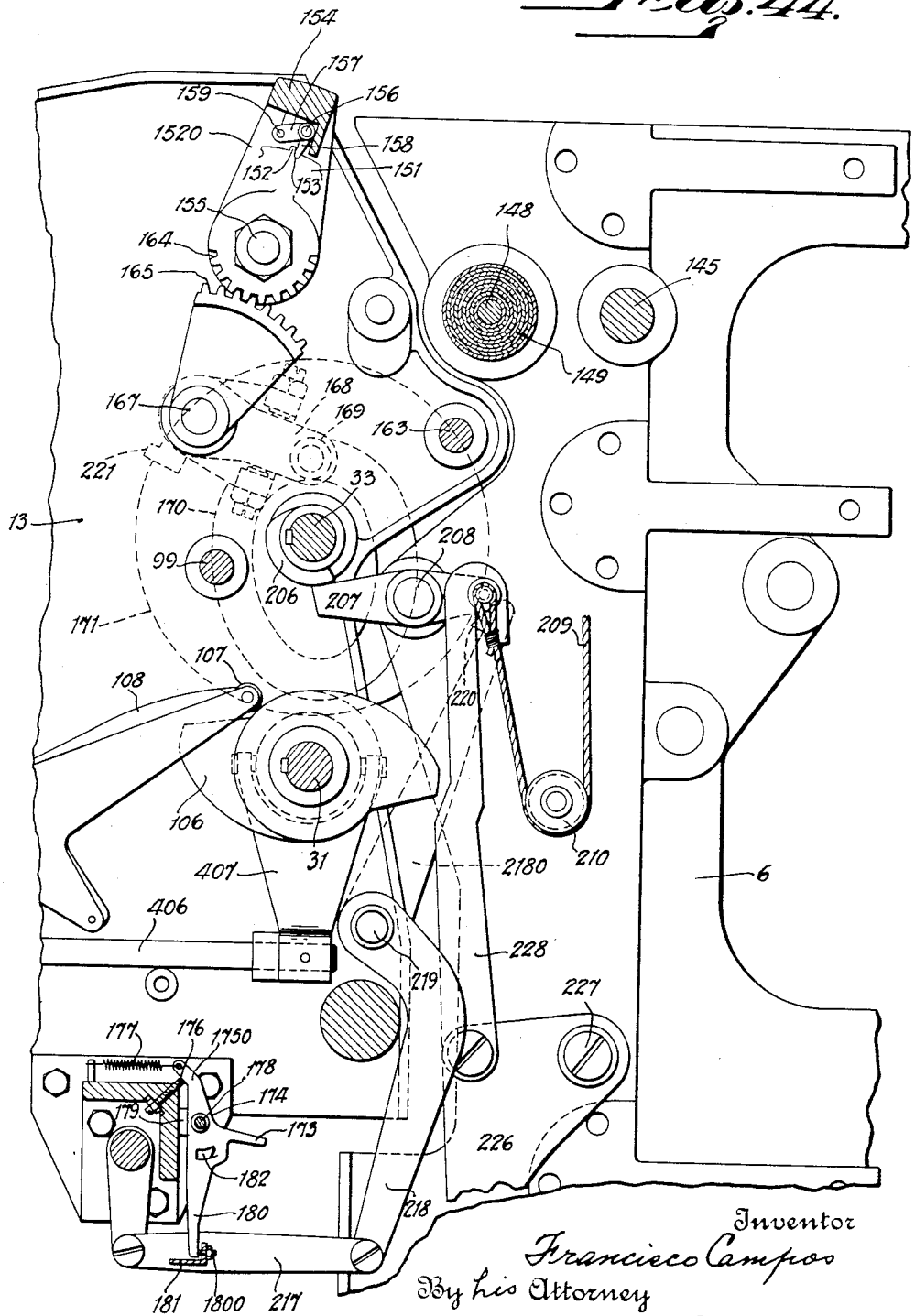

Fig. 44 is an enlarged fragmentary section taken just inside frame 13.

Figure 45:
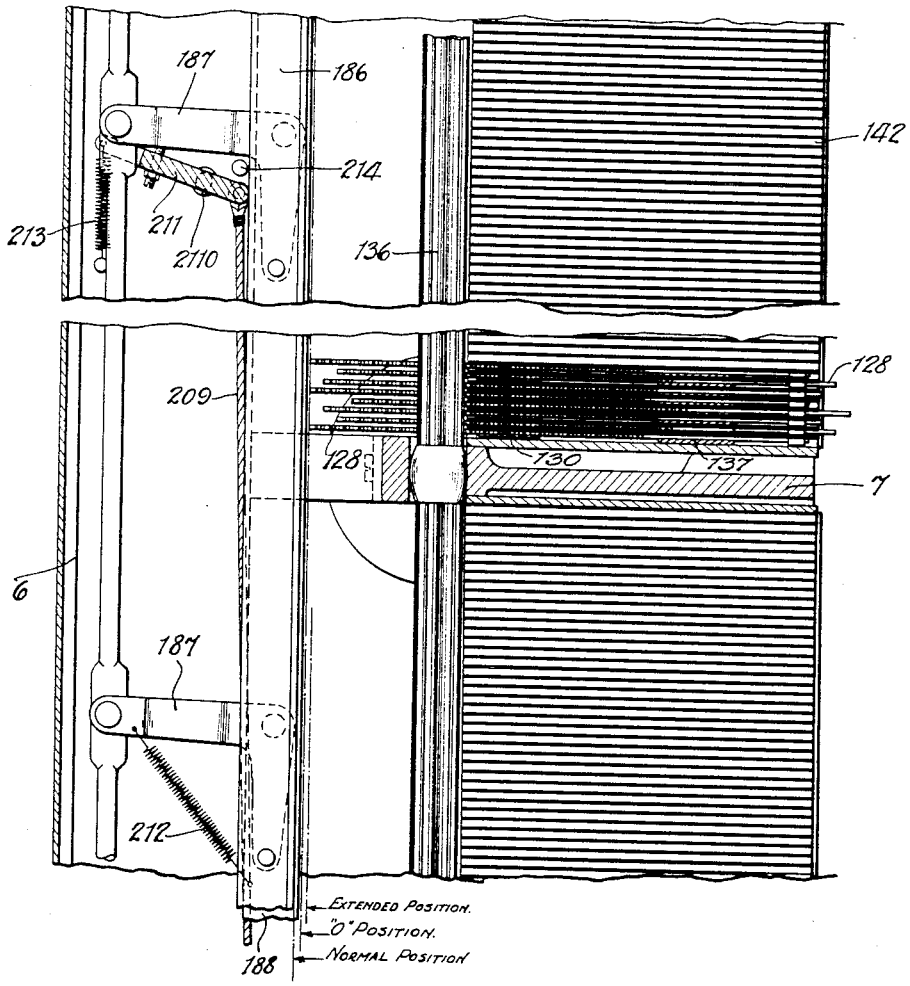

Fig. 45 is an enlarged fragmentary detail of the control mechanism operable by the account racks.

Fig. 46 is a fragmentary right side elevation with frame 10 removed.

Figure 47:
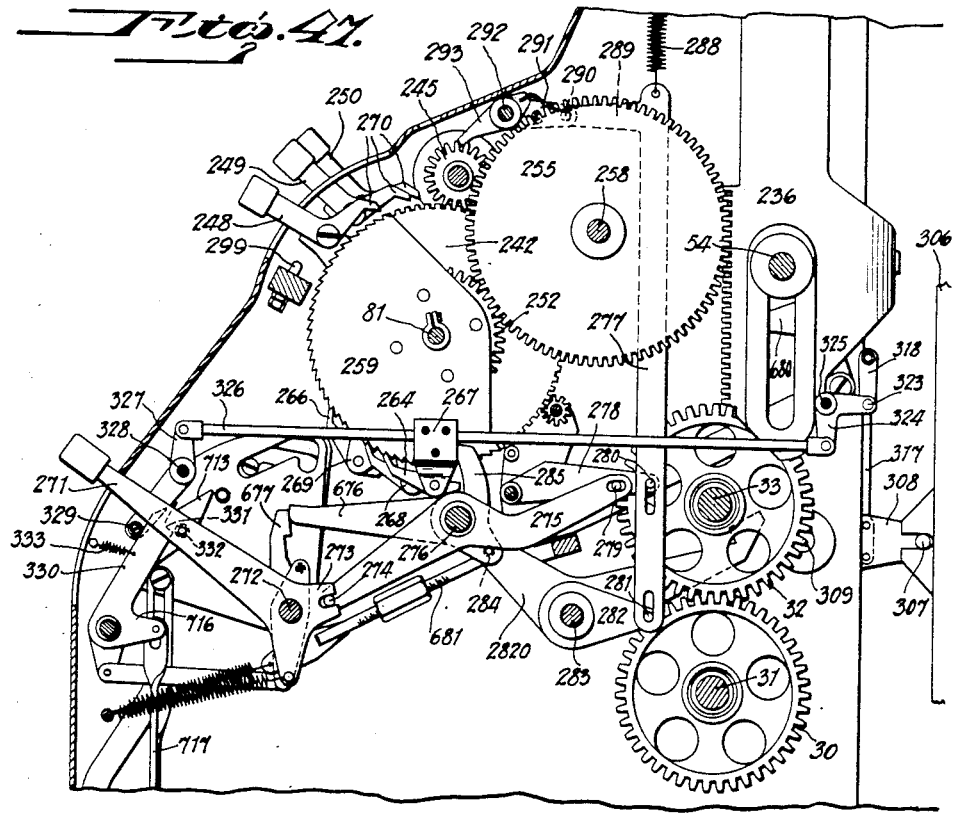

Fig. 47 is a fragmentary right elevation of the selector mechanism.

Fig. 48 is a similar view taken just to the right of the tens selector wheel.

Fig. 49 is a similar view taken just to the right of the hundreds selector wheel.

Figure 50:
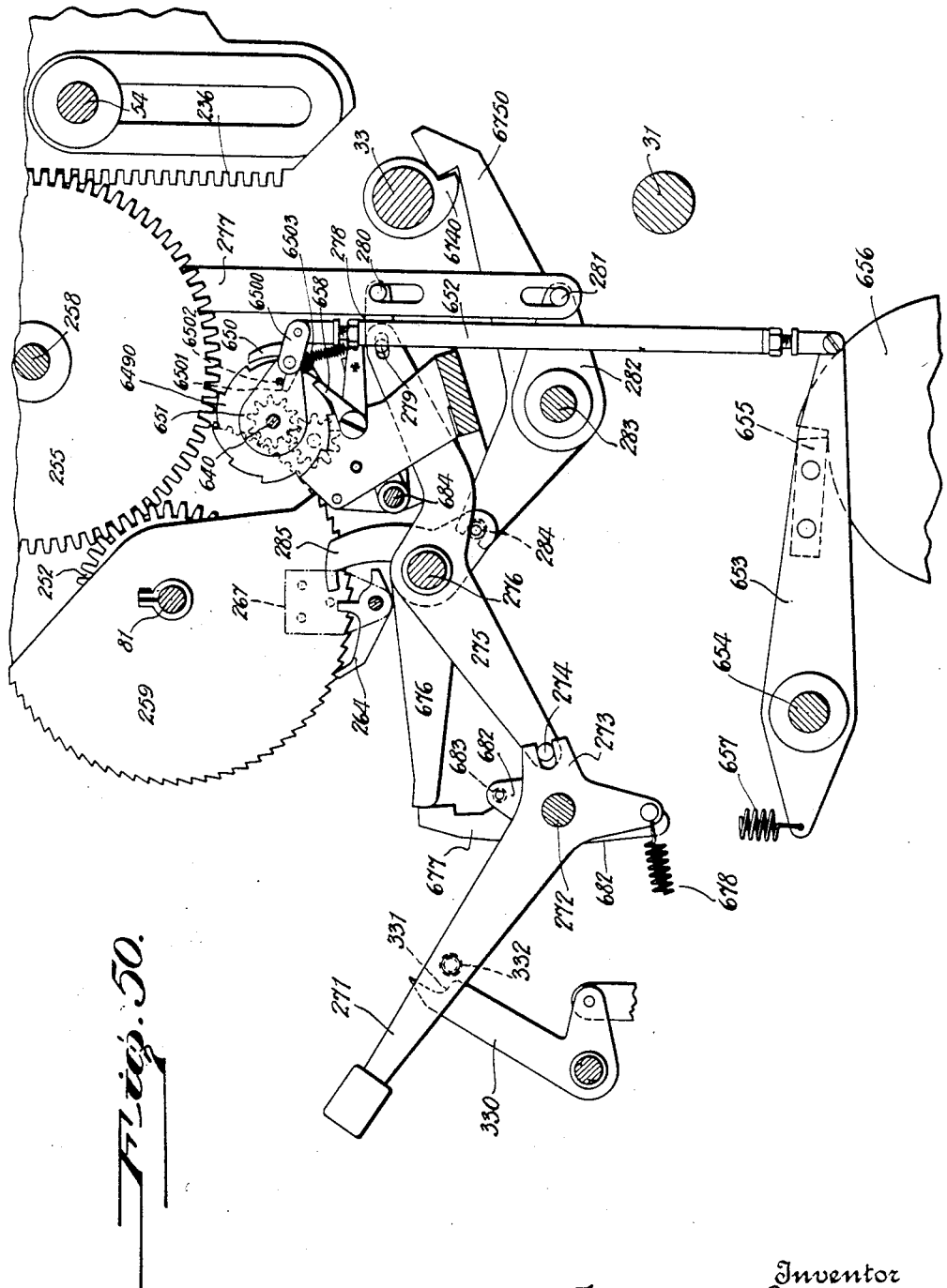

Fig. 50 is an enlarged detail drawing showing principally the account selector resetting mechanism.

Figure 51:
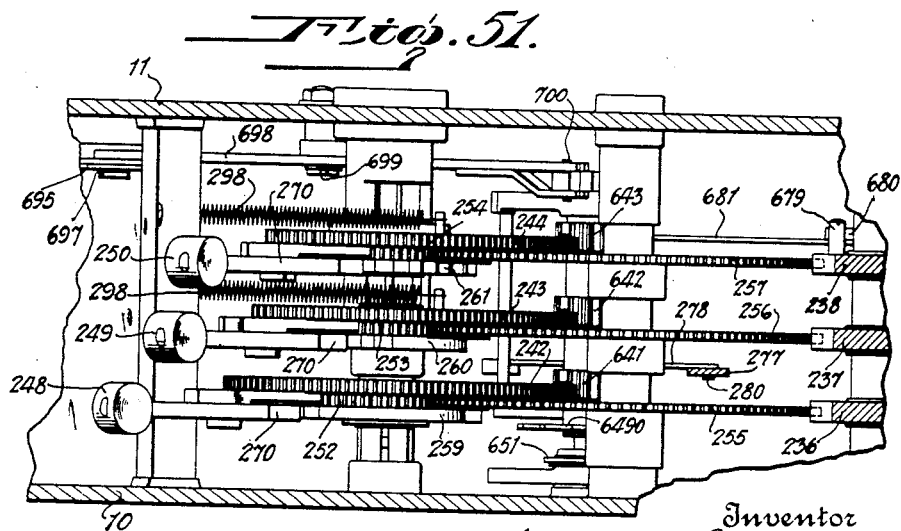

Fig. 51 is a fragmentary top plan view of the account selector with parts omitted for the sake of clearness.

Figure 52:
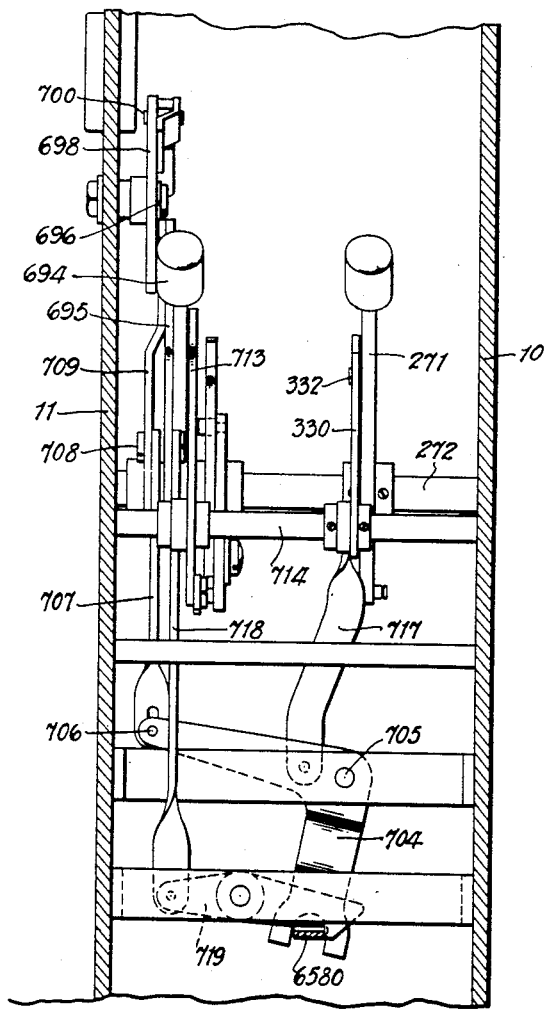

Fig. 52 is a fragmentary front elevation of certain members of the account selecting mechanism.

Fig. 53 is an enlarged fragmentary horizontal section of one of the frame members and the account selecting vernier bars and associated parts.

Fig. 54 is a detail view of the operating means for one of the account selecting slide bars.

Fig. 55 is a perspective and partly exploded view of certain parts of the account selecting means.

Fig. 56 is an enlarged fragmentary detail of one of the slide bars of the account selector.

Fig. 57 is a fragmentary diagrammatic view of the vernier bars and associated comb plate.

Fig. 58 is a vertical sectional view of the same.

Fig. 59 is an enlarged view similar to Fig. 57 but with the bars moved to set up a given example.

Figure 60:
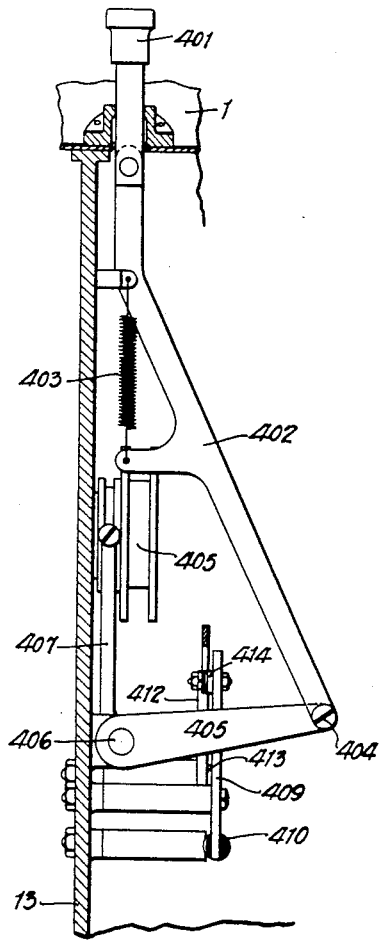

Fig. 60 is a fragmentary detail sectional view showing a front elevation of one of the control keys of the machine.

Figure 61:
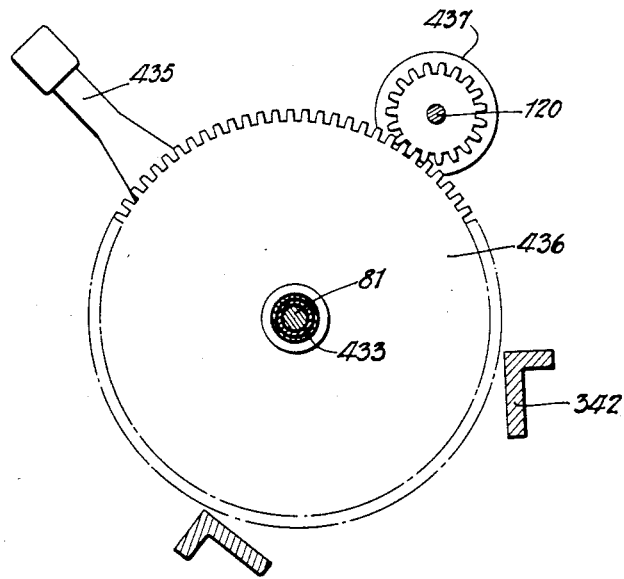

Fig. 61 is a detail view of the code setting mechanism.

Figure 62:
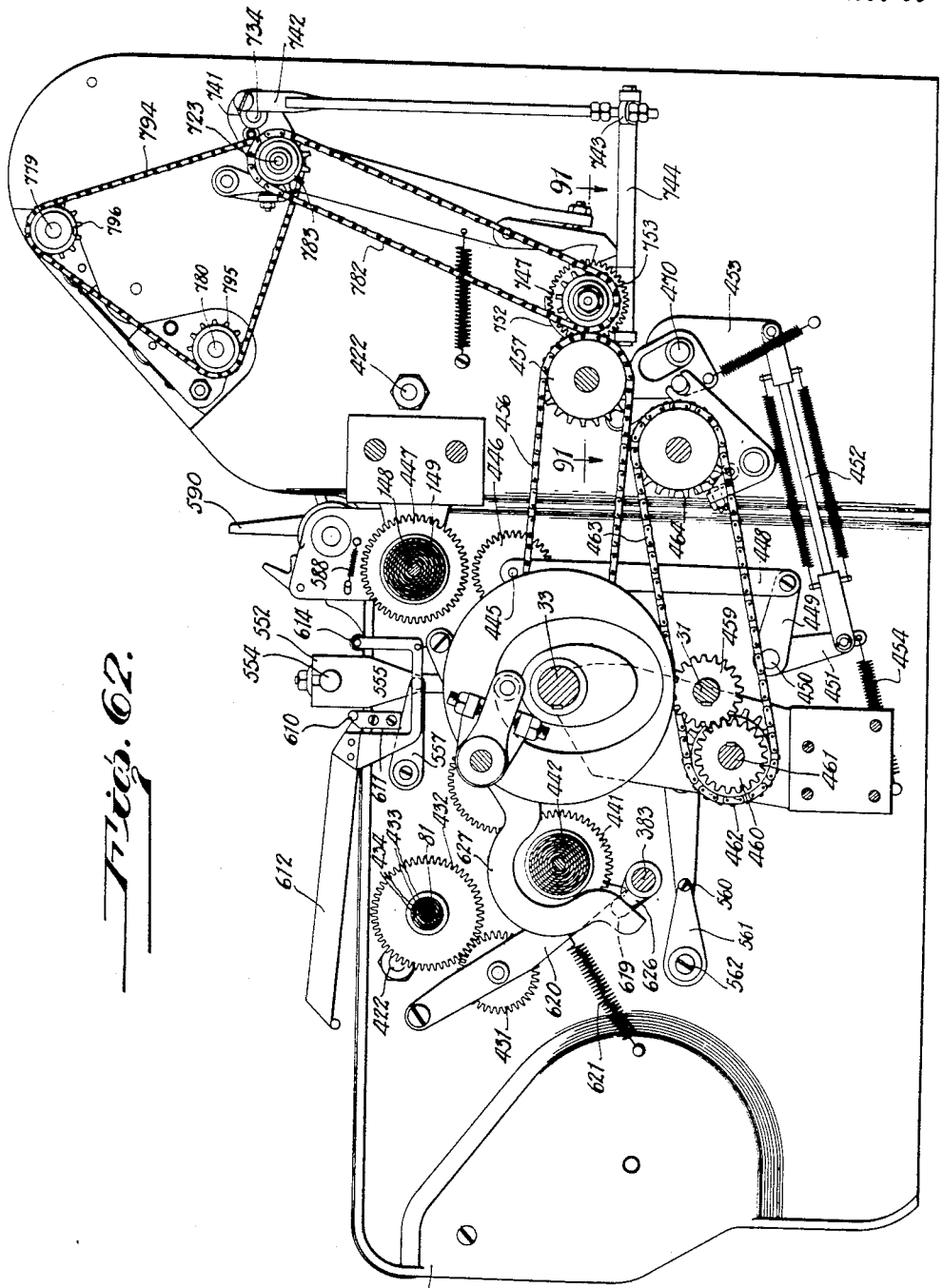

Fig. 62 is a vertical front-to-rear section taken just to the left of frame 13 and looking toward the left.

Figure 63:
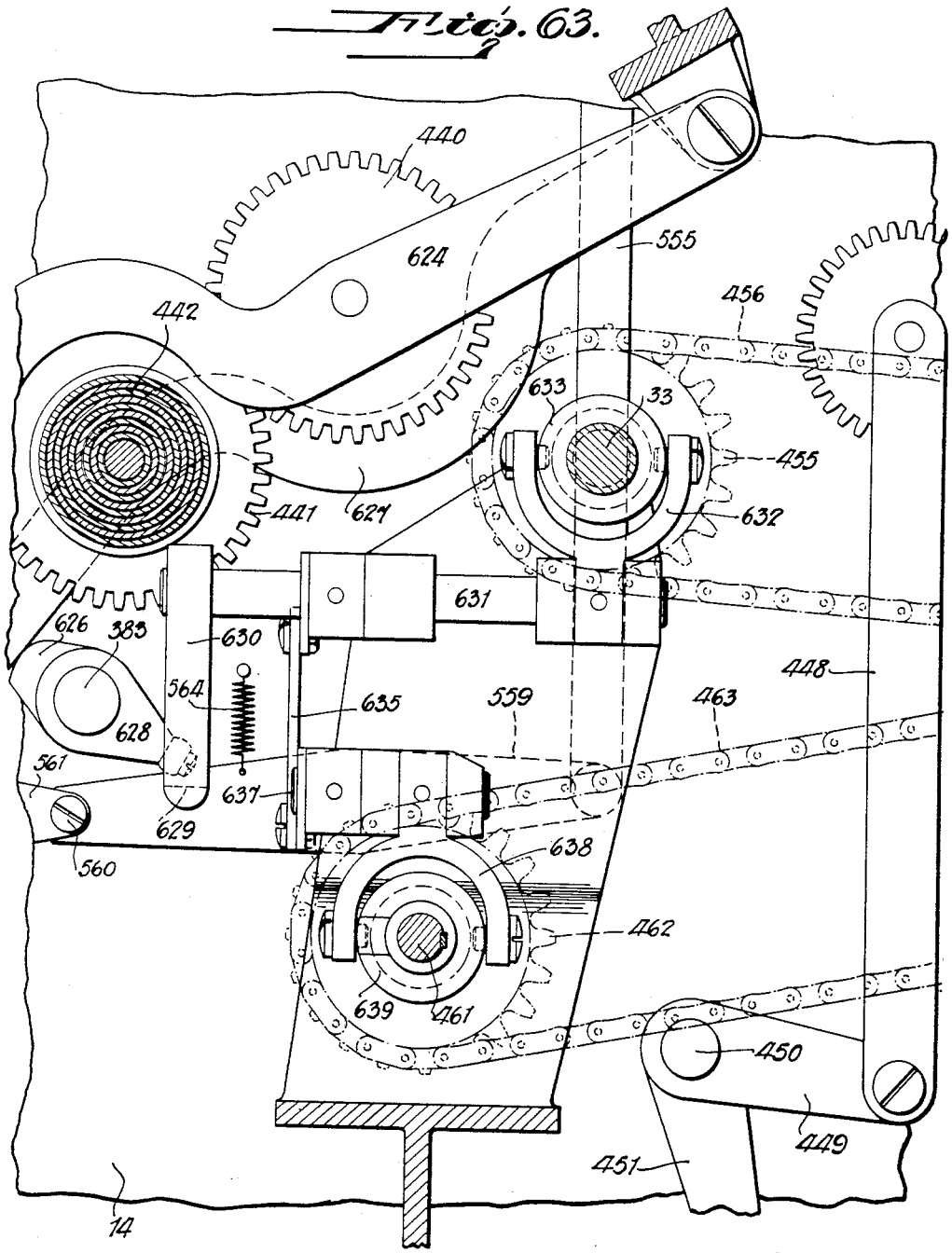

Fig. 63 is an enlarged fragmentary detail section showing the clutch mechanism between the main shafts of the adding and printing sections of the machine.

Figure 64:
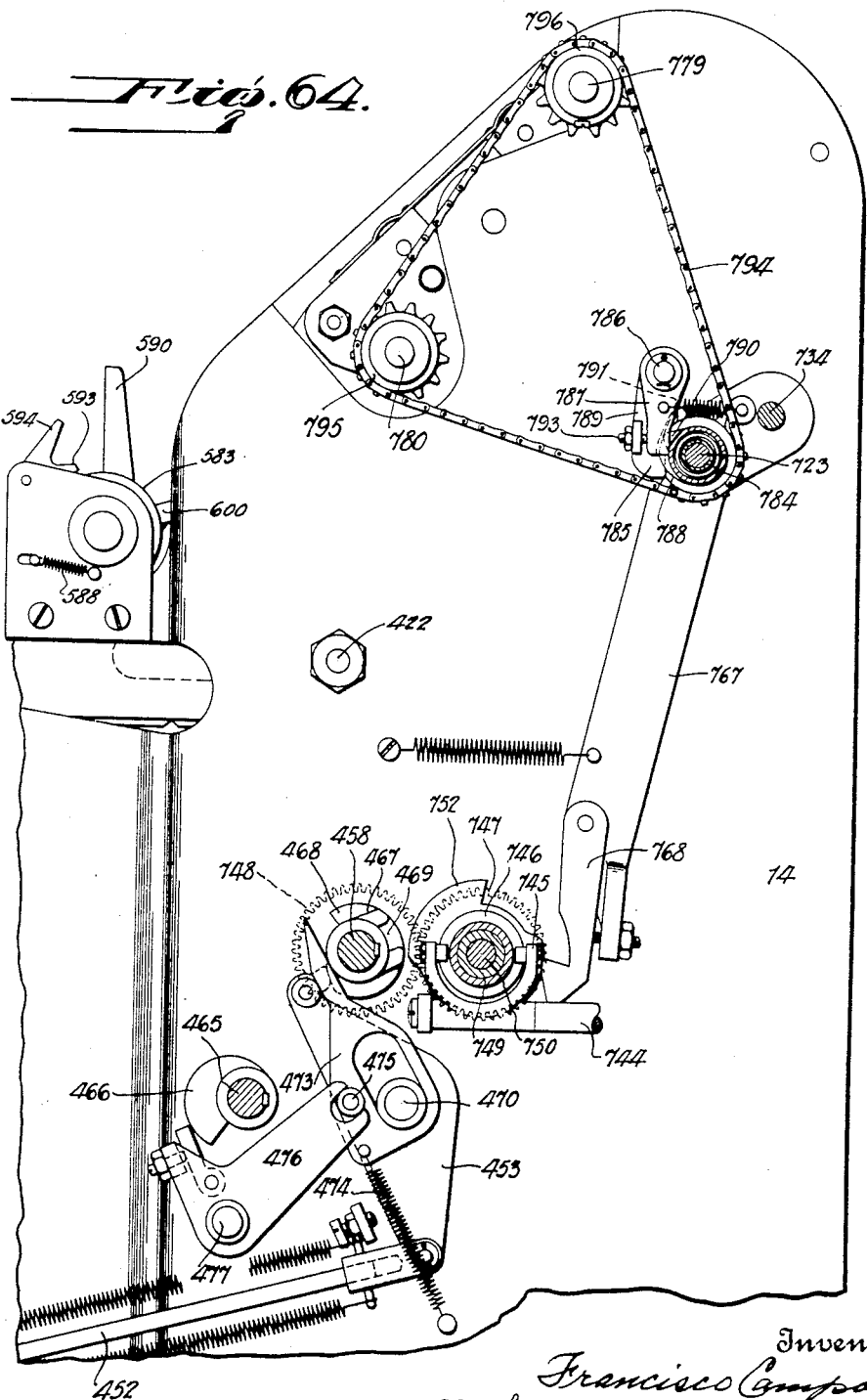

Fig. 64 is an enlarged vertical section taken to the right of frame 14 and showing parts associated with the debit and credit balance mechanism.

Figure 65:
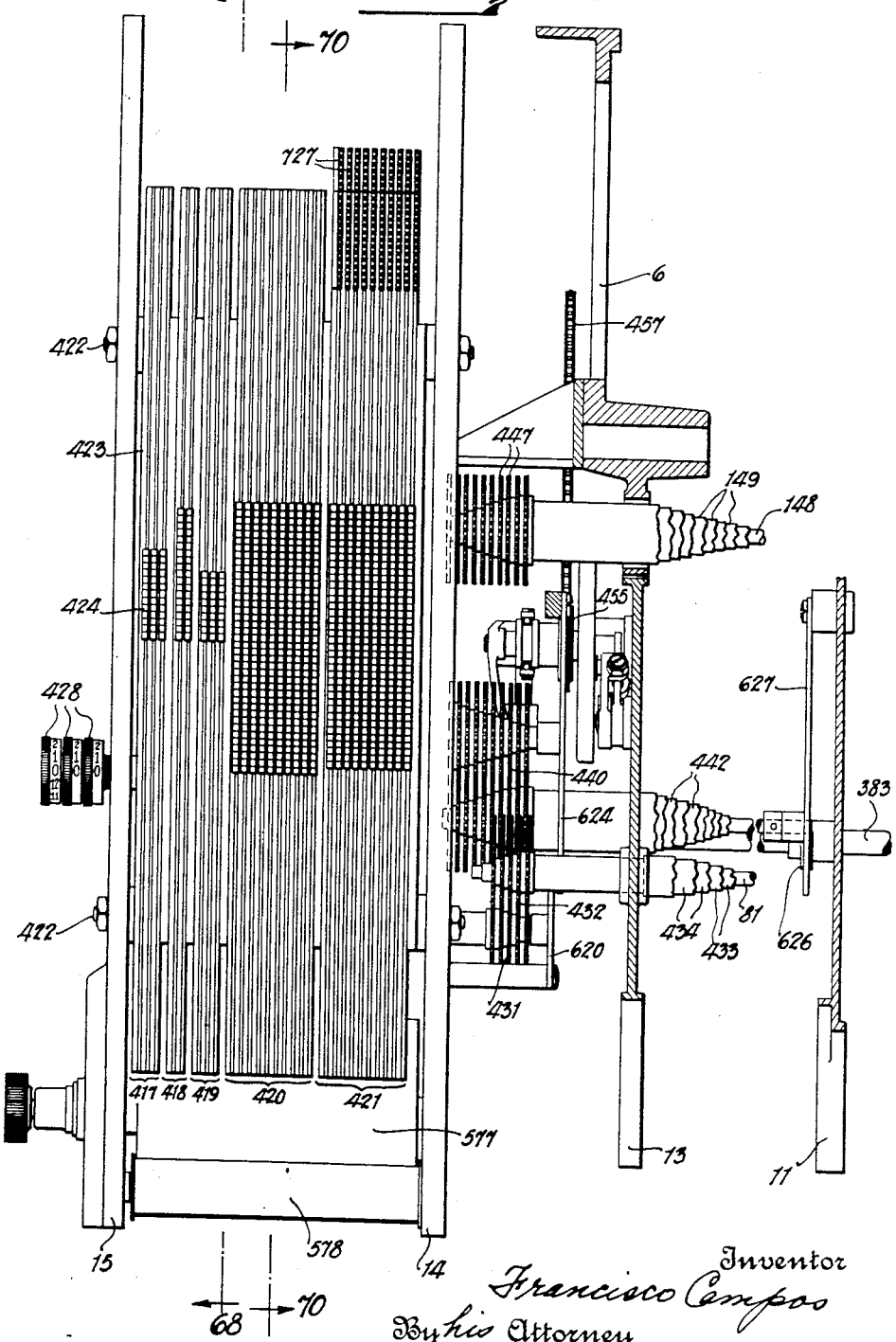

Fig. 65 is a top plan view of the printing bars and some of the associated parts.

Figure 66:
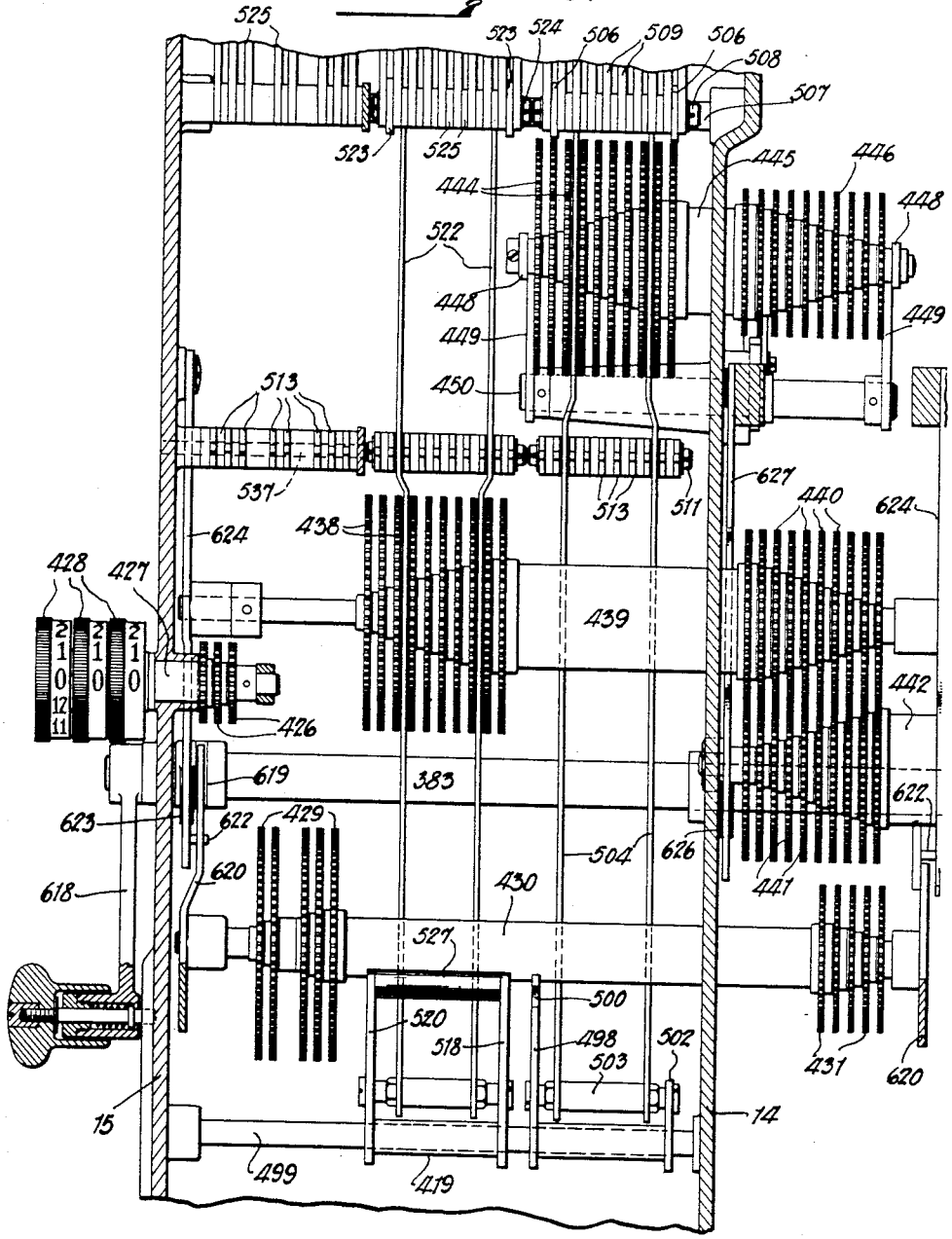

Fig. 66 is a top plan view of the printing bar actuator gears and associated parts.

Figure 67:
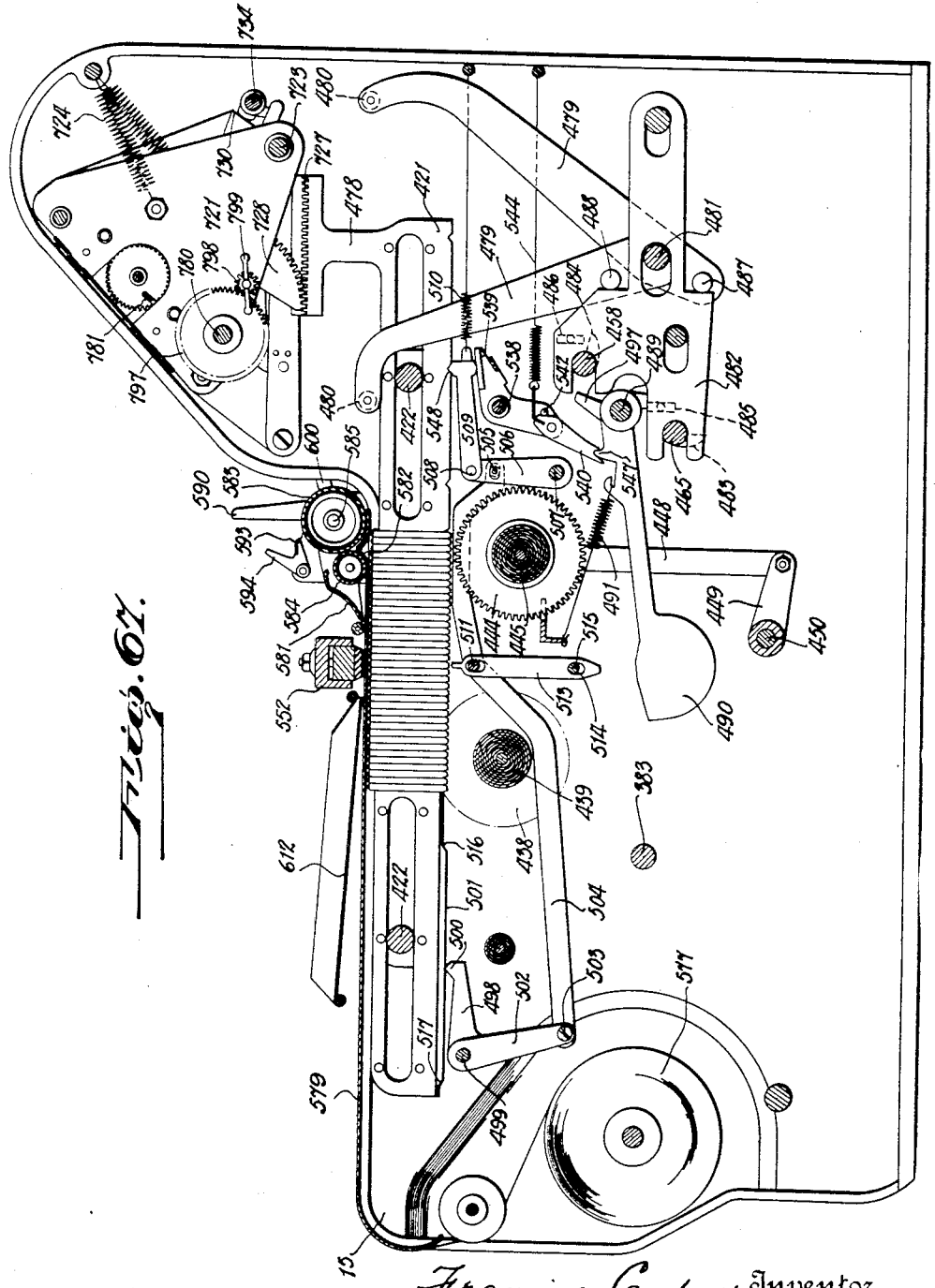

Fig. 67 is a vertical front-to-rear section taken just to the left of frame 14 and looking toward the left.

Figure 68:
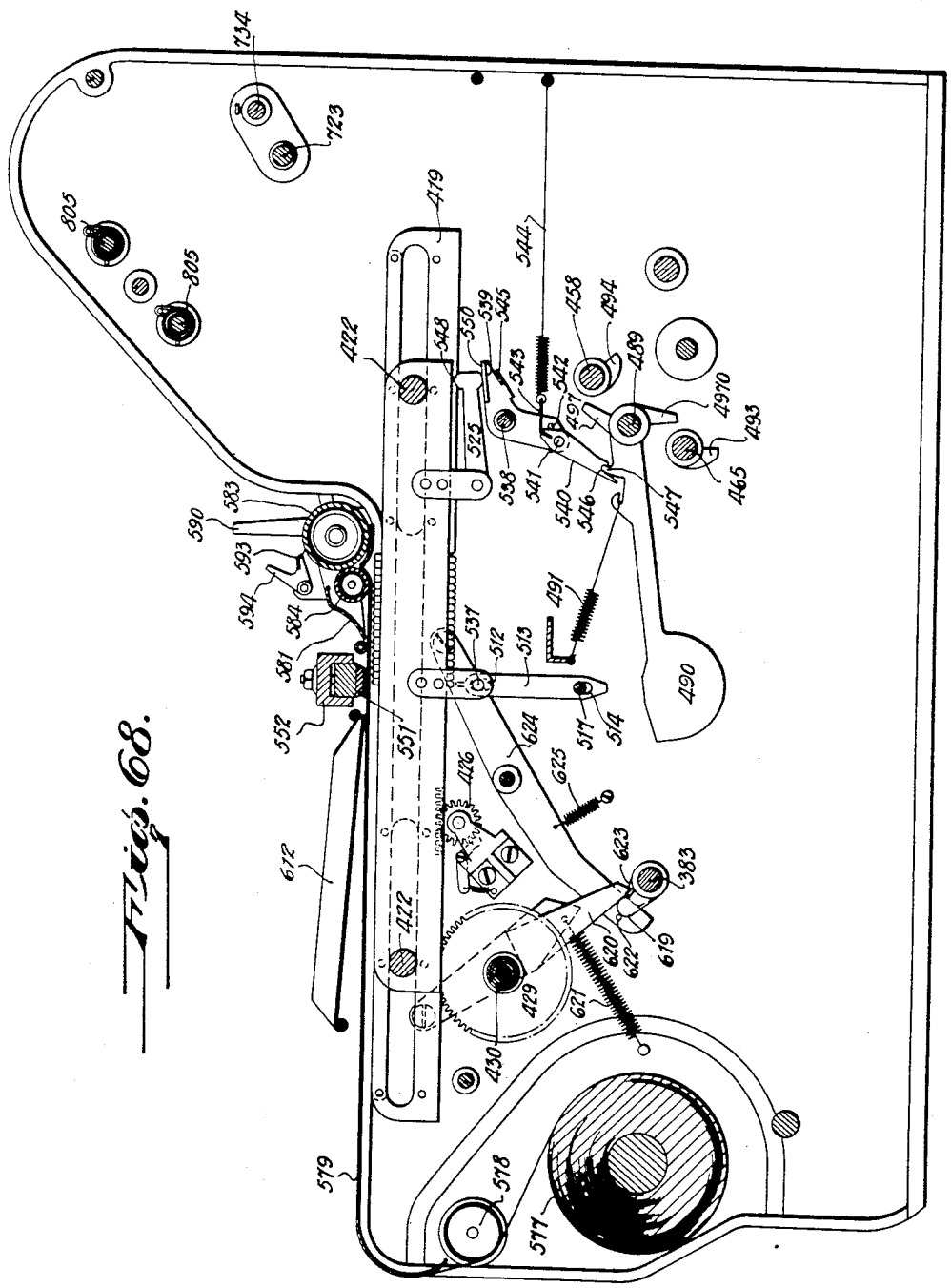

Fig. 68 is a vertical sectional view taken substantially on line 68—68 of Fig. 65, looking toward the left.

Figure 69:
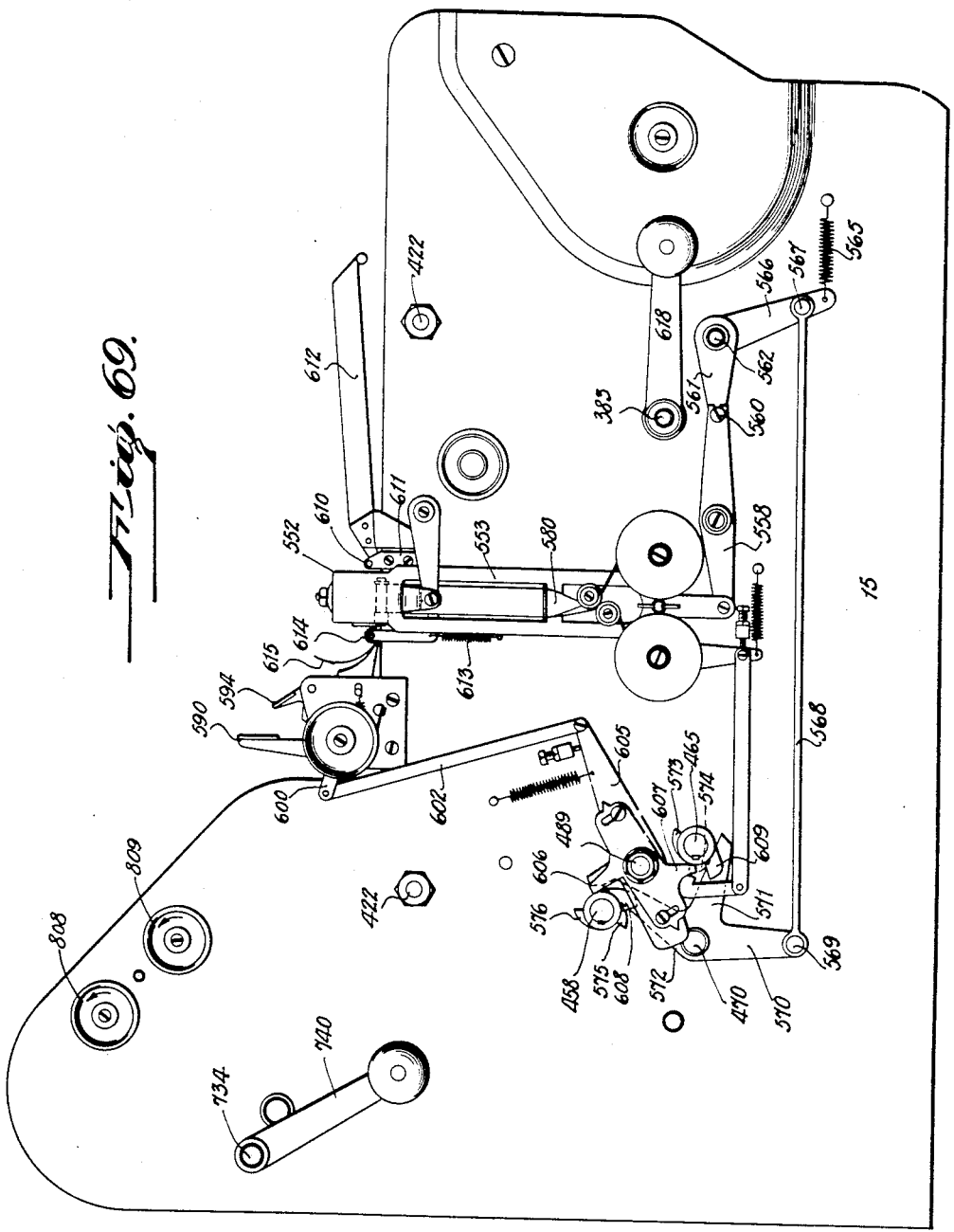

Fig. 69 is a left side elevation of the printing section with the housing removed.

Figure 70:
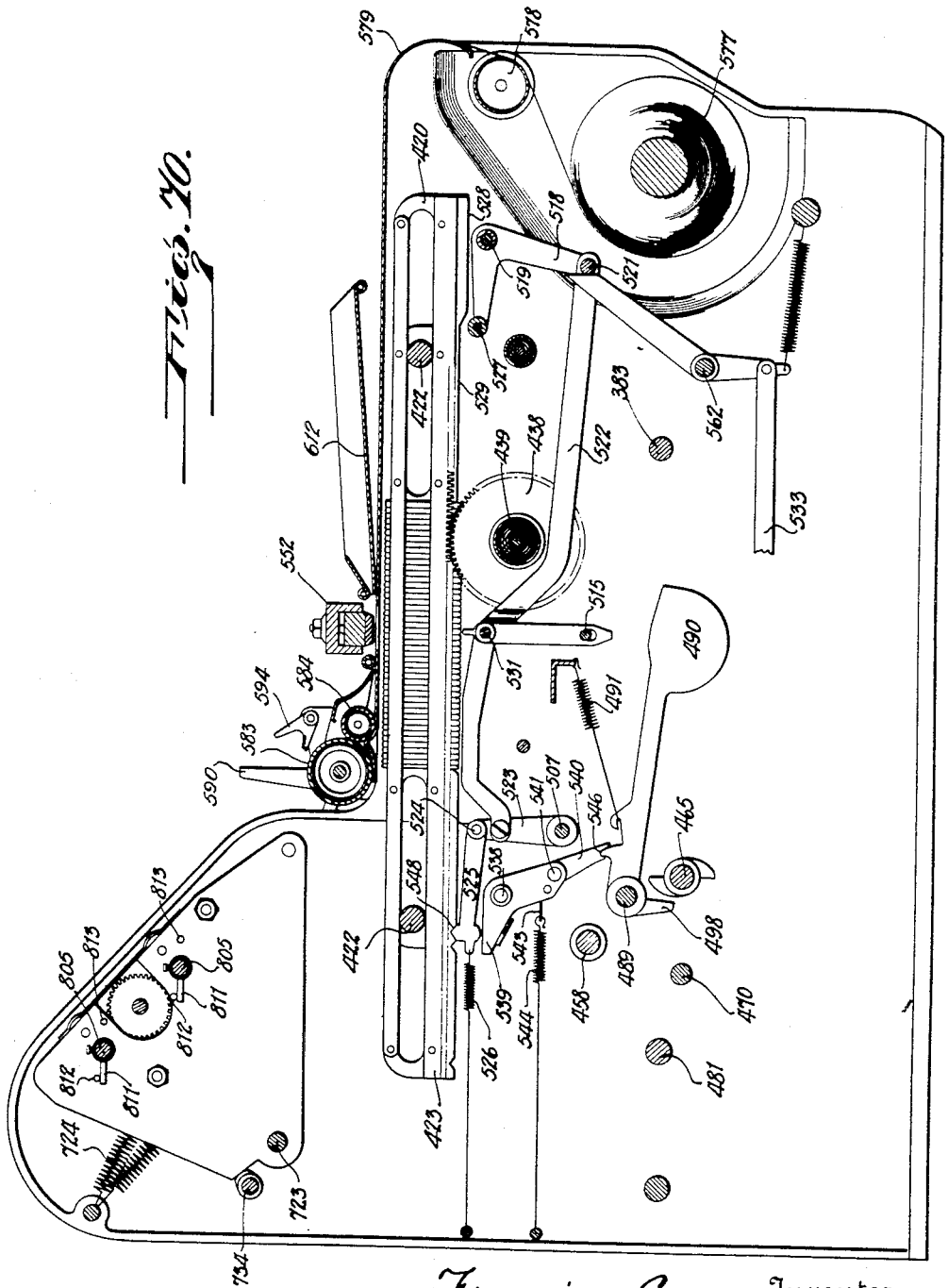

Fig. 70 is a vertical sectional view taken substantially on line 70—70 of Fig. 65.

Figure 71:
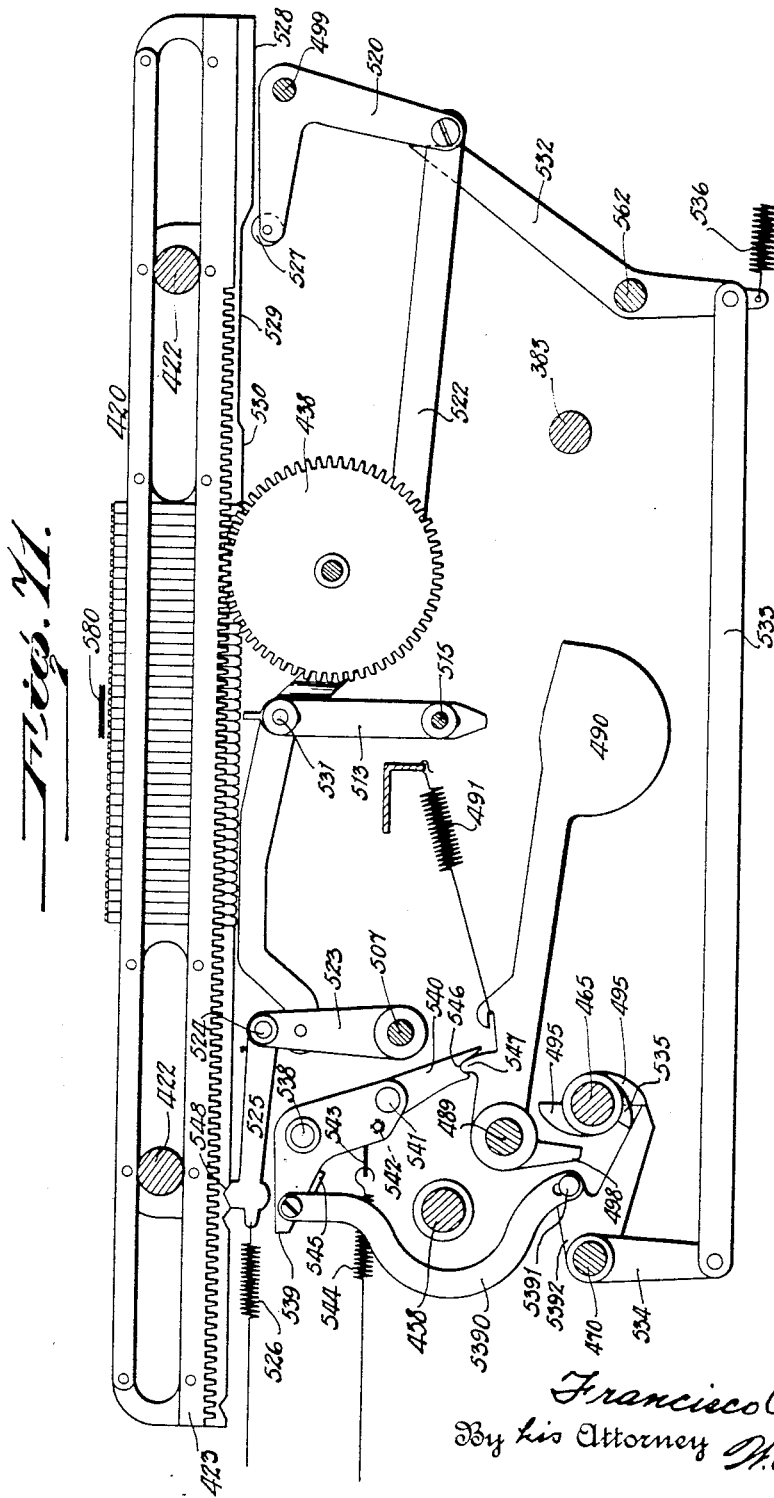

Fig. 71 is an enlarged vertical sectional view showing the highest order printing bar of the item printing mechanism.

Figure 72:
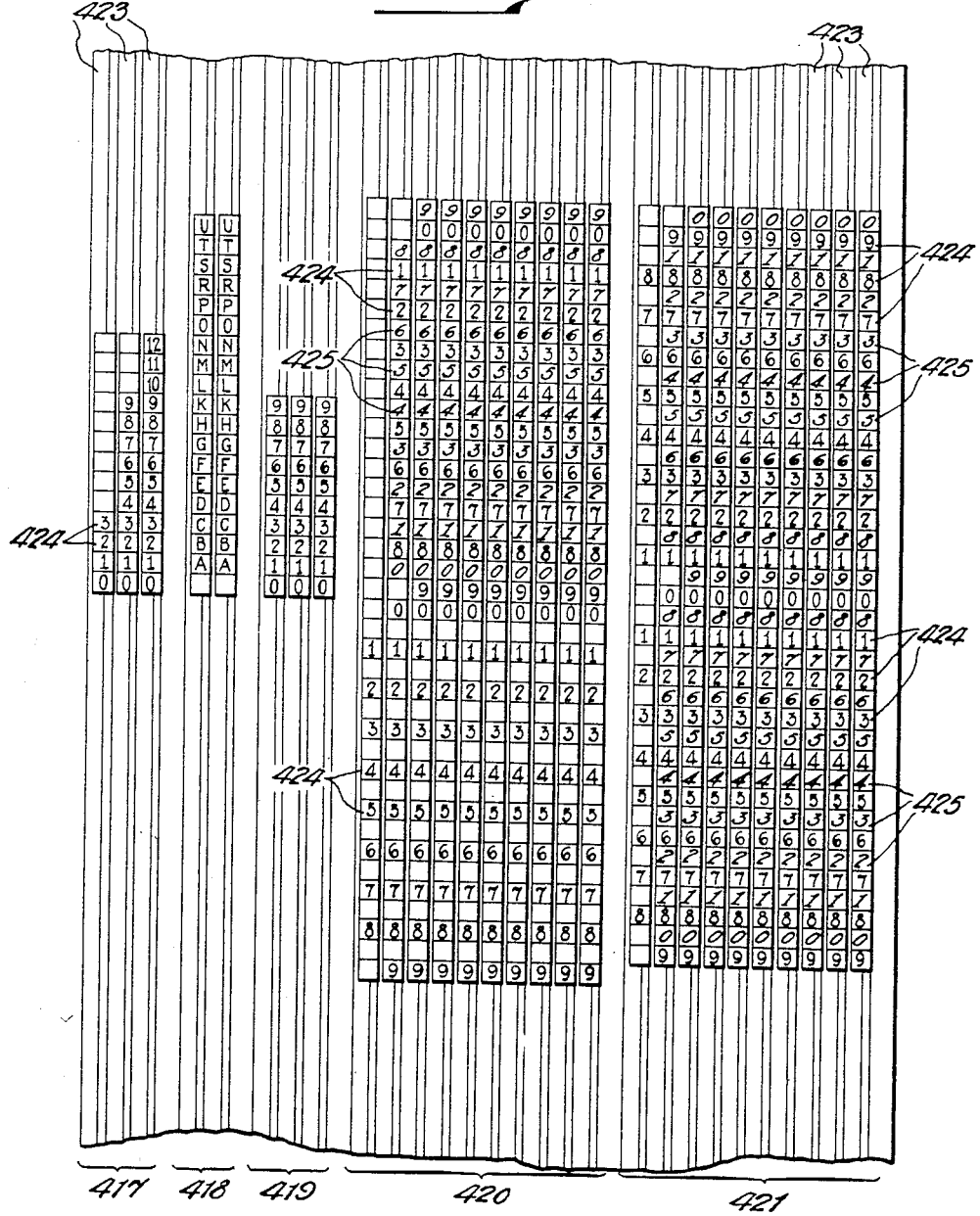

Fig. 72 is an enlarged top plan view of the type and type bars.

Figure 73:
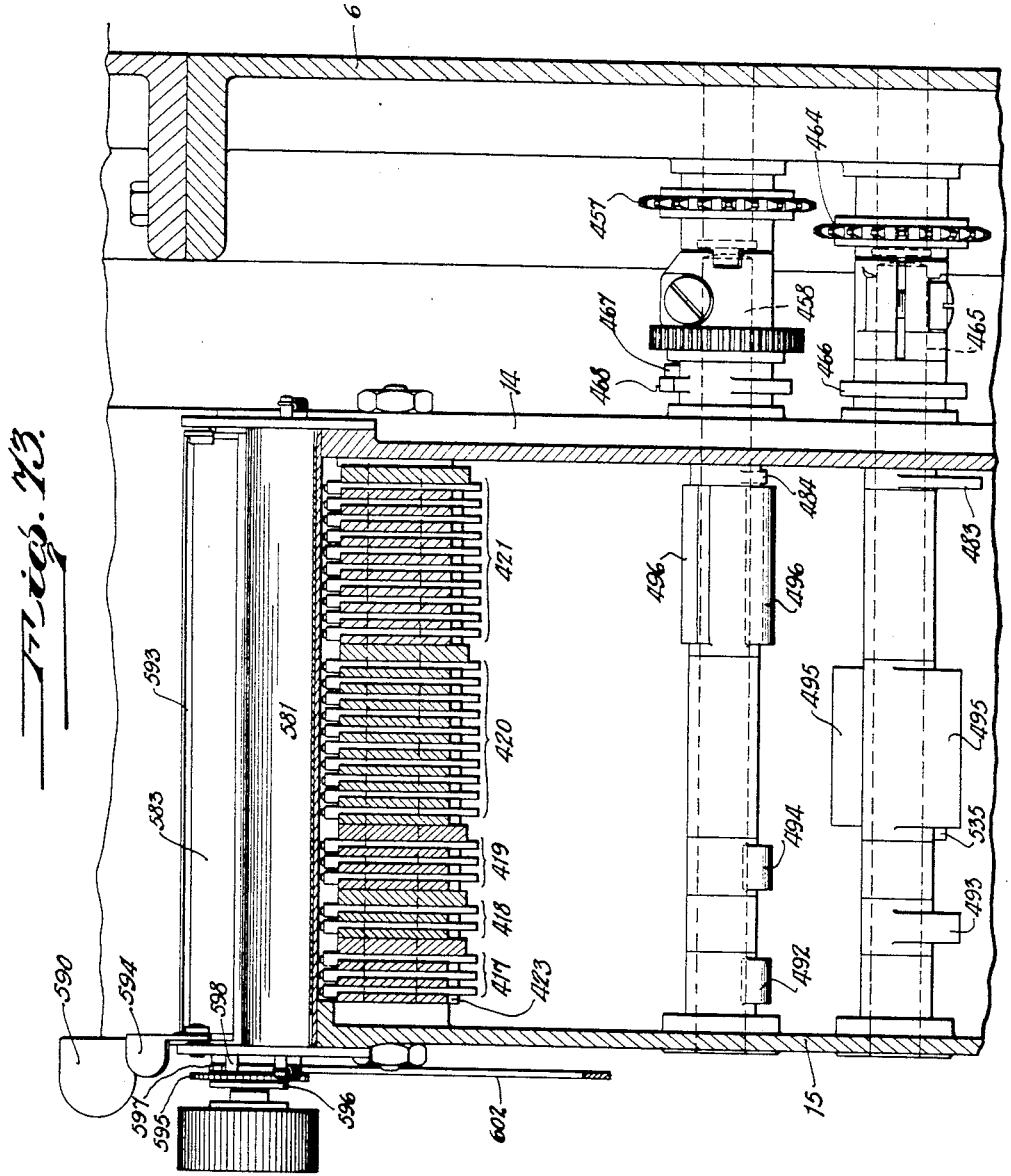

Fig. 73 is a vertical fragmentary left-to-right section of the printing section with parts left out for the sake of clearness.

Figure 74:
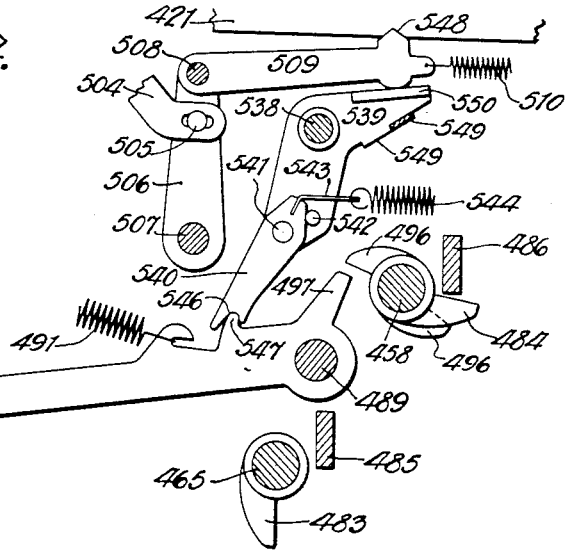
Figure 75:
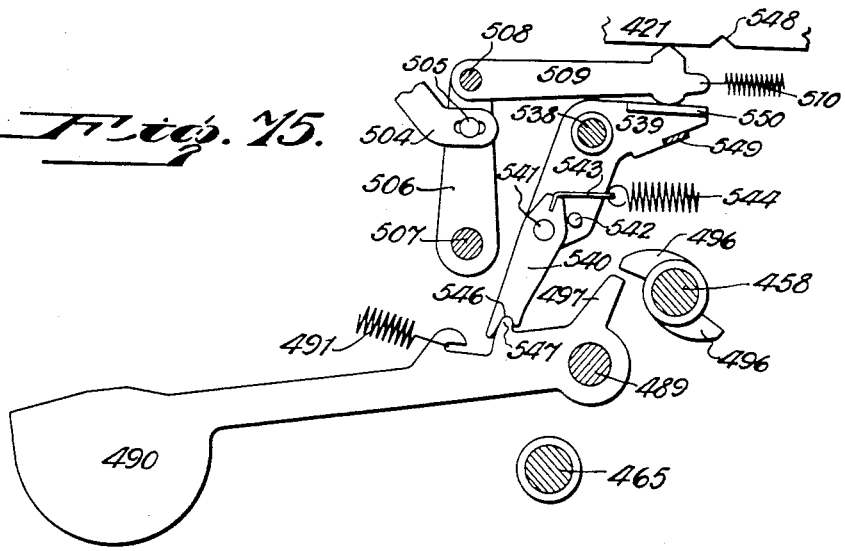
Figure 76:
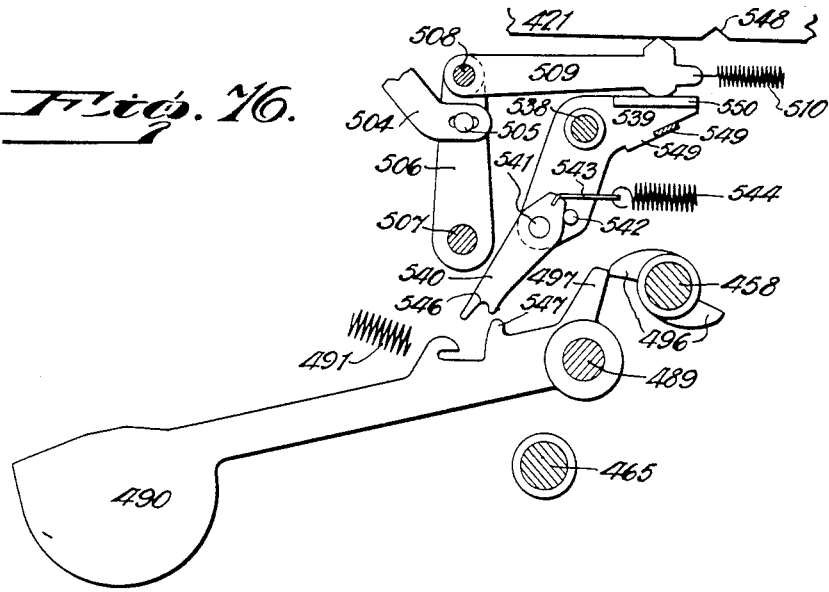

Figs. 74, 75, and 76 are views of the hammer mechanism in different positions.

Figure 77:
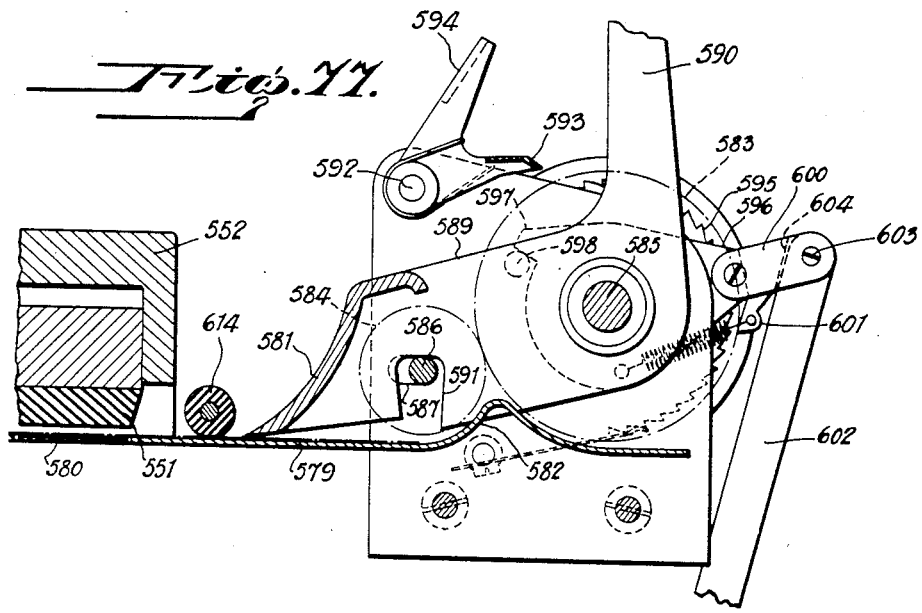

Fig. 77 is an enlarged vertical section thru the paper-feed mechanism.

Figure 78:
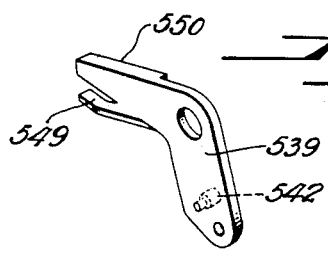

Fig. 78 is a detail perspective of one of the automatic zero latches.

Fig. 79 is a side elevation of the automatic balance listing device.

Fig. 80 is a front elevation of the same.

Figs. 81, 82, 83, and 84 are detail views of certain parts shown in Figs. 79 and 80.

Fig. 85 is a section taken substantially on line 85—85 of Fig. 84.

Figure 86:
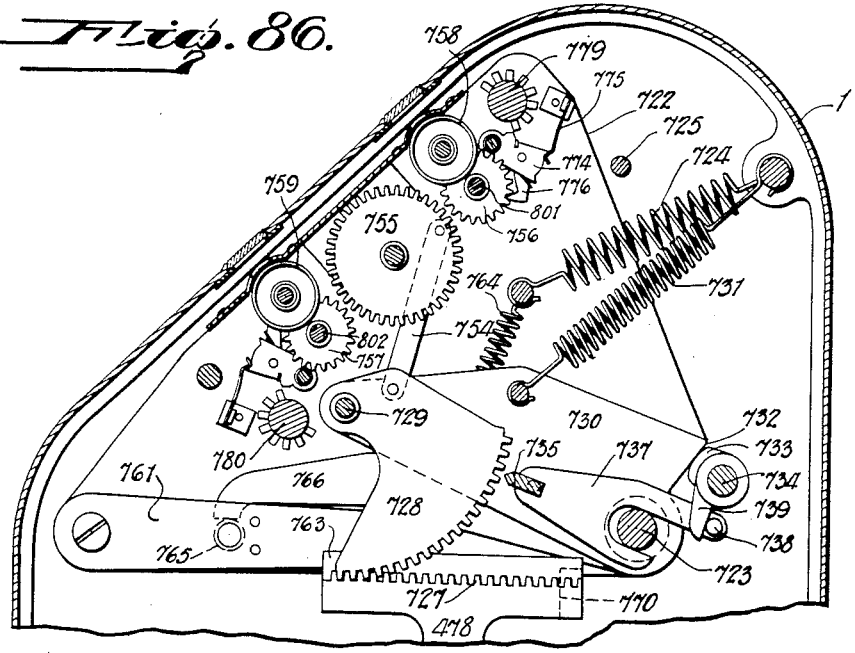

Fig. 86 is a vertical section taken just to the left of the right hand frame 721 of the debit and credit balance mechanism.

Figure 87:
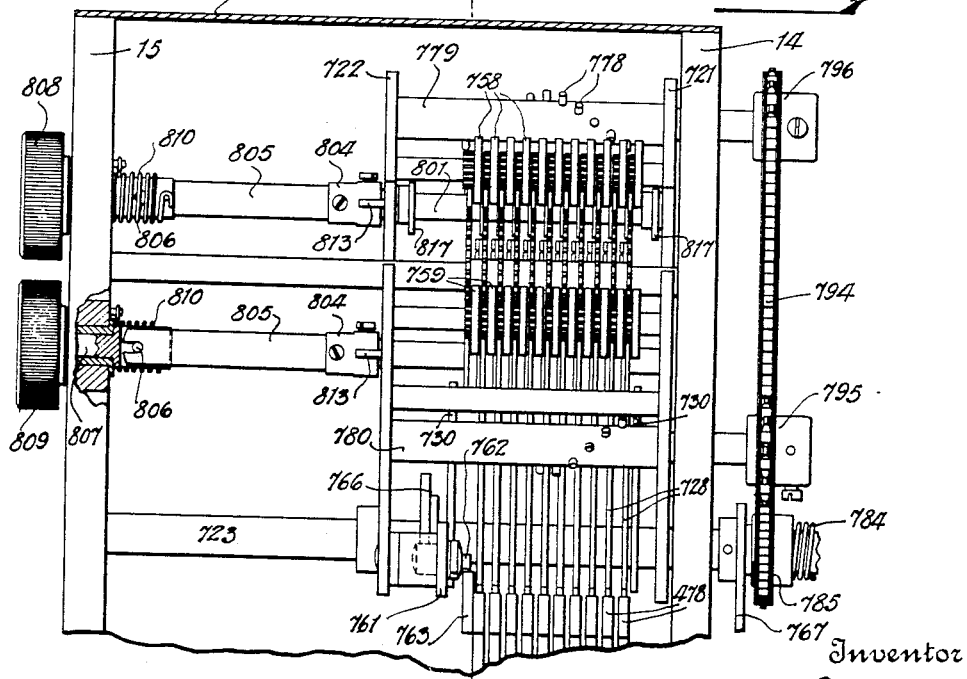

Fig. 87 is a front elevation of the same with the cover and many parts removed to clearly show the debit and credit balance accumulators and actuating mechanism therefor.

Figure 88:
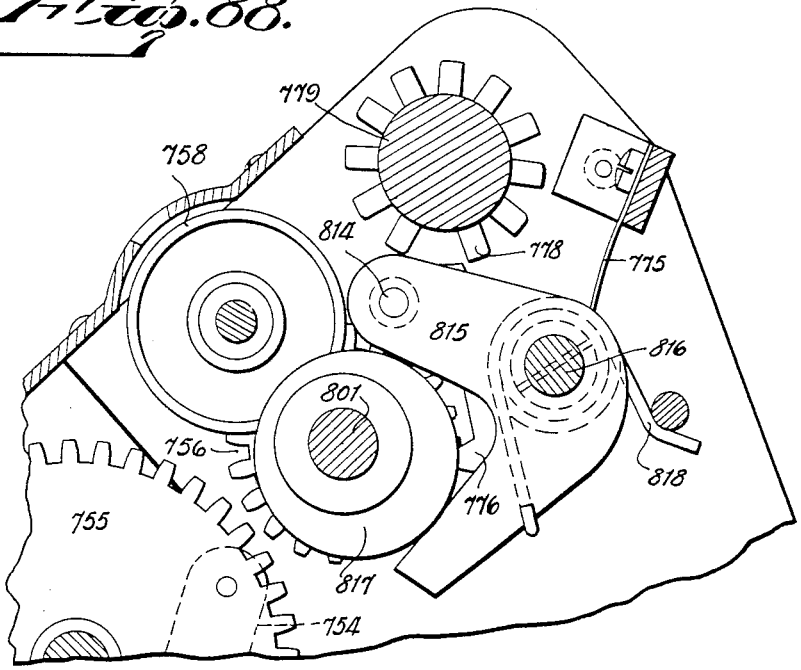

Fig. 88 is an enlarged detail view of the credit balance accumulator taken just to the left of frame 721.

Figure 89:
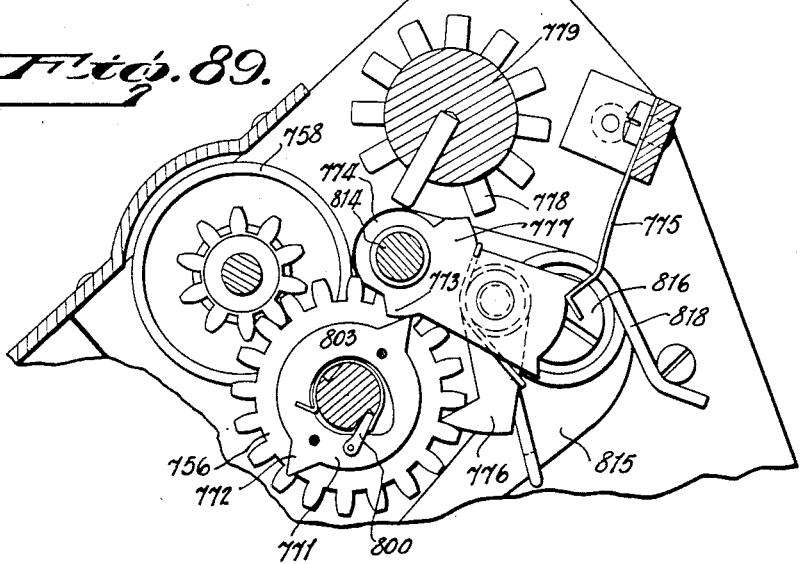

Fig. 89 is a similar view taken between accumulator wheels.

Fig. 90 is a vertical section taken substantially on line 90—90 of Fig. 87.

Figure 91:
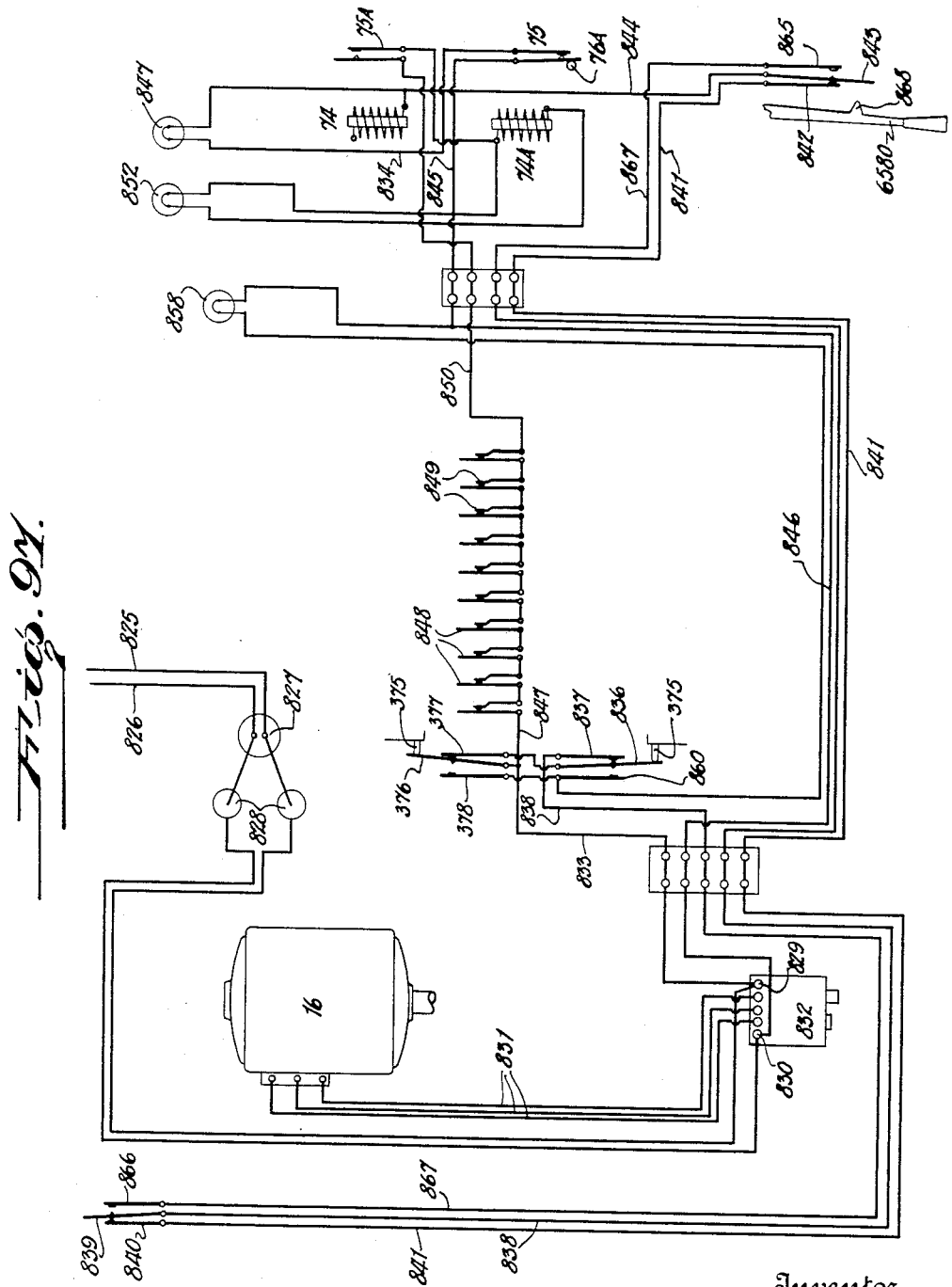

Fig. 91 is a detail section taken substantially on line 91—91 of Fig. 62.

Fig. 92 is a detail perspective of part of the tens-transfer drive mechanism of the debit and credit balance device.

Fig. 93 is a fragmentary detail section substantially at the left side of frame 721.

Fig. 94 is an exploded perspective of the shaft and associated parts of the debit balance accumulator.

Figure 95:
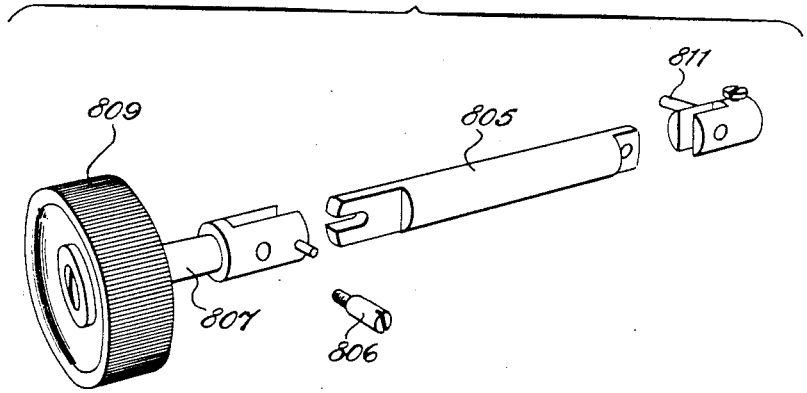

Fig. 95 is an exploded perspective of a zeroizing knob and connections.

Figure 96:
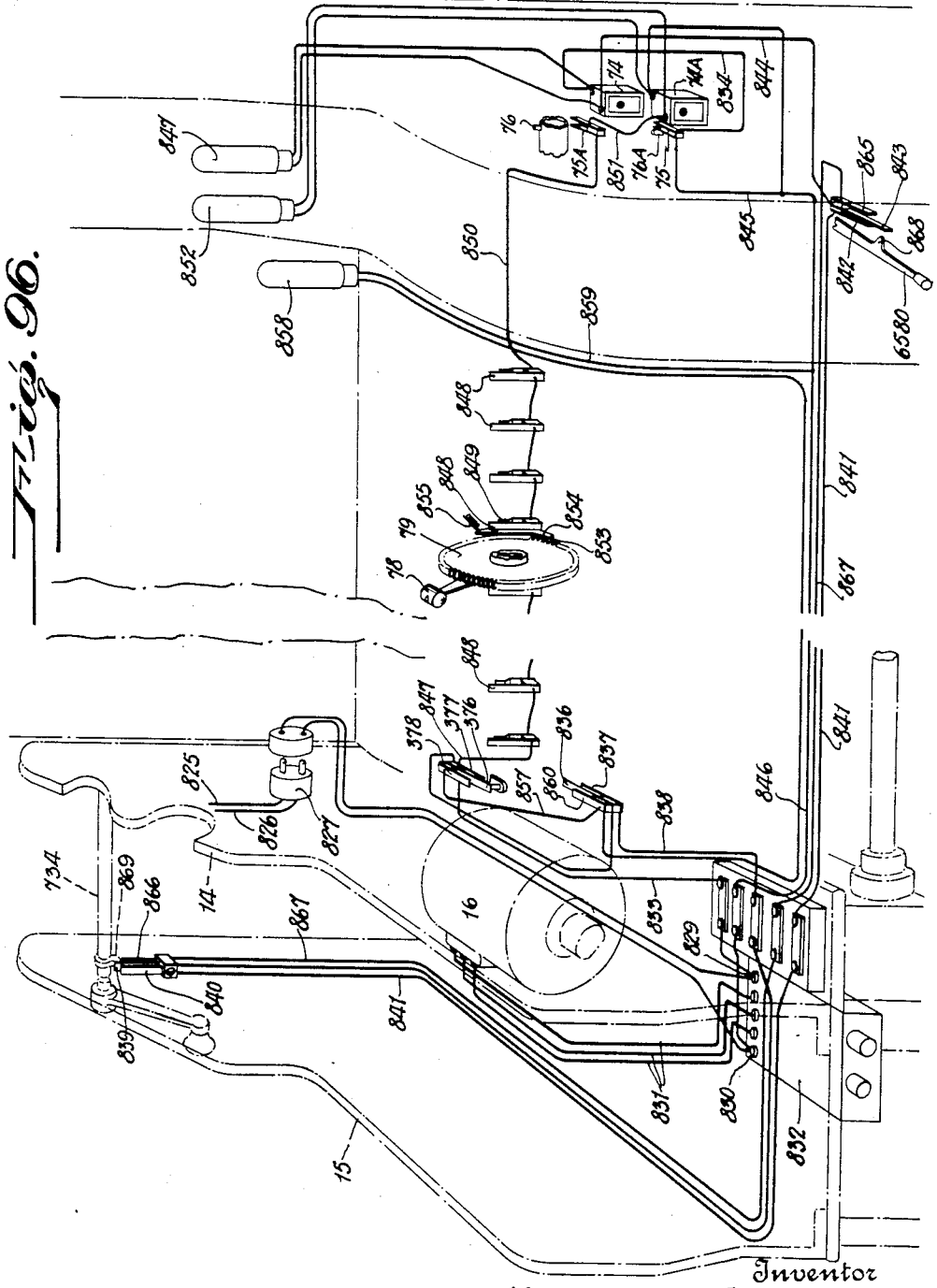

Figs. 96 and 97 are wiring diagrams.

Like characters of reference refer to like parts in all views.

*Framework (Figs. 1-5)*

The machine includes a main framework upon which the working parts of the machine are mounted. A casing 1 comprising several pieces, encloses the machine and may be locked to prevent access to the working parts of the machine by unauthorized persons.

The supporting framework includes a base plate 2, from which rise left and right walls 3 and 4 and right and left supporting frames 5 and 6 of the account storing mechanism. The frames 5 and 6 carry cross frame members 7, which divide the space between these two upright frames into separate sections for receiving the blocks of account sets. A top frame 8 is secured to the upper ends of frames 5 and 6.

Supported on the top of wall 3 is a horizontally disposed plate 9, which supports the selecting unit and also the right hand and intermediate main frames 10 and 11. Plate 9 is formed with a bracket or web which is secured to frame 5.

Supported on the top of wall 4, is a horizontally disposed plate 12, which supports the left-hand main frame 13 and the right and left supporting frames 14 and 15 for the printing mechanism. The plate 12 is formed with a bracket or web which is secured to frame 6.

The framework above described forms a skeleton on which all of the other parts of the machine are supported.

*Driving mechanism (Figs. 6-14)*

An electric motor 16, supported from the main frame member 12, is provided with a shaft 17 carrying a worm 18. The worm 18 meshes with a worm gear 19 pinned or otherwise suitably secured to a shaft section 20 which is mounted for rotation in the worm-housing 21, as is also the shaft 17, the worm-housing 21 depending from frame 12. Pinned or otherwise secured to the right-hand end of shaft section 20, is a clutch member 22 the end of which extends into and is enclosed by a clutch-housing 23 pinned on the left-hand end of a shaft section 24 mounted for rotation in bearings in frames 10 and 11. The inner end of clutch member 22 is formed with teeth 25, and in each of the serrations between the teeth 25, is placed a hardened steel roller 26.

This construction is such that when the motor 16 is operated, shaft 17 rotates worm 18 which turns worm-gear 19 thereby driving shaft-section 20 and clutch member 22. The teeth or cams 25 of member 22 force the rollers 26 into engagement with the clutch-housing 23 thereby securing the two shaft sections 20 and 24 together to operate as a single section shaft.

Fixedly mounted on shaft section 24, is a gear pinion 27 which meshes with an idler gear 28 pinned on a shaft 29 having its bearings in frames, 10 and 11. Gear 28 meshes with a gear 30 rotatable upon a shaft 31, but confined against movement axially thereof by collars or other suitable means. The gear 30 meshes with a gear 32 rotatable upon a shaft 33, but confined against movement axially of this shaft. Shafts 31 and 33 are themselves rotatable by the respective gears 30 and 32 upon operation of respective clutch means, presently to be described. The shafts 31 and 33 are the two main shafts of the machine, and from them are driven most of the working parts of the machine.

For hand operation, there is provided a hand crank 34 which may be removably secured to the end of a short shaft 35 mounted for rotation in bearings in the frames 10 and 11, and extending sufficiently to the right of frame 10 to receive crank 34. Shaft 35 has a gear pinion 36 pinned to it, which gear pinion meshes with a gear 37 pinned to a short shaft 38 having bearings in the frames 10 and 11. Also pinned to shaft 38 is a gear 39 which meshes with the afore-mentioned gear 28. The gears 36, 37 and 39 form a reduction train for effecting easy manual operation.

Upon turning the hand crank 34 clockwise (as viewed from the right-hand side of the machine), the gear 28 will be rotated, and with it gears 30, 32 and 27, and shaft portion 24. In this case, the consequent rotation of housing 23 will cause rollers 26 to move into the deep portions of the notches between teeth 25, thereby de-clutching the shaft portions 24 and 20, so that the former may rotate independently.

*Clutch mechanism for main shafts (Figs. 1 and 11 to 17)*

Extending from the front of the machine are two manipulative levers 40 and 40A, the first of which controls the clutch for the shaft 33, and the second of which controls the clutch for the shaft 31. As the means whereby each manipulative lever controls its clutch member is the same as the means of the other, I shall describe in detail only the train of connections from lever 40 to shaft 33, although in the drawings, both clutch devices are shown with the corresponding parts of the train from lever 40A to shaft 31 indicated by like reference numerals, but primed with an A (Fig. 13).

The levers 40 and 40A have respective fingerpieces 41 and 41A, and both levers are pivoted on a cross rod 42 carried by the main frames, 10 and 11. The lever 40 is constructed with two depending arms 43, which carry between them a slidable abutment piece 44. Through a central aperture in member 44 passes a rod or link 45. A spring 46 maintains lever 40 in elevated position when such lever is not in depressed position, and a stop bar 47 carried by frames, 10 and 11 limits the forward movement of blocks 44 and 44A and upward movement of levers 40 and 40A. Coiled about the rod 45 is a compression spring 48, one end of which rests against member 44, and the other end of which rests against a block 49 pinned or otherwise secured to rod 45. The inner end of rod 45 is provided with a pin 50 which works in a slot in the upper arm of a bellcrank lever 51 which is normally pulled in an anti-clockwise direction by a spring 52 anchored to a rod 53 carried by the frames 10 and 11. Bell-crank 51 is rotatably supported on a pivot rod 54, fast in frames 10 and 11.

Mounted on a pivot rod 55, also carried by frames 10 and 11, is a pawl 56, the hooked rear end of which normally rests in rear of block 49, and the front end or tail of which extends under an adjustable screw 57 carried by the lever 40. A spring 58 returns pawl 56 to normal. Springs 46 and 58 are anchored to a rod 59 supported by frames 10 and 11.

Pivotally secured to the rearwardly extending arm of lever 51, as at 60, is a downwardly extending link 61, the lower end of which is pivotally connected as at 62 to one arm of a rock lever 63, pivoted at 64 to a bracket from frame 10. The lower arm of lever 63 is bifurcated and straddles the end of a clutch bail 65. The clutch bail 65 is pivoted to a stationary bracket, and has its pins 66 engaging a groove 67 in a clutch member 68, which is slidable on shaft 33, but secured by a key or other suitable means for rotation with said shaft. The clutch member, 68, is formed with clutch teeth on its left-hand end, which are adapted to engage clutch teeth on the right-hand side of gear 32, which it will be recalled is free on shaft 33, and rotates thereon as long as the motor is operating. The clutch member 68 is provided with a pin carrying an anti-friction roller 69 which is normally seated in a notch 70 in a collar 71 secured to the main frame 10.

The collar 71 of shaft 33 is provided with two notches, 70, whereas the collar 71A of shaft 31 is provided with a single notch 70A. The reason for this is that shaft 33 is rotated in two steps, the first step for bringing the required account into active relation to the accumulating devices, and the second step for returning the account to storage as will be presently set forth in detail; and shaft 31 is rotated a full revolution at a time, this shaft controlling the registering of items. In the machine as illustrated shaft 33 rotates 165° between its "home" or normal position and its intermediate position, and 195° from intermediate position to "home" or normal position.

The link 61A is sufficiently longer than link 61 to compensate for the difference in distances from pivot 54 to shafts 31 and 33.

In operation, when the operator rocks lever 40 by depressing finger-piece 41, the arm 43 moves block 44 along rod 45, compressing spring 48 and storing power therein sufficient to quickly overcome spring 52 when spring 48 is released. Spring 48 is maintained under tension by pawl 56 until member 57 strikes pawl 56 rocking the latter out of engagement with block 49. Block 49 and rod 45 are now snapped quickly rearwardly, thereby rocking lever 51 to depress link 61. Link 61 rocks lever 63 and bail 65, which forces clutch member 68 into engagement with the clutch portion of gear 32. Further rotation of gear 32 by the motor will now effect rotation of shaft 33. Immediately after the clutch is engaged, the operator will release the finger-piece 41, so that lever 40 will be returned to normal by spring 46, and the tension of spring 48 will be released. Spring 52 now exerts its tension on lever 51 to effect de-clutching, but such action is temporarily prevented by the roller 69 riding on the high part of collar 71. As soon as roller 69 is brought opposite the next notch 70, spring 52 becomes effective, raising link 61, and disengaging the clutch.

*Clutch interlock (Figs. 9 and 11 to 19)*

It is desirable that with the machine in normal condition only that clutch which controls shaft 33 may be rendered effective, and that the clutch controlling shaft 31 shall be operable when the shaft 33 is in its intermediate position (i. e., 165° from "home" or normal). For this purpose, an electrically controlled interlock is arranged in operative relation to the two clutch mechanisms, which interlock is constructed as follows:—

The bell-crank levers 63 and 63A have their horizontal arms arranged to be engaged by latches 73 and 74A, pivoted to suitable supporting brackets respectively. Each latch is connected to the end of the core of a respective solenoid 74, 74A. The leads from solenoids 74 and 74A connect to respective pairs of contact carriers 75 and 75A, one of each pair being springy, so as to constantly tend to open its circuit. Mounted on clutch members 68 and 68A are suitably insulated pins 76 and 76A, which are adapted respectively to engage the springy contactors 75A and 75. In the normal position of the machine, the pin 76 is 165° away from the contact member 75A with which it co-operates, so that solenoid 74A is de-energized and latch 73A is moved by means of a spring suitably connected, and latches under the clutch lever 63A, and operation of finger-piece 41A cannot effect clutching of shaft 31 to the main driving mechanism. However, in the normal or "home" position of shaft 31, its correlated pin 76A is in engagement with its springy contact member 75, closing the circuit through solenoid 74, thereby retracting pawl 73 to ineffective position so that the lever 40, if operated, will effect clutching of shaft 33 to the operating mechanism. When however, shaft 33 has been moved to its intermediate position, the pin 76 will, upon disengagement of the clutch member 68 close the contact members 75A, thereby effecting energizing of solenoid 74A and moving of latch 73A to ineffective position, so that with shaft 33 in its intermediate position, shaft 31 may be operated. It will be understood that the throwing in of the clutch for shaft 31 effects breaking of the circuit through solenoid 74, so that shaft 33 cannot be operated while shaft 31 is in motion.

*The main portion of the machine*

It may be desirable at this point to indicate generally the chief objects attained by the mechanism of the main portion of the machine and the manner of attaining these, so that some idea may first be had of the structure as a whole, before taking up the construction in detail.

While the present machine includes printing mechanism and other important adjuncts, it will be simpler to consider first the mechanism as a simple registering and account storing mechanism. With this in mind, it may be stated that the machine consists of the following mechanism: (1) Item setting means whereby items may be set up positively and negatively; (2) Registering or accumulating devices; (3) Means for entering items set up on the item setting means into the registering devices; (4) Account storing devices; (5) Transferring means for transferring any selected account from the storing devices to the registering devices and vice versa; (6) Account selecting devices.

The machine, therefore, has a plurality of digit setting levers which are movable from normal or neutral (zero) position in one direction for setting up positive items and in the opposite direction for setting up negative items.

These levers control means which upon operation of the necessary operating lever enter such items into the registering or accumulating wheels concomitantly with the return of the setting levers to normal position.

The register wheels may then be thrown into co-operation with one of a multiplicity of account storing sets, and the amount thereon transferred to such set. When desired to again add items to this balance or subtract them from it, the balance is first transferred from the account storing set to the registering wheels and then items set up as before are accumulated and returned to the storing set.

Having thus briefly considered the central por-

The item setting mechanism (Figs. 20 to 25)

The front casing of the machine is provided with a plate formed with a plurality of slots 77 through which extend manipulative digit setting members or finger pieces 78, there being one setting member for each denominational order of the largest item which the machine is constructed to receive. Printed, painted, engraved or otherwise visually indicated on the casing 1 adjacent to each of the slots 77, is a zero and two sets of the nine significant digits. The several zeroes are arranged in contiguity to the respective members 78 when the latter are in normal position; and the sets of significant digits are arranged upwardly and downwardly therefrom, the ones being arranged next to the zero, the twos farther away, etc. Preferably the upper sets of significant digits are black on a white background and the lower sets are red on a black background, so as to indicate credits and debits or addition and subtraction, respectively.

Each setting member 78 is rigidly secured to an actuating disk 79 provided with teeth 80. The several actuator disks 79 may be considered as mounted freely on a shaft or rod 81 supported at one end in the frame, 10, and at the other end in a bracket extending from the frame, 13, of the machine. The disks are actually freely supported on nested tubular shafts supported by shaft 81.

By raising or lowering the finger pieces 78 from normal zero position, any desired item may be set up additively or subtractively. The actuators 79 may be retained in set position by the inertia of the parts with which they are connected or by any suitable well-known form of detent.

There is at the left an actuator 79 provided with a setting member 78A which is shorter than the other setting members; but as this is used only in connection with double-entry, it will, for the present, be disregarded.

Locking means for the setting mechanism (Figs. 20, 22, 25, and 26)

Situated below the portion of the casing formed with the slots 77, is a locking plate 82 which is slidably supported by headed pins or bolts 83 passing through slots 84 in the locking plate 82 and secured in the casing of the machine. This plate is provided with a slot for each setting member 78, each of these slots consisting of an upper leg 85 terminating in an abrupt shoulder 86 at its lower end, a lower leg 87 terminating in an abrupt shoulder 88 at its upper end, and an obliquely disposed portion connecting the two legs and having an upper inclined edge 89 and a lower inclined edge 90.

The plate 82 is normally centralized by the following means. Studs 91 are mounted in lips depending from the stationary keyboard frame and carry collars 92. Springs 93 tend constantly to hold the collars 92 inwardly against fingers from the plate 82. When the plate is moved to either side, one of the collars 92 is moved outwardly, and its spring is tensioned for returning the plate to central position when such movement is permitted.

Each of the setting members 78 passes through a respective one of the slots in the plate 82 and stands normally in the oblique portion thereof. Upon moving any one of the members 78 upwardly, it engages the respective inclined edge 89, shifting plate 82 to the left so that all of the other members 78 stand above their respective shoulders 86, and thereafter no other members 78 may move down until all have again returned to normal or neutral position. In like manner, when one of the members 78 is moved downwardly from normal, it will engaged its respective inclined edge 90 and move the plate 82 to the right, bringing all of the shoulders 88 over the rest of the members 78 so as to prevent upward movement of any member 78 until all have returned to normal.

In this manner, I insure against some of the setting members being moved for additive work and others for subtractive work, at any single operation of the machine.

The plate 82 is formed with an aperture 94 which, when the plate is in its central position, is in registry with an aperture in the casing, so that a suitable locking bolt may be entered through both apertures and locked so as to prevent unauthorized use of the machine.

The registering mechanism (Figs. 9, 10, 20 to 25 and 27 to 34)

The registering or accumulating mechanism consists essentially of a plurality of denominational register or accumulator gear wheels 95. Each wheel 95 is mounted on a respective short shaft 96, and each shaft 96 is carried between a pair of rock arms 97. Each pair of rock arms 97 is rigidly secured to a respective bell-crank 98, and all of the rock arms 97 and bell-cranks 98 are pivotally mounted on a pivot rod 99 supported by the frames 11 and 13 of the machine. The several bell-cranks 98 are provided with pins carrying anti-friction rollers 100 which ride in cam races 101 cut in respective box cams 102, there being a respective cam 102 for each roller 100. The race of each cam is formed with a drop 103 and a slight rise 1040 and a larger rise 104 connected by inner and outer concentric portions.

The drops 103 of all of the cams are in alignment, as are also the rises 1040, but the rises 104 are spaced apart so that after the gears 95 have been just disengaged by rises 1040, the rises 104 will operate one after another of the rollers 100, beginning with the roller associated with the accumulator wheel 95 of lowest order and proceeding seriatim to that of highest order. This is to take care of the carrying or tens-transferring which is done by mechanism such as shown in my United States Patent, No. 1,551,009.

All of the cams 102 are fast on shaft 31, which shaft may be rotated by the operating mechanism as hereinbefore set forth.

Mounted on or formed integrally with a sleeve 105 arranged on shaft 31 at the left of the cams 102, is a cam 106. The sleeve is slidable on the shaft 31 for a purpose to be later set forth, and is keyed to the shaft so as to rotate with it. For present purposes, the sleeve 105 may be considered as fixedly secured to shaft 31, with its cam 106 in the plane of a roller 107 mounted on the inner end of a lever 108 secured to a rock shaft 109 for rocking the same, said rock shaft 109 having its bearings in the frames 11 and 13. Secured to shaft 109 near opposite ends of the said shaft are rock arms 110, the left-hand one of which may be preferably formed integrally with the lever 108. Pivotally secured on the front end of each arm 110, is a pair of links 111, the upper ends of which are pivotally connected to respective levers 112 and 113. The levers 112 are connected by a bridge or bail 114, and the levers 113 by a similar member 115. The bail 114 normally stands above all of the setting members 78, and bar 115, below the same. A spring 116 returns the parts to normal.

The operation of the parts above described is as follows: If the clutch for shaft 31 is free to operate, an item having been set up on the members 78, the finger piece 41 is pulled down, thereby causing a rotation of shaft 31. Almost immediately the rollers 100 are operated by the drops 103 of their cams, whereby all of the bell-cranks 98 and rock arms 97 are simultaneously rocked counter-clockwise, (as viewed from the right). This brings all of the registering gears 95 into mesh with their respective actuators 79.

Cam 106 now engages rollers 107 rocking lever 108 and arms 110, drawing down links 111, rocking levers 112 and 113, and moving the bails toward the zero line of the keyboard, whereby any moved setting members 78 are moved back to normal, thereby clearing the keyboard. The movement of members 78 is transmitted to actuators 79 and by them to the respective register wheels 95.

The register wheels having been actuated, the rollers 100 now encounter the rises 1040 and are simultaneously disengaged, and then encounter rises 104 of their cams 102 seriatim, whereby the registers are moved back to normal, one at a time beginning with the lowest, and during this movement any necessary carry or tens-transfer is accomplished. Constantly in mesh with the accumulator wheels 95 are respective gears 117 carrying drum dials upon which are printed or otherwise indicated indicia suitable for indicating through sight openings 118, the amounts standing at any time on the accumulators 95. These indicators and their shiftable flash plate will be more fully described in connection with the indicating of debtor and creditor balances.

There are also pinions 119 freely mounted on a pivot rod 120 secured in frames 11 and 13, which pinions constantly mesh with the teeth 80 of the respective actuators 79. Secured to each pinion 119, is a respective drum dial 121 of the usual "nineteen-point" type, so as to indicate the amount set up on the keyboard.

The right-hand arm 110 normally rests against a pin 122, which normally prevents roller 107 from quite touching the low concentric part of the periphery of cam 106. Pin 122 is carried by a lever 123 freely pivoted on shaft 109. Lever 123 is formed with a finger piece 124, and is held in its upper or normal position by a spring 125 anchored to a bar 126 carried by frames 11 and 13. A guide 127 prevents lateral displacement of member 123.

If an item is set on the keyboard, operation of member 124 will effect rocking of elements 110 and 109, so as to clear the keyboard without effecting any registration. Member 124 is therefore a correction key.

*Account storing devices (Figs. 2, 11, 20 and 35 to 42)*

As hereinbefore stated, a multiplicity of account balances may be stored in the machine, and any one called up at the will of the operator and transferred to the register wheels 95. For this purpose, the machine is provided with a plurality of independent sets of amount storing devices having common transmitting means for transferring the amounts stored in any desired account-set to the register wheels and transferring the amount in the register wheels to the required account-set.

To this end, there is provided a plurality of account sheets, each of which includes means for storing the balances of a single account or group-account. Each account sheet as shown includes ten racks 128 although more or less may be used, according to the intended capacity; each of the racks is mounted on the underside of a plate 129, the stem of the rack being guided by lugs 130 which are stamped downwardly from the plate 129, one at each side of each rack stem. There is a respective plate 129 for each account sheet.

On the underside of the plate 129 is a draw bar 131 guided between lugs 132 of L-shaped cross-section, and which are stamped downwardly from the plate; and for each rack an abutment 133 is formed on the draw bar 131 by pressing, which abutment is normally spaced away from the back of the respective rack. Each draw-bar 131 is also formed with detent elements 134, one for each rack and normally engaging the respective racks. Springs 135 tend constantly to force the racks 128 into engagement with detents 134. By pulling the draw bar 131 to the right as viewed in Fig. 39, the springs 135 cause the racks to follow their detents and be moved about the pivots constituted by the lugs 130 guiding the stems thereof so that they attain the position shown in Fig. 36. In this way, the teeth of the rack are brought into operative relation with long pinions 136. As soon as the racks engage pinions 136, farther movement of bar 131 removes the detents from the racks and brings lugs 133 into position for locking the racks in the engagement with the pinions.

In addition to the draw bar 131 there is also provided a strap member 137, lodged between ears 138 formed on the underside of the plate 129. The draw bar 131 and the strap 137 being on the underside of the plate 129, retain the racks between the guides 130. The selection of an account is effected by employing latch members 139, each pivoted on a respective draw bar 131, at 140, and connected to the respective draw bar is a spring 141 tending to push the latch 139 in a clockwise direction as viewed from above. The draw bars having been pulled to move the racks into mesh with the pinions 136, the racks are in a position to be read by moving them to zero position by means of the pinion 136, the zero line being the datum line for the construction herein described. In Fig. 36 the three left hand racks are in the zero position. The fifth rack from the left is in maximum displacement, recording the numeral 9, and the others are in the intermediate positions.

The return of the racks from the position shown in Fig. 36 to the position shown in Fig. 39 is effected by return of the draw bar, 131, into initial position.

The account sheets are located in open frames or boxes 142, each box forming a nest of one hundred account sheets, although of course more or less may be made as a unit. The lowermost box includes account sheets 0—99, the next, the account sheets 100—199, and the next above will include the account sheets 200—299, and so on. In each nest, the plates 129 are supported in slots in the sides of the box 142 and by elements 132, the latter being arranged at different positions on adjacent plates, so that they will not enter the hole left in the adjacent place by the stamping down of its lugs.

In the machine described ten nests are employed involving one thousand account sheets, although more or less could be used according to the desired capacity; and the pinions 136 are made long enough to pass through all the account sheets from the top to the bottom, whereby there is a long pinion for each column of racks so that on any account sheet being selected it can be read by the agency of the long pinions. The several pinions 136 have bearings in the frame members 7 and 8.

The latches 139 may be selected at the will of the operator, by means hereinafter set forth.

*Transferring from the storing elements to the registers (Figs. 9, 10, 20, 35, 36, 39 and 42 to 45)*

The long pinions 136 with which the racks 128 of the account sets are adapted to engage, are provided centrally with bevelled gear pinions 143 which constantly mesh with gears 144 rotatably mounted on a cylindrical bar 145. Bar 145 is secured in the frames, 5 and 6, and is apertured as at 146 to permit passage of the reduced central portions of pinions 136.

The denominational gears 144 are formed with spur teeth which mesh with respective gears 147. The gear 147 of lowest order is secured to a shaft 148, and the other gears 147 are secured to sleeves or tubular shafts 149 which are nested on shaft 148 and run to the printing mechanism as will be later more fully described. Each gear 147 meshes with a respective pinion 150 which in turn meshes a respective accumulator gear 95. All of the pinions 150 are freely supported on a pivot rod secured in frames 11 and 13.

As shown, each accumulator gear 95 has fifty teeth, although more or less could be used, according to the design desired; and each gear 95 has secured to it a disk 151 formed with five teeth 152 and five notches 153, adjacent the teeth 151. A concentric surface 1520 joins one notch 153 with the next tooth 152.

Mounted coaxially with the accumulators when they are in their rearward position is a bridge or bail 154, which is mounted upon stub shafts 155 fixed in the side frames 11 and 13, and rotatable thereon. Secured in the bail 154, is a pivot rod 156 carrying a plurality of small bell-crank levers 157, one for each disk 151 and normally having its tooth-shaped free arm 158 standing in rear of one of the teeth 152, when the respective accumulator wheel is in zero position. The other arm of each bell-crank 157 is pivotally connected at 159 to a respective link 160, pivotally connected at 161 to the upper arm of a respective bell-crank 162. The several pivots 161 are coaxial with the accumulator wheels when the latter are in their rearmost position. All of the bell-cranks 162 are mounted on a single pivot rod 163 which is supported in the frames 11 and 13 of the machine.

Secured to, or formed integrally with each side of the bridge or bail 154, is a respective gear element 164, which meshes with a respective gear segment 165 secured to a stub shaft 167, shafts 167 being rotatably supported by the frames 11 and 13, respectively. Outside the frames 11 and 13 the stud shafts 167 carry arms 168 provided with anti-friction rollers 169 travelling in cam races 170 formed in respective box cams 171 secured to and rotatable by the shaft 33.

When the operator depresses the finger-piece 41, after the desired account-set has been selected, shaft 33 is turned through its first increment of rotation as hereinbefore described, thereby rocking arms 168 counter-clockwise (as viewed from the right), so that the gear segments 165 rotate the gear elements 164 through a portion of a revolution. The turning of the members 164 causes the bridge 154 to rock rearwardly, carrying all of the links 160 and bell-cranks 157 with it. The tooth-like arms 158 of bell-cranks 157, engaging notches 153 of the several disks, cause gears 95 to rotate pinions 150, gears 147, gears 144, bevel pinions 143, and long pinions 136, thereby drawing the storing elements 128 of the selected account-set outwardly toward the front of the machine. The bridge 154 moves somewhat more than a corresponding nine-digit movement of the accumulator wheels 95; and, if any bell-crank 157 remains under control of its accumulator wheel, the same will be moved nine digit spaces, before being released.

It is necessary to release the several numeral wheels from the bridge 154 at different points in their travel, so as to correctly transfer to the accumulator wheels 95, the amount which has been stored in the selected storing device or account-set. This means will now be described, reference being now had particularly to Fig. 43.

Each of the bell-crank levers 162, has secured to it a lower arm 172 adapted to be stopped by a finger 173 of a respective lever 174. A spring 175 for each bell-crank 162 tends constantly to rotate the latter clockwise, but is prevented from doing so by the engagement of elements 172 and 173. Each lever 174 has an upwardly extending arm 1750 which rests against an adjusting screw 176, and is held in this position by a spring 177. All of the levers 174 are mounted on a pivot rod 178 supported by brackets 179. Each lever 174 is formed with a lower arm 180, normally resting adjacent to an adjusting screw 1800 in a rocking frame 181; and each lever 174 is also formed with a slot 182 embracing a pin 183 secured to a respective rock arm 184 pivotally mounted on the rod 178, and connected by an adjustable link 185 to a respective bar 186.

There are two similar bars 186 for each denominational order of storing elements 128, the two being spaced apart at the centre of the machine, one extending upwardly and the other downwardly. The two bars 186 for any denomination are positioned in front of the storing element 128 of that denomination in the several storage sets. Bars 186 are pivotally connected to bell crank levers 187, which levers are pivotally supported by supporting strips 188. The bell-cranks 187 for any one bar 186, are connected by a rod 189, so that the bar 186 is forced to have the same amount of movement at all points, regardless of the location of the element 128 by which it is operated. The two bars 186 for any one denomination are forced to have simultaneous movement by having their correlated rods 189 connected by adjustable members 190.

When, therefore, during the operation of the bridge 154, as above described, any one of the storing elements 128 of the selected account-set is moved to its outermost or zero position, it engages with and moves its correlated bar or strip 186, thereby moving link 185 and arm 184 so that the pin 183 rocks the lever 174 sufficiently to permit the respective arm 172 to escape from finger 173, and the bell-crank 162 rotates clockwise (as viewed from the right), under the action of its spring 175. Each lever 162 is formed with a tooth 191 adapted to engage loosely the teeth of a castellated-tooth pinion 192 secured to or formed integrally with the respective pinion 150, when the lever 162 is moved. Clockwise rotation of lever 162 also effects sufficient movement of arm 160 to rock the bell-crank 157 connected thereto, so that its tooth-like arm 158 is rocked out of engagement with the notch 153 of the respective disk 151. If then the number "4" were stored in an element 128, the correlated accumulator wheel 95, would be turned four digit spaces before the bell-crank 157 would be disengaged therefrom. Engagement of tooth 191 and pinion 192 associated with the accumulator prevents over-rotation of the accumulator, but further means are provided for centralizing or aligning the teeth of pinions 150 as will now be set forth.

When the bridge has moved far enough to clear or zeroize all of the racks, even if they were storing nines, a series of cams 193 engage respective denominational rockers 194 pivoted on rod 163, and each formed with a tooth 195 to engage and properly straighten up or align its pinion 150 and associated parts. Each of the rockers 194 is provided with adjusting means as at 196 for properly adjusting the relationship between cams 193, teeth 195, and pinions 150. The two end rockers 194 are formed with rearwardly extending arms 197, which are adapted to engage and depress rockers 198 pivoted on a shaft 199 supported in bearings in brackets 200 mounted on one of the frame members 7. Secured on shaft 199 are a plurality of detent and centralizing pawls 201, each carrying a roller 202 adapted to engage a respective scallop-wheel 203 secured to a respective one of the gears 144. The rockers 198 are provided with adjustable means 204 extending in rear of the end pawls 201. The means 204 may be adjusted to effect correct relationship between the arms 197 and rockers 198 for insuring proper engagement of elements 202 and 203. Springs 205 normally hold the pawls 201 rearwardly.

It is necessary that when the machine is at normal, the bars 186 should be retracted forwardly, so as to permit movement of the racks 128 into the planes of bars 186, and that as soon as the racks of an account are so shifted, the bars should move back into operative relationship with the racks. For this purpose, the following mechanism is provided, reference being particularly made to Figs. 36, 42, 43, and 45.

Secured on shaft 33 is a cam 206 upon the high part of which normally stands one end of a rock lever 207 pivoted on a pin 208 extending from the side wall 6. The other end of lever 207, is secured to one end of a cable or other flexible member 209 which passes downwardly about a roller 210 pivotally supported from frame 6, and from thence upwardly to the rear end of a rocking bar 211 pivoted as at 2110 between the frames 5 and 6. The front portion of bar 211 extends under all of the bell-cranks 187, of one series of bell-cranks, and in normal condition of the machine raises the front ends of these bell-cranks, thereby holding all of the angle bars 186 forwardly as seen in Figs. 42 and 45. The bell-cranks are maintained in constant contact with bar 211 by springs 212 which are connected between the bell-cranks 187 of another series, and the stationary bars 188. A spring 213 secured at one end to an extension of bar 211 and at the other to an anchor pin supported by the frame 6, tends constantly to rock the front edge of bar 211 downwardly. A suitable stop 214 limits movement of bar 211 by spring 213.

In the operation, when the desired set of racks has been moved into operative relation with bars 186 which stand at the position indicated by line A, Fig. 42, cam 206 rides off lever 207 permitting spring 213 to rock bar 211, whereupon springs 212 move the lever system to throw bars 186 rearwardly until the latter rest in the position indicated by line C, Fig. 42. Should any of the racks be in zero position, the rearward movement of the correlated bars 186 will be intercepted at the position indicated by line B, Fig. 42, and the corresponding bars 173 will be held out of engagement with elements 172, so that the latter will move to unlocking position as soon as permitted by cams 215 which normally engage members 216 formed on members 162.

Inasmuch as the bridge 154 moves slightly more than nine digit spaces, it is necessary to release all of the arms 172 when the accumulator wheels have moved nine digit spaces, if they have not previously been released. For this purpose, the rocking frame 181 is connected by a link 217 to the lower arm of a lever 218 fixed to a stub shaft 219 supported by the frame 13. Pinned to shaft 219 on the opposite side of the frame 13 is a lever 2180 formed with a tooth or cam lug 220 at its upper end, adapted to be engaged by a cam lug 221 carried by the box cam, 171. When the cam 171 is turned sufficiently to advance any accumulator wheel nine digit spaces, the cam lug 221 takes effect on arm 2180 rocking 218, and thereupon causes link 217 to rock the frame 181 so that all of the screws 1800 operate those levers 180 which have not been previously moved, permitting the respective levers 162 to rock clockwise and disengage their respective bell-cranks 157 from their respective accumulators.

The pin-and-slot connections 182—183 permit the frame 181 to rock levers 174 without having to move the correlated links 185 and associated parts.

In order that the springs 175 may have but a light tension, when the machine is in normal position and may have such tension, increased when it is necessary, springs 175 are attached at their front ends to respective rock arms 222 fast on a rock shaft 223 supported in bearings in brackets from the main frame-work. Secured to shaft 223 is a rock arm 224, pivotally connected at its lower end to the front end of a link 225 which is in turn pivotally connected to the lower arm of a bell-crank 226 pivoted to the framework at 227, and having its other arm pivotally connected to the lower end of a link 228, the upper end of which is pivotally connected to lever 207. Strong springs 229 are anchored to a stationary bar 230, and connected to the respective arms 222.

When the high part of cam 206 rides off lever 207, springs 229 overcome springs 175 rocking arms 222 as far as is permitted by the linkage system above described, storing the necessary power in elements 175. At the completion of the rotation of shaft 33 the cam 206 rocks lever 207 and the linkage moves the arms 222 back to normal with small power stored in springs 175.

*Transferring from the accumulators to the account sets (Figs. 1, 9, 10, 12, 14, 20, 22, 23, 32, 35, 39, 43, and 44)*

We have seen how amounts may be transferred from the account-sets to the accumulator wheels, and how amounts may be entered from the keyboard onto the accumulator wheels. We shall next consider the transferring of amounts from the accumulator wheels to the account sets.

An amount may be transferred from an account set to the accumulator wheels for either of two purposes: (1) To merely read the stored balance and return the same to the account set; (2) to alter the stored balance by addition and by subtraction of items and return the new balance to an account set. There is a single means for returning a balance whether altered or not, the operation of which means is as follows:—

An account set having been zeroized, and its stored balance having passed to the accumulator wheels, this balance is read or altered as desired, and then the operator again moves finger piece 41 down, whereby the shaft 33 is given its second partial revolution. During this partial revolution, the cam race 170 is of such contour as to bring roller 169 back to normal, which effects a clockwise rocking of members 168 and 165, and, through gears 164, returns the bridge or bail 154 counter-clockwise to normal.

Now it will be recalled that by the end of the clockwise rotation of bail 154, all of the bell-cranks 157 had been rocked so that their tooth-like members 158 had moved onto the concentric portion of disks 151. When the return movement begins, the members 158 ride on the concentric portions of disks 151 until they engage the associated teeth 152. When a member 158 meets a tooth 152, it is held by the engagement of the respective stop 191 with its pinion 192. As the bridge or bail 154 continues to move, the member 158 is forced down into the notch 153, thereby rocking bell-crank 157 and associated bell-crank 162. This releases pinion 192 from stop 191, and thereafter that accumulator wheel is rotated with the bail back to zero position. Rotation of the accumulator wheels 95 operates the respective trains of gears, each of which trains includes members 150, 147, 144, 143, and 136, to the extents that the respective accumulator wheels are moved. This, of course, drives the elements 128 of the active account-set to positions corresponding to the balance being transferred. The detents 194 and 201 are rendered ineffective prior to any return movement of the bridge 154, as the cams 193 pass away from members 194 at the beginning of the second partial rotation of shaft 33.

At the time that any lever 162 is rocked, its lower arm 172 passes back of the respective finger 173 of lever 174, and is engaged and retained by this finger; but to insure the retention of these members, cams 215 engage members 216, at the end of the rotation of shaft 33.

Furthermore, toward the end of the rotation of shaft 33, cam 206 rocks lever 207, retracting all of the bars 186 and relieving the tension of all the springs 175.

*The account selector (Figs. 1, 11, 35, 36, 39, 46 to 56 and 60)*

The machine as shown in the drawings is constructed to accommodate one thousand accounts although a greater or less number is within the ambit of the invention. For the purpose of selecting the particular account to be worked with, there are provided setting levers whereby the number of the account-set may be set up, and mechanism set by these levers to render the respective latch 139 effective. There is also means operable upon operation of the machine for rendering the effective latch operative, and for operating the latch to bring the racks 128 of its account-set into mesh with the long pinions 136. With this general statement, we shall proceed to consider these several devices in detail.

The method of stacking the account sheets one above the other is clearly illustrated in Fig. 45, and the latch members 139 are shown in Figs. 35 and 36 as held in spaced relation by a comb bar 231, the teeth of which are spaced to maintain each latch in the plane of its account sheet or substantially so.

In the construction shown, the thickness of each account sheet with its rack need not be more than 1.5 mm. so that this can conveniently be the spacing of the teeth of the comb bar between which the ends of the latches 139 are supported. This comb bar may be made as a single piece, but preferably as illustrated more particularly in Fig. 11, it is made of several sections spaced apart where nests of account sheets abut and where nests of accounts sheets are spaced to make room for the transmission from the adding wheels to the long pinions. Adjacent to the comb bar 231 there is employed a series of four vernier bars 232, 233, 234, and 235. These vernier bars are slotted in such a manner that by moving one or more of the bars there is, for each movement obtained, but one position in which slots in the several bars are in alignment, and this cross registration of slots will occur opposite to the latch 139 of the account sheet corresponding to the manipulation effected to produce the alignment of slots. The arrangement of the slots will be more clearly described hereafter.

The vernier bar 232 is connected to a rack 236, the vernier bar 233 to a rack 237, and the vernier bar 234 to a rack 238, each of these racks including an angle element adjustably connected, respectively, at 239, 240, and 241 (see Fig. 11) to lugs from the respective vernier bars.

The manipulation of the vernier bars to produce the selection of the account sheets is effected by means of selector wheels 242, 243, and 244, each associated with a numeral wheel 245, 246, and 247 (each carrying an indicator dial), so that the setting made by moving the wheels 242, 243, and 244 is visibly indicated.

For the convenient operation of the selector wheels 242, 243, and 244, selector levers 248, 249, and 250 are attached thereto, so that by moving these levers the wheels 242, 243, and 244 are rotated about the axis of a shaft 81 carried by the frames 10 and 11 of the machine. The wheel 242 is fast on shaft 251, while 243 and 244 are secured to nested tubes carried by shaft 251. This arrangement has to do with printing, and will be fully discussed hereafter. Associated with each selector wheel is a pinion identified by the reference characters 252, 253 and 254, respectively, each driving a respective toothed wheel 255, 256 and 257, meshing respectively with the racks 236, 237 and 238 being mounted for rotation on an axis member 258 carried by the frames 10 and 11 of the machine. The setting levers 248, 249, and 250 control, respectively, the setting of the units, tens and hundreds vernier bars.

Associated with each pinion 252, 253, and 254, is a respective suitable ratchet disc 259, 260, and 261, each disc being fixed for rotation with its respective pinion while the pinion 252 is fixed to its selector wheel 242, though the other pinions 253 and 254 are movable relatively to their relative selector wheels 243 and 244. The selector wheels 243 and 244 carry pins 262 and 263 respectively, which extend into the planes of the respective ratchet discs 260 and 261, and which are employed when a series of account sheets are to be read successively as hereafter more particular described. Co-operating with ratchet disks 259, 260, and 261 are pawls 264, 265, and 266, the pawl 264 is held against movement about the axis member 251 by being pivoted on a bracket 267 fixed to the frame 10 of the machine, while the pawl 265 is pivoted on a bracket 268 carried by the units ratchet disc 259, and the pawl 266 is carried on a bracket 269 carried by the tens ratchet disc 260.

By such an arrangement, rotation of the ratchet member 260, is communicated to the ratchet member 261, whereas movement of the ratchet disc 259 is communicated to both of the discs 260 and 261, although the disc 261 may be rotated without transmitting motion to either of the discs 260 or 259, and disc 260 may be rotated without transmitting motion to disc 259.

Generally speaking, it is usual to set the selector mechanism by setting the hundreds numeral first and the units numeral last.

Considering this mode of operation, the lever 250 is moved causing the dial of the numeral wheel 247 to show the displacement effected. Movement of the lever 250 to move the selector wheel 244 causes a similar movement of the associated ratchet disc 261 because the pin 263 carried by the wheel 244 presses against the edge of the disc 261, the ratchet running freely over the pawl 266. The setting is then made on the tens wheel by operating the lever 249, its selector wheel 243 causing the displacement to be shown on the dial of the numeral wheel 246. This movement of the wheel 243 is imparted to its ratchet disc 260 by the agency of the pin 262 in like manner as movement was impressed on the ratchet disc 261 by its selector wheel 244. As, however, the ratchet disc carries the pawl 266, a similar angular movement about the axis member 251 is impressed upon the pawl 266 so that the ratchet disc 261 associated with this pawl 266 is moved, this added movement of the ratchet disc 261 being relative to its associated selector wheel 244 so that the indication on the dial of the numeral wheel shown by the previous setting on the wheel 244 is unaffected. The required setting on the selector wheel 242 is then made, and, in this case, as the pinion 252 is fixed as regards the toothed wheel 242, it moves with it, and so also does the ratchet 259, the latter running over the pawl 264, but as the disc 259 is moved angularly about the axis member 251 it takes with it the pawl 265, enforcing a similar angular movement on the ratchet disc 260, without having affected the setting of the selector wheel 243. This added movement is also impressed on the ratchet disc 261 by the agency of the pawl 266 carried by the ratchet disc 260.

The movement of the pinions 252, 253, and 254 is communicated by the wheels 255, 256, and 257 to the respective rack members 236, 237, and 238, and thence to the respective vernier bars 232, 233, and 234. It will be noticed, therefore, that during the setting of the selector wheel 242, a similar amount of movement is transmitted to the vernier bars 233 and 234 directly associated with the wheels 243 and 244; and when a setting is made on the wheel 243 there is a corresponding movement effected on the vernier bar 234 directly associated with the wheel 244, even though the reading on the dials of the associated numeral wheels in each case remains as set by the movement of the levers 249 and 250. To enforce proper setting regardless of the sequence in which levers 248, 249 and 250 are set, each of these is jointed and its outer member is formed with a tooth 270 for engaging the respective ratchet wheel.

Having made the desired selection and obtained the correct reading, on the dials of the numeral wheels, the vernier bars will have been moved so that the slots therein register with the latch of the account corresponding to the set shown on the dials of the numeral wheels.

The account having been selected, its rack members are then brought into operative relation with the long pinions 136, in a manner hereafter to be described, and the account having been read on the register dials on gears 117, and any transaction on that account effected, the account sheet is then returned to normal quiescent position and the selector mechanism zeroized for the next setting operation. The selector wheels are zeroized by the agency of a lever 271 pivoted on a rod 272 secured in the frames 10 and 11 of the machine, the lever 271 being provided with an arm 273 having its end bifurcated and engaged with a pin 274 on a rocker 275 pivoted on a shaft 276, the other end of the rocker 275 being indirectly connected to a strap member 277, by means of a lever 278, hereafter more particularly referred to, and having a pin and slot connection at 279 to rocker 275 and a similar connection at 280 to strap or slide 277. The member 277 is provided with a slot at its lower end and engages a pin 281 on the free end of a second rocker 282, fixed on shaft 283 mounted in the frames 10 and 11 of the machine, a third rocker 2820 has its forward end engaging over a pin 284 of a trip member 285, secured to shaft 276 for rocking the same, and disposed to disengage the pawl 264 from the disc 259. When the lever 271 is pulled down, the strap 277 is lowered and the lever 282 is rocked, which movement causes the trip 285 to press on the tail of the pawl 264, and detach it from the ratchet disc 259. The movement of the pawl 285 rocks shaft 276, so as to bring pawls 286 and 287 into the paths of movement of the tails of the pawls 265 and 266, so as to release the discs 260 and 261 as the parts return to normal.

Normally the strap 277 is held in the raised position by a spring 288 and at the upper part is provided with an arm 289, connected at 290 to an arm 291 secured on a pivot shaft 292, upon which a pawl 293 for gear 245 is loosely pivoted, the member 292 being carried by the frames 10 and 11 of the machine. On this shaft 292 are also pivoted pawls 294 and 295, respectively, for the indicator gears 246 and 247, and adjacent to these pawls, is fixed on the shaft 292, an arm 296 for each of them. Each of the arms 291 and 296 carries a pin 297 which overlies the tail of the respective pawl, thereby, when the strap 277 is lowered the pins 297 are all brought on the tails of the respective pawls which are removed thereby from the respective wheels 245, 246, and 247, so that these are zeroized or cleared when the selector wheels are zeroized or cleared, on operating the zeroizing lever or clear key, 271.

Operation of the clear key, therefore, releases the wheels 245, 246 and 247, and moves pawls 285, 286, and 287 to effective position, so that pawl 285 immediately frees the disk 259 and allows it to return to zero position, which return is effected by the weight of the associated rack and vernier bar as soon as the pawl 264 is removed from the ratchet. As the ratchet 259 moves to zero position, it also moves the pawl 265, permitting therefore return of the disc 260, this in turn permitting the pawl 266 to return, and so also the ratchet 261. When the pawls 265 and 266 return to normal, they are tripped by the pawls 286 and 287, permitting any further movement of discs 260 and 261 which may be necessary.

The parts are now in zero position and ready for the next setting.

As the disc 259 returns, it takes with it the associated selector wheel, by reason of the fact that the respective members 259, 252 and 242 are positively connected to each other; but wheels 243 and 244 are returned by means of springs 298, as they are free from discs 260 and 261 and return as soon as the respective detents 294 and 295 are moved out of pinions 246 and 247. In the path of each lever is a respective spring controlled nipple, 299, carried by a part of the frame of the machine in such a position that it cushions the return movement of the levers and brings them to rest at the zero position.

Normally, that is with an account sheet in inactive condition, its latch member 139 rests against the edge of a plate 300, with the free end of each latch disposed between the teeth of comb bar 231 and all of the latches clear of the teeth in the vernier bars.

When the vernier bars have been set by the selector mechanism for the required selection, the plate 300 is retracted and the latch 139 in alignment with the slots on the vernier bars, follows the plate 300 and enters the registered slots. This movement of the latch 139 being impelled by its spring 141, and at the same time the notch 301 of the latch 139 passes on to a rib 302 of a laterally movable member 303.

The plate 300 is obliquely slotted as indicated at 304 for the reception of pins 305 carried on a vertically displaceable plate 306. By lowering the plate 306, its pins 305 working in the oblique slots 304 move plate 300 forwardly away from the latches 139 to produce the engagement of the notch 301 of the selected latch 139 on the rib 302. The plate 306 is formed with a jaw engaging a pin 307 on a rocker 308 carried on an axis member 309, the rocker 308 being actuated by a cam 310 mounted on shaft 33. By rotating the shaft 33 in clockwise direction, as viewed from the right, the rocker arm 308 is moved, lowering the plate 306 thereby moving the plate 300 to permit the selected latch 139 to engage the rib 302 on the laterally displaceable member 303.

The movement of the racks of a selected account to effective relation with the long pinions 136 is effected through the agency of the laterally movable bar 303, obliquely slotted at 311. This bar 303 is slotted obliquely so that the vertical displacement of pins 312 which work in respective slots 311 causes the desired lateral displacement of the bar 303. Each pin 312 is guided in a vertical slot 313 formed in the frame of the machine, and is carried by a vertically displaceable bar 314 movable by a rocker 315 pivoted on the axis member 309 and actuated by a cam 316 mounted on the shaft 33.

By rotating the shaft 33 for its first portion of a revolution, the bar 314 is lowered causing the pin to move the angle bar 303 laterally by a wedging action of the pins 312 in the oblique slots 311 of the member 303, thereby effecting lateral displacement of the rib 302 and the effective latch 139 hooked thereto.

The shaft 33 is rotated, previously to turning the shaft 31, so that the sequence of operations is as follows:—

The selection is made on the selector wheels and then the shaft 33 is partially rotated so as to permit the selected latch to move on to the actuating member constituted by the rib 302, and the rib 302 to move laterally, thereby bringing the racks of the selected account into operative relation with the long pinions 136. The partial rotation of shaft 33 also causes the account to be brought into the accumulators where it may be read. This amount may then be modified if desired by adding or subtracting items, and, by a second partial rotation of shaft 33, the amount on the accumulators or registers whether modified or not may be returned to the racks. The shaft 33 in completing its revolution causes the latch to be retracted and the racks of the selected account to be returned to quiescent or normal position, and then the latch to be moved out of engagement with the rib 302 and the vernier bars. The selector mechanism is then zeroized or cleared by operating the lever 271 so as to release all the pawls 264, 265, and 266 from their respective ratchet discs 259, 260, and 261, as hereinbefore described. The machine is then ready for the next account selecting operation.

In order to prevent incorrect operation of the machine by way of operating the lever 271 to zeroize the selector before an account sheet has been returned to quiescent condition, means are provided to lock the zeroizing lever 271 to prevent inopportune operation. To this end, there is fixed to the lever 308 one end of a rod 317 which passes to a link 318 to one end of which it is pivotally connected, the other end of link 318 being pivotally connected by a pin 323 to a bell-crank 324. At the beginning of movement from normal shaft 33 rocks lever 308 and rod 317 and link 318. This movement in the link 318 is communicated by pin 323 to bell-crank 324 mounted on a pivot 325 fixed to frame 10, and through a connecting rod 326 to a rocker 327 mounted on a pivot 328 fixed to frame 10, the free end of which carries a pin 329 that abuts against a locking lever 330 formed with a shoulder 331 for engaging under a pin 332 carried on the lever 271.

By such an arrangement, the movement in the rocker 324 causes displacement of the rod 326 and the rocker 327, whereby pin 329 is caused to press against the locking arm 330 until the shoulder 331 is disposed under the pin 332 on the lever 271. It is then impossible to pull down the zeroizing lever 271. This condition of affairs maintains until the shaft 33 has completed one revolution and the new balance or the original account has been returned to the racks of the account sheet selected. When the complete revolution of the shaft 33 has been almost completed, the rocker 327 moves its pin 329 from the locking arm 330, which then returns to ineffecting position under the influence of a spring 333.

*The vernier bars (Figs. 11, 35, 36, 53, 57, 58, 59)*

It is convenient now to refer to the construction of the vernier bars by which a selection from the account sheets is made.

The units vernier bar 232 is slotted at intervals corresponding to the height occupied by ten storing elements, that is to say, supposing the thickness of a storing element is 1.5 mm., then the distance between the slots on the unit vernier bar 232 is 15 mm. and is equivalent to ten slots on the comb bar 231. The tens vernier bar 233 is slotted at intervals corresponding to the height of nine storing elements, that is to say, supposing the thickness of a storing element is 1.5 mm. then the distance between the slots on the tens vernier bar 233 is 13.5 mm.

The slots on the vernier bars 232, 233 could, for the purpose of the selector mechanism be continued throughout the length of the vernier bars, but necessarily then some of the slots would be idle because there would not be account sheets opposite to them.

For this reason, alone, the slots on the units bar 232 are in groups corresponding to the nests of account sheets, and where the nests abut a gap exists between the groups, that is to say, that the space between the slot corresponding to the account sheet No. 90 and the slot corresponding to the account sheet No. 100 is a distance greater than the thickness of ten storing elements by the thickness of the abutting casings containing the nests of account sheets. This gap occurs at each abutment of nests; and where nests are spaced to arrange for the transmission from the adding wheels to the long pinion 136 the gap is of a size equal to that of the other gaps plus the spacing between the nests.

Gaps also occur at corresponding intervals between the groups of slots on the vernier bar 233, the spacing being such that the first slot of each group one is in alignment with the first slot of the group of slots on the units bar 232.

The hundreds bar 234 is provided with slots spaced at nine unit intervals in spaced groups as is the tens bar 233 with this difference, that the gap between the first and second groups is less than the gap between the corresponding groups on the tens bar 233 by the width of one slot. Consequently, this difference in disposition between the groups of slots on the hundreds bar 234 and the tens bar 233 increases in equal increments of one slot width as the scale rises up to "900" when as the interval between the slots on the bars 233 and 234 is nine slot widths, an alignment is produced in the bars 232, 233, and 234; the alignment being attained with the first slot in the ninth group of slots of the bars 232 and 233 and the second slot of the ninth group of slots in the bar 234. The dual selection at "900" and "0" is avoided by employing another slotted bar identified by the reference 235.

Considering Figs. 57 and 59 the numbers applied to the comb bar 231 indicate the number of the account sheets opposite the slots on the comb bar. The first slot is as indicated account sheet Number "0", and it is very important to notice that in the normal position of the vernier bars there is an alignment of the first slot in each of the bars opposite the account sheet "0". It will be apparent, therefore, that without actuating at all the selector mechanism, i. e. with the reading wheels showing the numbers "0 0 0" if the machine is operated there is, in fact, an account sheet selected, because the latch of the account sheet "0" can fall into the aligned first slots of the vernier bars. By this arrangement it is impossible to operate the machine and make an entry without having the same pass to some storage set. The fact that the machine is operated produces the "0" account and any transaction is transferred to that account.

As regards the units bar 232 the slot number "1" thereof is opposite the account slot "0" on the comb bar, the tenth slot being opposite the account slot "90", the eleventh slot of the bar 232 being opposite the account slot "100". The first, eleventh, twenty-first, etc. slots are opposite respectively the account slots "0", "100", "200" etc. Similarly considering the tens bar 233 it will be seen that the first, eleventh, twenty-first etc. slots thereof are respectively opposite the account slots "0", "100", "200" etc. It will also be noted that, as regards the units and tens bar, they form a combination of groups of slots exactly the same for each nest of accounts.

In Fig. 57 comparison between accounts "0"–"99" and "100"–"199" can be easily made, the same being as clearly indicated by the numbering on the comb bar 231. The hundreds bar 234 has its first slot opposite the account "0" and the eleventh slot one slot width disposed before the account "100", the slot "21" being disposed two slot widths before the account "200", and the slot "31" disposed three slot widths before the account "300" until, as before explained, owing to the increments of displacement of the groups on this bar, the ninety-second slot will have come opposite the account "900".

Considering now the selection of the number "652" with particular reference to Fig. 59, the position of the bars within the "600" account area before the selection has been made is shown, and from this it will be noted that the sixty-first slot of the units and tens bars is opposite the "600" account slot while the sixty-first slot on the hundreds bar is six account widths below the same. Also it will be noted that the sixty-sixth slot on the bar 233 is five slot widths in advance of the account slot "650".

The lever 250 is now moved causing the selector wheel 244 to turn through six teeth so that the number six appears through the window above the corresponding indicator wheel 247. At the same time pin 263 engages the associated ratchet disc 261 correspondingly turning it and the pinion member 254 which is fixed to the disc, thereby moving in turn the gear wheel 257, which raises the rack 238 and consequently the attached hundreds bar 234, bringing the sixty-first slot opposite the account slot "600" and the sixty-sixth slot five slot widths in advance of account slot "650". This is the position A indicated in dot-and-dash lines in Fig. 59, and, it will be noted, brings the slots of this group on the hundreds bar 234 into transverse alignment with the slots of this group on the tens bar 233. Then the tens lever 249 is operated moving its selector wheel 243 producing a reading on the dial of the associated wheel 246 of the numeral "5". At the same time, the pin 262, has taken the ratchet disc 260 through a distance of five teeth causing the associated pinion 253 to drive the tooth wheel 256, thereby raising the rack 237 and consequently the tens bar 233, bringing the sixty-sixth slot thereof opposite the account slot "650". This is the position B indicated in Fig. 59.

At the same time, the ratchet disc 260 carries the pawl 266 along and this five tooth movement of the disc 260 is enforced on the previous movement of the ratchet disc 261 thereby bringing the sixty-sixth slot of the hundreds bar 234 opposite the account slot "650". This is the position B indicated in Fig. 59 for the bars 233 and 234. The lever 248 is then operated till the numeral "2" appears on the dial of the corresponding wheel 245 through the window aforesaid. The corresponding ratchet disc 259 is similarly moved and the pinion 252 and tooth wheel 255 and the rack 236 raises the units bar 232 bringing the slot "66" of the units bar into alignment with the account slot "652". This movement of the disc 259 is transmitted by the pawl 265 carried thereby on the ratchet 260 and as this ratchet 260 is, by the pawl 266, attached to the ratchet 261 a similar displacement is produced thereon, so that the sixty-sixth slot on the tens bar 233 is brought opposite to the account slot "652". This is the position C shown in Fig. 59 and necessarily, also, the sixty-sixth slot of the bar 234 is brought opposite the account sheet "652", thereby attaining the positions C for the bars 233 and 234.

In the position C there is opposite the account slot "652" a slot in each of the bars 232, 233, and 234. Consequently, the latch 139 of the corresponding account sheet can drop into the slot and the account sheet elements can be brought into co-operation with the long pinions 136.

From the foregoing it will be clear that by relative movement of the racks an alignment of slots at one place only between accounts "0"–"899" is attained.

Considering now the employment of the bar 235:—

To prevent dual selection from the "0"–"99" and the "900"–"999" account sheets, the bar 235 is provided at each extremity, that is within the "0"–"99" account area and the "900"–"999" account area, with slots arranged similarly to those of the tens bars, at intervals of nine account sheet widths. At the zero end of the vernier bars, therefore, the slots on the bar 235 in normal position register with the slots of the first group in the bars 233, 234. At the "900" account end the slots on the "900" bar 235 are arranged to be out of alignment by one account sheet width with the aligned slots of the bars 233, 234.

By such an arrangement there can only be a selection in the "0"–"99" account area or the "900" account area. If, then, the bar 235 is moved but one account sheet width, then the selection, that is the area of accounts "0"–"99" is impossible. This movement of the bar 235 is conveniently effected by providing a pin and slot connection between the two bars, for instance, by pins 334 on the tens bar and slots 335 on the bar 235, and by providing on the bar 235 a pin 336 which overlaps the end of the hundreds bar 234 at a distance the width equivalent to nine account sheets therefrom.

It will be seen, therefore, that movement of the tens bar which, as before indicated, enforces a movement on the hundreds bar 234, also moves the bar 235, so that the initial relation of the "900" bar with regard to the bars 233 and 234 remains. When, however, the hundreds bar has moved for the ninth step, the end of the bar takes on the pin 336 carried on the bar 235 one step, thereby preventing selection between the account sheets "0"–"99" and permitting selection from the "900"–"999" account sheets.

As shown in Fig. 57, the slots at the higher end of 235 are displaced one account sheet width with regard to the slots on the vernier bar 234, so that a latch on an account sheet can not lie in any registered slots in the bars 232 to 234 between the account sheets "900" to "1000" while a selection is being made by causing the registration of the slots in the bars 232 and 234 of an account sheet between "0" and "100". This position of the bar 235 maintains until selection is made at "900" or above. Such selection produces a movement in the hundreds bar 234 which brings its upper slots into alignment with the slots at the upper end of bar 235 and then engages pin 236 and carries the bar 235 along with it for a slight distance. The aligning of the slots at the upper end of bars 234 and 235 effects the relative non-alignment of the slots at the lower ends thereof, thereby preventing selection in the area corresponding to the account sheets "0" to "100", while a selection can be made in the area corresponding to the account sheets "900" to "1000".

*Debit and credit balance (Figs. 9, 10, 20 to 23, 27 to 32)*

This machine is designed to accommodate both debit and credit balances, and for this purpose the following means is devised:

Considering that each account-set includes ten storing elements, of successive denominational orders, it will be seen that there are, counting the zero position, ten billion registering positions of the elements 128 of an account-set. This ten billion registering position is arbitrarily divided into two parts, all registration from "0 000 000 000" to "8 999 999 999" being taken as positive amounts and all registrations from "9 000 000 000" to "9 999 999 999" being taken as negative amounts. Under this condition, when the elements 128 stand at the "9 000 000 000" position, they must transfer to the accumulators a negative balance of "0 999 999 999", whereas if the elements stand at the "9 999 999 999" position they must transfer to the accumulators a negative balance of "0 000 000 000." For this purpose, each of the drum dials of gears 117 which indicate the amounts standing on the accumulators are provided with two sets of digits running in opposite directions around the drum dials, and arranged opposite each other, the positive "0" being opposite the negative "9" and the balance of the digits being arranged accordingly. Any two aligned digits are therefore complemental parts of nine.

Normally a flash or indicator plate 337 stands over the dials of gears 117 with its sight openings 338 exposing the positive digits "0" of all dials. If with the dials in this position, a positive balance is entered from a selected account sheet a positive registration will be indicated; but if the number entered be negative then the dials would be turned into the negative zone and it is necessary that the flash plate 337 be shifted so that its sight openings 338 will register with the negative digits on the dials. For this purpose, the highest order dial of gears 117 carries a cam 339 which stands normally or in positive zero position just in contact with a pin 340 secured to the end of the flash 337. If a negative amount is transferred from an account sheet, then the highest dial will be turned to position to bring the positive "9" to reading position. But this is the position of the high part of cam 339, hence as the cam 339 rides against pin 340 in passing from positive "8" to positive "9", it forces the plate 337 to the right, thereby bringing the openings 338 in registry with the negative digits on the dials of gears 117. Whenever the flash plate is operated in passing from a negative to a positive amount or vice versa, a signal is operated to indicate the changed state of the machine. This signal will be later disclosed in connection with more closely related matters. The flash plate 337 is urged to the left by a spring 341 and is slidably mounted in any suitable well-known manner, as by pin and slot connections.

When the negative balance is changed by the addition thereto of a positive sum greater than such balance, the pin 340 rides down the cam face, and when a positive balance changes to a negative balance by virtue of a debit entry greater than the positive balance, the pin 340 rides up the cam face. In other words, whenever the sign changes, the plate 337 is shifted and a signal is operated.

The peculiar thing about the arrangement which should be noted is that when amounts are either positive or negative in the accumulator wheels and the sign is changed, by the entry of an amount of the opposite sign, the sign changes by virtue of the accumulator wheels being operated in the opposite direction whereas negative and positive balances are both stored in the storing elements by moving the same in the same direction, the extent of movement of the highest order storing element being the determining factor as to whether the amount stored is negative or positive.

The passing from negative to positive and from positive to negative involves a means for taking care of the necessary transfer of one from highest to lowest, but as this mechanism is closely allied with the carrying or tens-transfer mechanism, the latter mechanism will now be described.

*Carrying mechanism for main registers (Figs. 9, 10, 20 to 24, 28, 29, 32, 33, 34, and 43)*

The carrying mechanism or tens-transfer for the main accumulators or registers 95 is similar to that shown in my United States Patent #1,551,009 and will now be briefly described.

The principal parts of this carrying mechanism are mounted on an angle bar 342 supported by the main framework.

In Fig. 32, the wheel of highest denomination and the wheel of the next highest denomination are illustrated and the mechanism between the two wheels, that is the carry-over or transfer mechanism, is now to be referred to. Between the two wheels a cam plate 343 is arranged on the angle bar 342, the cam plate having a V-shaped notch, each side 344 and 345 of which constitutes a cam surface, and which sides merge into a slot 346 as shown in Fig. 22.

On one of the arms 97 carrying the adding wheel 95 of each denomination, is mounted a pinion 347, rotatable about a pivot 348 carried by the arm 97. On the pinion is fixed a tooth 349, and the adding wheel 95 is provided with internal teeth 350, with which the pinion 347 meshes. The pinion 347 has ten teeth, and the teeth 350 are of such size that when the adding wheel 95 passes through ten digit spaces, the tooth 349 is moved through a complete cycle of rotation, one way or the other according to the direction of rotation of the adding wheel 95. On the arm 97 is pivoted at 351, a rocker 352 having two re-entrant teeth 353 and 354 arranged to be engaged by the tooth 349 upon rotating the same in opposite directions. By moving tooth 349 beyond mere engaging position, rocker 352 may be moved. The rocker 352 carries a pin 355 which normally stands in the slot 346 of the plate 343. When, however, the adding wheel moves towards its actuator, the pin 355 moves into the space between the cam sides 344 and 345 of the plate 343 and it can move above or below the slot 346 according to the direction of rocking of the rocker 352 impelled by movement of the tooth 349.

On the juxtaposed face of the adding wheel of next higher denomination are radial grooves 356. When the pin 355 is in its normal central position and the rocker 352 is not moved, the retraction of the adding wheel from the actuator will merely cause the pin 355 to run down the radial groove on the adding wheel of next higher denomination. If, however, the rocker is tilted one way or the other, the pin 355 engages in a groove 356 not coincident with the slot 346 as regards radial alignment, and as the said wheel is retracted the pin comes against one or other of the cam faces 344 or 345 dependent on the direction of rocking the member 352 and as the pin is forced back to the slot 346 a corresponding angular displacement of one tooth space will be enforced on the wheel of next higher denomination.

It has already been explained that in view of the arrangement of the cam paths 101 on the cam discs 102, the adding wheels 95 move first out of mesh from the actuators and then move to normal position seriatim. Consequently the carry-over from one wheel to the next occurs in sequence permitting a wheel to be moved as result of carrying over from the wheel of lower denomination and itself to move the wheel by carrying over the wheel of next higher denomination.

To maintain the rockers 352 in set position, each arm 97 carries a spring impelled link 357 on which is pivoted a roller 358 engaging in one of three recesses on a segmental plate 359 fixed to the pivot 351 of the rocker 352, thereby the rocker is held in normal position or in either position to which it may be set by the associated tooth 349.

*Compensating carrying (Figs. 9, 10, 21, 23, 24, and 28 to 32)*

When the wheel of highest order passes from position zero to positive "9" or vice versa, (i. e. when there is a change of sign during the entering of items), a compensating carry of one unit takes place from the highest to the lowest order. This is a carry or ten-transfer to compensate for the shifting of the flash plate and the complemental arrangement of the two series of digits on the dials.

To this end, the accumulator of highest order has associated with it a gear 347, tooth 349 and rocker 352 as in the case of the lower order carrying mechanisms, but in this case the support 343 is cut away so as not to present elements 344, 345, and 346. The pin 355 of this rocker 352 enters an arcuate slot 360 of a link or pitman 361 supported at its upper end by a pin-and-slot connection 362 to the support 343. The lower end of member 361 is pivotally connected at 363 to one end of a rock arm 364, the other end of which is fast on a rock shaft 365 supported by angle bar 342. The shaft 365 passes completely across the adding wheels or register, and carries at its right hand end a rock arm 366. Pivotally secured at 367 to the arm 366 is a second pitman 368 having its upper end supported from the associated support 343 by a pin and slot connection 369. The member 368 is formed with an arcuate slot 370, into which projects the pin 355 from a rocker 352 carried by a member 97 arranged to the right of the arms 97 carrying the accumulator 95 of lowest denominational order. This rocker 97 has a special cam 371, the race 372 of which is so formed that when the machine is in normal condition, the associated pin 355 is in the farthest forward position. The member 343 associated with the pin 355 which passes through slot 370 is similar in all ways to the members 343 associated with the carrying pins, except that it is extended upwardly to support the pin of the connection 369.

In operation when the sign changes by reason of the highest order accumulator passing from positive "0" position to positive "9" position or vice versa, the rocker 352 associated with the highest order accumulator wheel is moved to raise or lower (as the case may be), the pitman 361, thereby rocking arm 364, shaft 365 and arm 366. This either raises or lowers member 368 to raise or lower the associated pin 355 for a positive or negative transfer to the accumulator wheel or lowest order. Another operation of shaft 31 is then made, and the cam 371 effects a carry to the lowest order wheel. The timing will be presently considered.

To enforce the carrying stroke after the mechanism has been set for a compensating carry, a rock plate 373 is secured to shaft 365 and engages at its free end with a spring pressed pawl 374 which carries an insulating pin 375 for lifting a switch member 376 from contact with a member 377 to contact with a member 378. Rocking of plate 373 in either direction, throws member 376 from member 377 to member 378, and thereby preventing operation of shaft 33 and giving a visual signal, as will be more fully discussed in connection with the wiring. The ensuing operation of shaft 31 effects the compensating carry-over, and in so doing, restores shaft 365 to normal, thereby bringing member 376 back into contact with member 377.

It may be well at this point to consider briefly the timing of the carrying operations. After an account has been brought from one of the account sets to the accumulator wheels 95, the latter stand in rearmost position (Fig. 23). An amount is set on the keyboard and shaft 31 is given a rotation. During the first part of this rotation, all of the accumulators are carried forward into mesh with their actuators, and the keyboard is cleared bringing the amount onto the accumulator wheels. Further operation of the shaft 31 rotates the cams 102 and 371 (Figs. 23, 30, 31) which first simultaneously moves all of the arms 97 slightly so as to bring the accumulators just out of mesh from their actuators. Then the arms 97 are moved to rearmost position seriatim, beginning with the arm 97 associated with pitman 368 of the compensating carry-over and proceeding towards the left of the machine. The arm 97 associated with pitman 368 is returned forward to its normal position during the time that arms 97 of higher order are being moved rearwardly. At the time that arms 97 of highest order return to normal, the flash plate 337 is also returned. The flash plate 337 is supported (Fig. 32) at the left-hand end by an extension of an arm 97 associated with the highest order accumulator and at the right-hand end by an arm 9700 (Fig. 21) associated with a box cam 1020 (Figs. 21 and 30), the cam groove of which is exactly the same as the groove of the cam 102 of highest order.

Double-entry mechanism (Figs. 20 to 24 and 43)

This machine is constructed to do book-keeping on the double-entry principle and in consequence whenever a credit item is entered in the accumulator wheels 95, it is necessary that an equal debit item be retained for entry into some other account, and conversely when a debit item is entered into the accumulators 95 an equal credit must be retained for entry into another account-set. It is, of course, possible that a single item may be credited to one account and portions of this item debited to each of several other accounts, and vice versa. All of the contingencies of double-entry book-keeping are taken care of by the mechanism which is about to be described.

Mounted on short shafts 379 are a plurality of double-entry accumulator wheels 380, there being a respective short shaft 379 for each accumulator wheel 380, exactly as there was a shaft 96 for each of the accumulator wheels 95. Each shaft 379 is carried by a pair of rock levers 381, 382, all of said levers being pivotally supported on a rod 383 mounted in the frames 11, 13, 14, and 15 of the machine. A gear 384 meshes with each of the accumulator gears 380 and carries a drum dial 385 similar to the drum dials of gears 117 of the main accumulator wheels 95 but with its numerals arranged in the reverse order. The dials 385 are provided with a movable flash or indicator plate 386, so that the double-entry wheels may be read in the same manner as the main accumulating dials. The levers 381, 382 of the several double-entry wheels 380 carry between their rear arms, anti-friction rollers 387 which are seated between bifurcations of arms 388 of the respective levers 98.

It will, therefore, be seen that whenever the main accumulator gears 95 are thrown into mesh with the actuating discs 79, the double-entry gears 380 will simultaneously be thrown into mesh with the discs 79, and consequently, any item set up on the actuating discs 79 and entered into the main accumulators 95, will also be entered in the double-entry accumulators 380, but owing to the reversal of the numerals on the double-entry dials 385, the items will show with the reverse sign, that is a credit entered in accumulators 95 will show as a debit in the accumulators 380, and a debit entered in the accumulators 95 will show as a credit in accumulators 380. The accumulators 380 are held in any position to which they are moved by a detent bar 126.

After an item or items have been entered in the double-entry wheels 380, if it is desired to have the amount registered on these wheels entered into a single account, the amount from that account-set is first transferred to the accumulators 95, by the means hereinbefore described, and then the machine is operated so as to first throw both sets of accumulators into mesh with the actuators 79, the latter being in their zero or normal position, and then the accumulators 380 are turned to zero position which will cause the actuators 79 to be rotated according to the amount standing on the double-entry wheels, and will effect a transfer of such amount into the main accumulator wheels 95 from which it may be afterwards returned to the required account set.

The mechanism whereby this is accomplished is as follows:—

The accumulators 380 are provided with carrying mechanism, debit and credit flash-shifting devices, and compensating carrying mechanism, similar to that for the accumulators 95; but, of course, arranged to operate in accordance with the reversed condition of the numerals on the double-entry dials 385.

The arm 382 of each double-entry accumulator 380, is slotted at 390 to receive the guide pins 391 of a slide 392, each of which may be moved by a respective rock arm 393. All of the arms 393 are secured to a rock shaft 394 having bearings in frames 11 and 13. Each arm 393 is connected to its slide 392 by a pin 395, moving in a slot 396 on the arm thereof. By rocking shaft 394 the arms 393 are rocked and the slides 392 are moved, and their ends engage one or another of the pins 397 extending from the respective double-entry wheels 380 moving the same to a zero position. Secured to shaft 394 is a rock arm 3940 which is pivotally connected at 398 to the front end of a lever 399 pivoted loosely on rod 109, and carrying at the rear end an anti-friction roller 400 which may be actuated by the cam 106 when the latter is moved into cooperative relation therewith.

The cam 106, as hereinbefore mentioned, is mounted on a sleeve 105 splined to and movable along the shaft 31 to a limited degree. Movement of this sleeve is effected by depression of what may be termed a double-entry key indicated at 401.

The double-entry key 401 is formed with a shank 402 (Figs. 20 and 60) normally held up by a spring 403, and pivotally connected at 404 to a rock arm 405 fixed to a shaft 406 carrying a stirrup 407 fixed thereon and connected to the sleeve 105 carrying the cam 106 (Figs. 31 and 23).

By such an arrangement, if the key 401 is depressed the rock arm 405 is rocked thereby turning the shaft 406 and tilting the stirrup 407 so as to move the sleeve 105 along the shaft 31 sufficiently to move the cam 106 from under the roller 107, and into operative relation with roller 400, so that when the shaft 31 is rotated, the cam 106 instead of zeroizing the actuators and keyboard will actuate the slides 392, zeroizing the double-entry accumulator wheels 380.

When the double-entry wheels are zeroized or cleared, it is necessary to transfer the total accumulated on them prior to being cleared to an account sheet. The old balance on the selected account sheet is first transferred to registers 95 by turning the shaft 33 through 165°, as hereinbefore explained, and then, instead of actuating the discs 79 by entering a transaction thereon, the double-entry key 401 is depressed, displacing the cam 106, as just explained, and then the shaft 31 is actuated bringing first the adding and double-entry wheels into operative relation with the respective interposed actuators 79, and then the double-entry wheels are cleared by the action of the cam 106. The rotation of the double-entry wheels according to the amounts thereon is transferred through the actuators 79 to the respective adding wheels 95, and then the double-entry wheels and main register wheels are swung out of engagement with the actuators by the cams 102 and the actuators are returned to normal. The shaft 31 then becomes stationary and the shaft 33 is then caused to rotate 195°, thereby completing one revolution, and transferring the new balance then held by the adding wheels 95, to the rack elements of the selected account sheet.

The means which are provided for returning the actuators to normal during this double-entry transfer includes a second cam 408 which does the work of the displaced cam 106 by actuating the lever 110 after the double-entry and adding wheels have been swung away from the actuators and before the shaft 31 becomes stationary. The cam 408 is secured to sleeve 105 and movement of the latter by the double-entry key 401, shifts cam 408 to operative relation with roller 107.

In order that the key 401 need not be held down during the operation of the machine for a double-entry transfer, a catch 409 under the influence of a spring 410 is employed to engage over the bell crank 405 when it is depressed and to hold it down. This catch is automatically released by the cam disc 102 opposite thereto, on which is provided a pin 411 which is disposed to strike one arm of a member 412 pivoted at 413 on a stud from the frame 13 of the machine, the other arm of which member 412 is connected by a link 414 to the head of the catch 409, so that when the pin 411 strikes the member 412 the catch 409 is retracted, permitting spring 403 to return the key 401 and connected parts to normal. The link 414 is also connected to a rod 415 having a key 416 which can be pushed in by hand to release the lever 405 if necessary.

Attention need be directed to but one point further in connection with this double-entry mechanism. When a credit is entered on the keyboard, it enters the double-entry accumulators as a debit, and conversely when a debit is entered on the keyboard, it enters the double-entry accumulators as a credit. Consequently the credits turn the double-entry accumulators in one direction and debits in the opposite direction. But the clearing slides 392 always turn the double-entry wheels clockwise (as viewed from the right) in clearing these wheels, regardless of the sign of the amount contained therein. In consequence, if the double-entry wheels show a positive amount (that is, are positioned according to predominant debit entries at the keyboard), then upon clearing the double-entry wheels, the actuators (and consequently the main registers) are moved the exact number of steps corresponding to the units on the respective double-entry wheels; but if the double-entry wheels show a negative amount (that is are positioned according to predominant credit entries on the keyboard), then upon clearing the double-entry wheels, the actuators (and consequently the main registers) are moved, a number of steps which is the complement of the digits displayed by the double-entry wheels prior to clearing.

*The type bars (Figs. 1, 20 to 24, 61 to 73)*

The machine is provided with a printing apparatus, which records the date, the code-letter, the number of the account, the amounts to be credited in upright characters, and the amounts to be debited in oblique characters. The apparatus records also the old balances which are transferred from the storing elements to the accumulators 95 and the amounts that are transferred from the accumulators to the storing elements.

The printing unit has also a mechanism to prevent the printing of the zeros to the left of the highest significant digit required to be printed.

The construction is such that when the operator wishes to print the balance existing in a storing element, the machine will print the balance on passing from the storing elements to the accumulator wheels, but on returning this amount from the accumulator wheels to the storing elements, the printing mechanism is locked so as to prevent any duplication of the amount printed; such locking resulting from action of said means for automatically eliminating printing of zeroes to the left of the highest significant digit.

The amounts that pass from the storing elements to the accumulators—or vice versa—are also printed in upright characters if they represent positive balances, and in oblique or italic characters if they represent negative balances.

The printing apparatus includes five groups of type bars 417, 418, 419, 420, and 421, which are slidably mounted on rods 422 fastened to the frames 14 and 15 of the machine, and suitably spaced apart in any well-known manner. The type bars carry racks 423 by which they may be actuated, and printing type 424 and 425, the former bearing upright characters, and the latter oblique or italic characters. The type 424 and 425 are capable of slight vertical movements relative to their type bars for effecting a printing impression.

Of the type bars, the racks 423 of the first group 417, engage with gear wheels 426 which, by means of nested shafts 427 supported in frame 15, are connected to knurled knobs 428 that protrude from the frame 15 of the machine, and by means of which the type bars 417 may be manually set for date printing. The types on the bars 417 are all upright types 424.

The racks 423 of the second group 418 and the third group 419, engage with gear wheels 429 fastened to nested shafts 430, the central one of which is extended and has its bearings in movable elements to be later described. Shafts 430 carry at their right end the gear wheels 431, which engage with the gear wheels 432 mounted on nested shafts, of which the central one is the shaft 81 of the account selector. The balance of these shafts are in the form of tubes or sleeves, two of which, indicated by reference 433, run to the setting means for the tens and hundreds of the account selecting means as before stated. The other two tubes indicated at 434 extend to the right-hand side of the keyboard, and are secured to finger pieces 435, for setting up code letters or signs, whereby the character of the operation may be indicated. Tubes 434 also carry gears 436 for operating code indicators 437 to indicate the matter set up. By this means, manipulation of the account selector levers 248, 249 and 250 and of the code selector levers 435, immediately sets up the corresponding types 424 on the bars 419 and 418 in printing position.

The racks 423 of the fourth group of bars 420 are constantly in engagement with gear wheels 438 which are mounted upon nested shafts 439 which, in turn, carry at their right extremities, gear wheels 440 that engage with wheels 441 that are mounted upon the nested shafts 442 supported in movable means to be described later. Each shaft 442 bears a respective gear wheel 443 which is normally in engagement with a respective actuator disc 79. This mechanism normally causes every movement of the members 78 to be transmitted to the printing bars 420. The elements which constitute these trains are so calculated that when the bars 420 are moved, the type 424 or 425 corresponding to the movement of the respective members 78 come to printing position.

The racks 423 of the fifth group of bars 421 are alternatively in and out of engagement with gear wheels 444 fastened to respective nested shafts 445, which carry at their right ends gear wheels 446 that engage with gear wheels 447 mounted upon the nested shafts 148 and 149. These nested shafts carry the wheels 147 as hereinbefore set forth.

The center shaft of the nest of shafts 445, is supported by the two pitmen 448 near opposite ends, the ends of this shaft being extended into slots in stationary brackets (not shown). The lower ends of said pitmen are pivotally connected to respective rock arms 449 which are secured to a shaft 450 having a broad bearing in frame 14. Also secured on shaft 450 is an arm 451, the lower end of which is pivotally connected to one end of a link 452, the other end of which is pivotally connected to the lower end of a lever 453. Actually, the link is constructed as extensible so that parts will not be broken if the gear teeth should not properly mesh at same time, but for present purposes may be considered as a simple link. A spring 454 tends constantly to rock lever 453 for effecting disengaging movement of shafts 445.

*Main printing shafts (Figs. 62 to 71, and 73)*

The main shaft 33 of the adding mechanism, extends through frame 13 and carries a sprocket wheel 455 which is normally clutched thereto and which for present purposes may be considered as fixed to the shaft. A chain 456 connects this sprocket 455 to a sprocket 457 freely mounted on a stud extending from frame 6. The hub of sprocket 457 is removably connected to a shaft 458 having bearings in the frames 14 and 15. This removable connection is merely to facilitate assembly, and when the machine is assembled it may be considered that sprocket 457 is rigid with shaft 458.

The shaft 31 extends through frame 13 and has a gear secured to it. This gear 459 meshes with a gear 460 which is freely mounted on a short shaft 461 mounted in bearings in frame 13 and a bracket extended therefrom. The gear 460 is normally clutched to the hub of a sprocket wheel 462 (Figs. 10 and 32) pinned on shaft 461, and for present purposes gear 460 may be considered as fixed to said shaft 461. This sprocket 462 is connected by a chain 463 to a sprocket 464 mounted on a stud from frame 6, and removably connected (for purposes of assembly only), to a shaft 465 having its bearings in the frames 14 and 15.

The two shafts 458 and 465 are the two main shafts of the printing mechanism, and from them the principal parts of the printing mechanism are operated. Normally, the shaft 458 is operated in unison with shaft 33, and shaft 465 in unison with shaft 31.

To the shaft 465, is fixed a cam 466, and to the shaft 458, is fixed a cam 467. At the side of the cam 467 there is another cam 468 which has a hollow in the middle as at 469. The lever 453 is pivoted at 470, and ends in an upper arm formed in the shape of a tooth 471 which rides on the face of cam 468, and can drop into the hollow 469, if permitted to do so. At the tooth 471, a roller 472 is secured to the side of the lever 453 in the plane of cam 467.

It will now be seen that when shaft 458 makes its first portion of a rotation as determined by shaft 33, 471 will be moved by cam 468, and will rock lever 453, thereby moving elements 452, 451, 450, 449, 448, and 445 to engage gears 446 and 444 with gears 447 and the racks 423 of bars 421, respectively. At the end of this partial revolution, the tooth 471 will drop into hollow 469 if permitted to do so. A key 473 has a long slot through which passes the pivot 470, and is urged toward its low position by the tension of a spring 474. The key 473 has a roller 475 by which key 473 may be pushed upwardly by the action of a lever 476 pivoted on a stud 477 from frame 6, and operable by cam 466 on shaft 465.

The bars 421 are provided with respective upright portions 478 which may be actuated by scissor-shaped levers 479 which carry rollers 480 for engaging the opposite sides of elements 478. The levers 479 are pivoted on a rod 481, and close by action of a slide member 482 which is actuated by a cam 483 fixed to the shaft 465, and by a cam 484 fixed to the shaft 458. These cams 483 and 484 co-act with lugs 485 and 486 to move slide 482 rearwardly to engage pins 487 and 488 on the levers 479. This mechanism ensures that every time a revolution is produced in either of the two main shafts 458 and 465, the levers 479 will normalize or bring to zero position the printing bars 421.

In order that the printing bars 421 shall come into the zero position, it is necessary for the wheels 444 to disengage from the racks 423 of the bars 421. For this purpose there is the mechanism already described, which works in the following way:—

We have seen that the main shaft 33 and, therefore, the shaft 458, described part of a revolution in transmitting an old balance from the storing elements to the main accumulator or register wheels. At the beginning of the first part of the revolution, the cam 468 pushes the tooth 471 of the lever 453. The lever 453 rotates slightly in an anti-clockwise direction (as viewed from the right,) on pivot 470, and draws the link 452 rearwardly; this rocks members 451, 450 and 449, raising pitmans 448 and shafts 445 so as to effect engaging of the gears and racks.

At the completion of this part revolution, the hollow 469 of the cam 468 remains opposite the tooth 471 of the lever 453, but in spite of the tension of the spring 454, the tooth of the lever 453 does not fall into the hollow 469 on account of the interposition of the key 473 between roller 472 and the cam 467, the key being supported by roller 475, lever 476 and cam 466.

When the operator does not put a new amount into the machine, and therefore the old balance is restored, the shaft 458 will complete the revolution without key 473 being removed from interposed position, and the cam 468 releases the tooth 471 of the lever 453 near the end of the cycle, whereupon the spring 454 and the weight of the parts carried by pitmans 448 cause the disengagement of the associated gears and printing bar racks.

If, on the other hand, the operator, before the second portion of the revolution of the shaft 458, puts some amount into the machine and consequently alters the balance or amount that was in the storing elements, the working of the machine is as follows:—

We have seen that after setting up the amount in the actuators 79, the main shaft 31 must effect a revolution, which causes a revolution of the shaft 465. At this time, the hollow 469 is opposite the tooth 471 of the lever 453, the cam 468 has pushed the said tooth and therefore the gears 444 are in engagement with the racks 423 of the printing bars 421. Now at the beginning of the revolution of the shaft 465, the cam 466 releases the lever 476. This permits the spring 474 to draw downwards the key 473. The key 473 consequently no longer supports the roller 472, and allows the tooth of the lever 453 to enter the hollow 469 of the cam 468. Then by virtue of the tension of the spring 454 and the weight of the associated parts, the wheels 444 disengage from the racks of printing bars 421.

Now the cam 483 which is fixed on the shaft 465 pushes the slide 482, thereby operating levers 479 to move against elements 478, so that the printing bars 421 are placed in the zero position. This zeroizing of the bars 421 is brought about abruptly before the termination of the revolution of the shaft 465, and at the end of this revolution, the cam 466 rocks the lever 476. This latter pushes upwards the key 473 by means of the roller 475, and the key 473 is interposed between roller 472 and cam 467, thereby moving lever 453 and associated parts to disengaged position.

If the operator continues to put new amounts into the machine, these engagements and disengagements will be repeated as also the zeroizing action of the scissor levers 479, but without effecting any displacement, seeing that the printing bars 421 were, since the first item-entering operation, at zero.

If now the operator wishes to transfer the new balance thus obtained to the storing elements, the shaft 458, which as we have seen is in communication with the main shaft 33, will be caused to complete its revolution, and as the wheels 444 have come into engagement with the racks of printing bars 421 by means of the key 473, and at the same time the printing bars 421 were in their zero position, it follows that these printing bars are moved by the wheels 444 sufficiently for the printing types corresponding to the new balance to come to printing position.

After the new balance has been transmitted to the storing elements, and this new balance printed, the cam 468 releases the tooth of the lever 453, and so the key 473 is now opposite the low part of cam 467, the spring 454 and the weight of the wheels 444 and associated parts, effect disengagement of gears 444 and the associated racks 423. Immediately afterwards, and before the revolution of the shaft 458 is completed, the cam 484 pushes the slide 482, and the scissors levers 479 zeroize the printing bars 421.

*The hammer mechanism (Figs. 67, 68, 70, 71, and 73)*

On a rod 489 mounted in the frames 14 and 15 are pivoted a plurality of printing hammers 490, one for each type bar of the several sets, and normally under the tension of respective springs 491. These hammers are actuated through cams 492, 493, 494, 495, and 496, which correspond in width to the printing zones of the several sets of type bars. Thus, cam 492 controls the hammers correlated with the date printing type bars 417; cam 493 controls the hammers of the code printing type bars 418; cam 494 controls the hammers of the account number printing bars 419; cam 495 controls the hammers of the item and double entry type bars 420; and cam 496 controls the hammers of the balance printing type bars 421.

Of these cams 492, 494, and 496 are secured to shaft 458, cams 492 and 494 being single acting cams which effect printing of the date and account number upon bringing each old balance from storage to the main registers, and cam 496 being a double acting cam causing printing of old balances as brought from storage and new balances as returned to storage.

In like manner cams 493 and 495 are secured on shaft 465, cam 493 being a single acting cam for causing printing of code matter with items entered through manipulation of the numeral keys, and cam 495 being a double-acting cam so as to print items posted, and amounts transferred from the double-entry wheels. All of these printing cams are so constructed and arranged as to cause the hammers to effect their printing blows when the proper type have been brought to printing position.

The hammers 490 which co-operate with cams 492, 494 and 496, are formed with upstanding lugs 497 adapted to be engaged by said cams so as to move the hammers counter-clockwise (as viewed from the right), thereby tensioning springs 491 still more so that as the cams pass out of engaging position, the hammers return with a smart blow.

Likewise, cams 493 and 495 are adapted to engage depending lugs 4970 on the co-operative hammers 490.

*Printing positive and negative amounts (Figs. 66, 67, 70, 71 and 72)*

Means are provided for causing the blow of the hammers associated with the balance printing type bars 421 and the item and double-entry printing type bars 420 to effect printing by types 425 and 424 to indicate positive and negative amounts.

To this end, in the case of the type bars 421, a lever 498 is secured to a rock shaft 499, having its bearings in frames 14 and 15. This lever is formed with a finger 500, which is normally in engagement with a cam surface 501 secured to or formed integrally with the bar 421 of highest denominational order. Also secured to shaft 499 is a rock arm 502, and at the lower end of arm 502 and of the lower arm of lever 498, is secured a cross bar 503 on which are pivoted two draw bars 504, the other ends of which are pivoted at 505 to rocking supports 506 pivotally mounted on a rod 507 secured in the frames 14 and 15. The supports 506 are secured to opposite ends of a tie rod 508 which pivotally supports a plurality of dogs 509, to two of which dogs springs 510 are secured. Between bars 504 is supported a guide rod 511 which passes through slots 512 in firing pins 513. These pins 513 are formed with slots 514, through which passes a guide-rod 515 supported by frames 15 and 14. There is a firing pin 513 for each hammer 490, and all are supported by the stationary rod 515, although only those co-operative with the type of bars 421 are supported by the rod 511.

It will now be noted that as long as the balances passing from and to storage are positive amounts, that is, lie in the positive zone of the highest denominational storing element, the finger 500 will remain on the high cam part 501 so that the firing pins 513 associated with the balance printing bars 421 will remain under upright or positive type 424, and any printing action of the co-operative hammers 490 will effect positive printing by causing the pins 513 associated therewith to drive type 424. But when the old balance is negative, then the element 500 will ride on the incline 516, permitting lever 498 to rock, bars 504 to move rearward and the rod 511 shifts the firing pins 513 associated with the bars 421 to position to strike the oblique, italic or negative type 425 so that the balance printed will show a negative amount. In like manner when the new balance which is being returned to storage is negative, element 500 rides on incline 517 with a like result.

Turning now to the type bars 420 which position the type for printing items entered and amounts transferred from the double entry accumulators, a pair of levers 518 and 520 is loosely pivoted on shaft 499 and these levers are connected by a sleeve 519. The lower arms of levers 518 and 520, are connected by a rod 521 which pivotally carries the front ends of a pair of draw bars 522, the rear ends of which are pivotally connected to supporting elements 523, pivotally supported on rod 507 and carrying a connecting member 524 pivotally supporting dogs 525, to two of which springs 526 are connected. The upper arms of levers 518 and 520 carry a roller 527 adapted to engage surfaces 528, 529 or 530 of which 528 and 529 are on the lower edges of all the bars 420, while 530 is on the lower edge of the bar 420 of highest order, only. Normally the roller 527 is in alignment with the rear ends of the inclines connecting elements 528 and 529. The members 522 carry a guide rod 531, which with rod 515 supports the firing pins 513 associated with the bars 420.

The roller 527 is normally held in retracted position by a lever 532, connected by a link 533 to a lever 534 freely pivoted on rod 470, and normally engaged by a cam 535 so as to hold roller 527 retracted.

When any item is set up on the keyboard, any of the bars 420, except that of highest order, may be moved, but the highest order bar is moved only in transferring from the double-entry accumulators, for as hereinbefore mentioned the highest order actuator 79 is not provided with a manual lever 78. When, therefore, a negative item is entered on the keyboard, one or more of the bars 420 (except that of highest order), is moved forwardly, and roller 527 can move when permitted to do so. Movement of roller 527 is restrained until cam 535 moves away from lever 534, at which time a spring 536 takes effect moving lever 532 and connected parts and permitting roller 527 to move up under action of springs 526, so as to bring the roller 527 into contact with all faces 529 and the associated firing pins 513 into relation with the negative or italic type 425 of the rear portions of bars 420.

When, however, a positive amount is set up on the keyboard, bars 420 are moved rearwardly, and one or more of the faces 528 is brought over roller 527, preventing movement of the roller and connected parts, so that the associated firing pins are not moved and effect printing from the positive or upright type 424 at the front of bars 420.

In considering the printing of amounts transferred from the double-entry wheels, it should first be noted that when the double entry dials shown a positive amount, this shows that the amount indicated has been obtained by making one or more debit entries at the keyboard, or a series of debit and credit entries in which the debit amount exceeds the credit amount, for the double-entry must always be of the opposite sign to the original entry or entries. Likewise a debit indication on the double-entry dials indicates one or more credit entries have been made at the keyboard or a series of entries in which the credit amount exceeds the debit. From this it follows that a debit indication may be considered as a credit summation and vice versa, and the indications may be quite properly recorded as of the opposite sign to the indication.

As hereinbefore described, when there is a credit indication on a double-entry accumulator, the clearing of the accumulator moves the associated actuator disc the exact number of digit spaces, but in a debit direction, and therefore the amount is printed as a negative amount in italic type under the item entry or entries of which it is the total. The time of printing is later than in item printing, being effected by the second rise of the associated printing cam. Printing by the first rise of this cam is prevented by the means hereinafter described for eliminating printing of zeros to the left of the highest significant digit. It may be noted that this same mechanism also prevents printing by the second rise during an item entering operation.

However, when a double entry accumulator indicates a debit, clearing of this accumulator turns the associated actuator 79 a number of digit spaces which is the nine-complement of the digit indicated by the accumulator, but the actuator is again turned in a debit direction. However, the highest bar 420 is moved nine spaces, bringing the face 530 over the roller 527, so that the latter is permitted to move only half the distance that it would if under the face 529 of all bars. This brings the firing pins of bars 420 under the positive type on the rear parts of the bars, which are arranged complementally to the adjacent italic type, so that the complemental movement of the type bars 420 is counteracted by the reverse complemental arrangement of the type, and the true amount is printed in positive or upright type under the items of which it is the sum.

*Printing dates, code, and account numbers (Figs. 66 and 68)*

It has already been described how the date, code matter and account numbers are set up on the type bars 417, 418, and 419. It has also been described that there is a hammer 490 for each of the printing bars of these sets of bars, and a respective operating cam for the hammers of each set. The firing pins 513 for these sets are, however, slidably mounted on the rod 515 by slots 514 and through their slots 512 there extends a stud 537 which is fixed in the frame 15. These bars 417, 418, and 419 carry only positive or upright type 424, so that it is unnecessary to provide any shifting means for the firing pins 513 thereof.

The dogs 525 associated with these sets of bars are also mounted on a stationary stud carried by frame 15.

*Eliminating zeros to the left of the highest significant digit (Figs. 67, 68, 70, 71, 74, 75, and 76)*

Pivoted on a rod 538 fixed in the frames 14 and 15 of the machine are levers 539, each of which carries a latch 540 pivoted at 541, and normally having its upper portion held in contact with a pin 542 on the associated lever 539, by a leaf-spring 543, to the end of which is attached a spring 544. The springs 544 tend constantly to turn the levers 539 in an anti-clockwise direction (as viewed from the right). There is one lever 539 for each hammer 490, and consequently for each type bar. The levers 539 are placed in groups corresponding to the groups of type bars 417, 418, 419, 420, and 421, and each lever 539 has a turned-back lip 545 which extends under the upper arm of the lever 539 of the next higher order. The lever 539 of the highest order does not require a turned-back lip 545. These levers 539 with their lips 545 are so constructed and arranged that if any of these is moved in a clockwise direction all those of lower order will be moved also, impelled by the lips 545. Each of the latches 540 is formed with a recess 546 in its lower end, which normally engages a tooth 547 of the respective hammer 490 and remains so engaged unless the respective lever 539 has been rotated slightly in a clockwise direction. In this latched position, the hammers are unable to deliver the blow to the firing pins because before the hammers meet the firing pins 513, the tooth or nose 547 of the hammer 490 will enter the recess 546 of the respective latch 540. Now if a lever 539 and its latch rotate slightly in a clockwise direction, (as viewed from the right) the hammer 490 will be free to communicate the blow to the respective firing pin 513.

All of the bars 419, 420, and 421 have their lower edges notched as at 548 at such points that when any of these bars is in a zero position the nose 549 of the respective dog 525 will enter one of these notches 548 impelled by its spring 526.

In this condition, lever 539 is permitted to move its latch to hammer engaging position. But when either by movement of a printing bar or the action of members 504 or 522 the nose 549 is disengaged from its notch 548, the dog 525 presses down on a lip 550 of its lever 539, rocking the same. Three positions of the lever 539 and latch 540 are shown in Figs. 74, 75, and 76. In the first, the hammer is latched; in the second, the type bar has moved out of zero position; in the third, the hammer is retracted for printing.

In order to facilitate easy manipulation of the keyboard, all of the latches 539 associated with the bars 420 are withdrawn at the time that the machine is at rest, so that manipulation of any lever 78 is effected only against the action of the spring 526 associated with that lever. To this end, the lever 539 associated with the bar 420 of highest order is pivotally connected to a link 5390, the lower end of which is connected by a pin and slot connection 5391 to an arm 5392 secured to lever 534 in any suitable manner as by a sleeve. When the machine is at rest, link 5390 is held down, bringing elements 550 out of the path of elements 525. When an item is being entered, movement of lever 534 permits link 5390 to rise, but should its highest lever 539 be rocked, the pin and slot 5391 gives the necessary lost motion, so that arm 5392 and connected parts are not operated.

From this mechanism it follows that the printing blows delivered will only be dealt by those hammers which correspond to a printing bar that has left its zero position, or whose dog 525 has been moved out of its notch, and any hammers of lower order. In other words, zeros will not be printed to the left of the significant digit of highest order in the items, balance or account number printed.

The dogs 509 and members 539 and 540 for the dates and code could be omitted as the bars 417 and 418 preferably have no notches 548. However, they are retained in the machine as constructed, as they could be used if desired by merely making notches in bars 417 and 418.

From the above, it will now be apparent why the following points mentioned hereinbefore are true. (1) No printing takes place when an old balance is returned to storage without alteration, as the printing bars 421 are merely moved back to "zero" position. (2) During item printing, no printing occurs as a result of the second tripping of the hammers as the bars 420 have been previously restored to "zero". (3) During a double entry transfer, no printing occurs, as a result of the first tripping of the hammers as the bars 420 have not as yet been moved from "zero" position.

In connection with the account number printing, it may be as well to note that if no account number is set none will be printed, but the "000" account will be read, and the old total printed, so that a dishonest clerk cannot manipulate his account without indicating such manipulation even though the account number is not printed.

*The platen (Figs. 62, 63, 68, and 69)*

The platen is indicated at 551 as a block suitably supported in a housing 552 and extending across all of the type bars. The housing 552 extends across the frames 14 and 15, and is hinged at its left end to a sliding member 553. The right-hand end of member 552 is provided with a thumb nut 554, by which it may be rigidly united to the upper end of a similar supporting member 75

555. The member 553 is guided in a cleat or other suitable means, and the member 555 is guided by a rock arm 557 pivotally supported on frame 14 and pivotally connected to member 555.

Members 553 and 555 have their lower ends connected to respective rock levers 558 and 559, pivoted respectively on pins fast on frames 14 and 15, and having their forked front ends straddled on pins 560 of respective rock arms 561 fast on a rock shaft 562 mounted in bearings in frames 14 and 15. (The lever 532 is pivoted freely on this shaft 562.) A spring (not shown) attached to member 553, a spring 564 attached to lever 559, and a spring 565 attached to an arm 566 fast on shaft 562 tend constantly to elevate the platen above the printing types. The platen is depressed by cam action as will now be explained.

Pivotally connected to arm 566 at 567 is a link 568, the rear end of which is pivotally connected at 569 to one arm 570 of a three-arm rock lever freely pivoted on rod 470, the other arms of which are indicated at 571 and 572. The arm 571 is adapted to be operated by a double acting cam, the high parts of which are indicated at 573 and 574, the cam being secured on shaft 465 and effecting movements of the platen to the type for item and double entry printing, respectively. Likewise, arm 572 is adapted to be operated by a double acting cam fast on shaft 458, the high parts being indicated at 575 and 576 and effecting movements of the platen for printing old balances and new balances respectively.

It will of course be understood that the type are driven to print at a time when the platen is held down.

*Automatic paper feed (Figs. 62, 67, 68, 69, 73, and 77)*

A roll of paper 577 is removably supported between the frames 14 and 15 preferably on spring pressed bearings which effect a slight braking action, thereby keeping the paper taut. The paper passes from roll 577 over a guide roll 578, then over a guide plate 579, under the platen 551 and the doubled ribbon 580 carried thereby, under a sheet guide 581, and is guided upwardly by a curved portion 582 of the plate 579, so as to pass between a feed roll 583 and a presser roll 584. The axle 585 of roll 583 is mounted in bearings in brackets rising from the frames 14 and 15, and the axle 586 of the presser roll 584 is slidably mounted in slots 587 in said brackets and normally held pressed against roller 583 by springs 588. The guide 581 is formed with rearwardly extending sides 589 which are pivotally mounted on the axle 585 and formed up with finger pieces 590. The sides 589 are slotted to embrace the axle 586, one of the edges of the slots being indicated at 591 and normally stands slightly in rear of member 586, so as to permit free pressure movement of roll 584. When one inserts the paper, the member 581 is rocked by finger pieces 590, and elements 591 contact axle 586 and move roll 584 out of contact with roll 583. The paper may now be freely inserted or withdrawn. Pivotally mounted at 592 in the aforesaid brackets is a paper knife 593, which may be manipulated by finger piece 594 to bring it against the roller 583, so that the paper may be torn off.

Secured on the axle 585 is a ratchet wheel 595, and adjacent to this are discs 596, one of which is formed with a stop shoulder 597, normally resting against a pin 598 secured in the bracket from frame 15. To these discs 596 is pivoted at 599 a member 600 which is formed with a pawl 601 in the plane of ratchet wheel 595, and has its end slotted to receive an actuating link 602 pivoted to member 600 at 603, the rear of the slot being indicated at 604. The lower end of member 602 is pivotally connected to one end of a rock lever 605, pivoted on shaft 489, and to which rock lever are adjustably secured oppositely disposed fingers 606 and 607 adapted to be operated by cams 608 and 609 respectively, on shafts 458 and 465 respectively.

Whenever shaft 458 or 465 makes a cycle of movement, the lever 605 is rocked, drawing down link 602 and rocking member 600 on its pivot 599 until pawl 601 engages ratchet 595. Further movement of link 602 now causes rotation of ratchet wheel 595 and roller 583. The discs 596 do not follow link 602 until 601 and 695 engage, because of a friction disc or spring ring (not shown) pressing against one of the discs 596. As the lever 605 returns to normal, link 602 moves up, rocking 600 until link 602 engages element 604, after which further movement of link 602 carries along discs 596. Should discs 596 move with 600 and 602 at the beginning of the return stroke, they will be stopped at proper time by elements 597 and 598 and the member 600 will then move about 599 to disengage pawl 601.

*Ribbon feed and reverse*

As any desirable type of well known ribbon feed and reverse may be used, this mechanism is not described in full, it being merely necessary to note that the ribbon passes across the platen over a roller and back across the platen so as to present two layers of ribbon between the type and platen. Parts of the ribbon mechanism are shown in Fig. 69.

*Feeding loose sheets (Figs. 62, 67, and 69)*

Pivoted at 610 on brackets 611 from the frames 14 and 15 is a loose sheet guide 612 which directs sheets between the two layers of ribbon. Springs 613 tend constantly to rotate the member 612 clockwise (as viewed from the right), so as to press a roller 614 against the loose sheet indicated at 615, whereby the loose sheet is pressed against a sheet fed by the roller 584 and is carried along thereby.

A few other points should be considered in connection with printing. There may be spring pressed detents (not shown) for centering the type bars in their several positions and spring pressed detents may be provided for the gears 444.

The printing mechanism may be disconnected from the rest of the machine by operating a handle 618, Fig. 69 at the left of the machine. This handle is fast on shaft 383 and by being thrown rearwardly turns said shaft with the following effects: (See Figs. 10, 62, 63, 65, 66, 68, and 69.)

(1) Fingers 619 fast on shaft 383 are in the planes of and normally contact with the edges of levers 620 which carry the nested shafts 430. When shaft 383 is rocked, fingers 619 are removed from in front of levers 620 permitting the latter to swing under impulse of springs 621 until stopped by a fixed stop 622.

(2) Cams 623 fixed on shaft 383 normally hold up pivoted arms 624 so as to bring gears 438 in mesh with the racks on bars 420. Rocking of shaft 383 moves cams 623 to permit disengagement by action of springs 625. Simultaneously cams 626 are moved away from arms 627 so as to permit shafts 442 to move down. Thus gears 440 and 441 are never disengaged although they are disconnected both from the actuators 79 and from printing bars 420.

(3) Secured to shaft 383 is a member 628 which works in a diagonal slot 629 in an arm 630 fixed on a shaft 631 having bearings in a frame bracket. Mounted on shaft 631 is a stirrup 632 which embraces and operates a clutch member 633 for declutching sprocket gear 455. Shaft 631 also carries an arm 634 which by means of a link 635 is connected to an arm 636 fast on a shaft 637, which shaft carries a stirrup 638 embracing and operating a clutch member 639 for rendering sprocket gear 462 effective and ineffective. When shaft 383 is rocked, member 628 rocks member 630, thereby effecting declutching of both members 633 and 639.

In this manner the entire printing unit is disconnected from the main portion of the machine.

*Automatic balance listing (Figs. 1, 11, 12, 14, 46 to 52, 79 to 85)*

Means are provided for automatically effecting printing of the balances stored in all or a portion of the account, sheets, seriatim. This requires that the account selector elements shall be automatically set for selecting one after another of the accounts comprising the series required. This means will now be described.

Around a shaft 640 which is mounted in bearings in a subframe secured between frames 10 and 11 of the machine, rotate the gear wheels 641, 642, and 643. These wheels rotate freely upon the shaft, although they are secured against displacement longitudinally thereof. Each of these wheels may be composed of two spur gears riveted or otherwise permanently secured together, and one of them has ten teeth, while the other lacks the tenth tooth as indicated at 644. Also the wheels 641 and 642 are provided with a single tooth pinion 645 and 646 which engage respectively with spur gears 647 and 648, which rotate freely upon a shaft 649, also mounted in the subframe, and engage further with the wheels of immediately higher order, i. e. 647 with 642 and 648 with 643.

The wheel 641 has attached to it a ratchet wheel 6490 which is engaged by an actuating pawl 650. The pawl is formed as an integral part of a member 6500 pivoted to a member 651 freely pivoted upon shaft 640. Member 6500 is provided with a stop finger 6501, and a stop pin 6502 on member 651 is adapted to co-act with element 6501 to limit pivotal movement of member 6500 in one direction. The member 6500 is pivoted to a link 652 having its lower end pivoted to a lever 653. The lever 653 rotates upon a pivot shaft 654 carried by the frames 10 and 11 of the machine, and is formed with a nose 655 maintained in contact with a cam 656 by means of a spring 657. The cam 656 is keyed on shaft 29. A pin 6503 limits downward movement of elements 6500 and at each revolution of the shaft 29 the cam 656 pushes the lever 653 and this moves the link 652 which causes the pawl 650 to actuate the ratchet wheel 6490 to the extent of one tooth in an anti-clockwise direction (as viewed from the right). The ratchet wheel 6490 is kept in its new position by a detent pawl 658.

When the wheel 641 has effected a complete revolution it causes, by means of the single tooth 645, an advance of one tooth of wheel 647, and the wheel 647 concomitantly advances the wheel 642 with which it is always in engagement. Likewise when the wheel 642 has made a complete revolution, it causes by means of the single tooth 646, the wheel 648 to advance one tooth, and this in turn advances the wheel 643, with which it is constantly in engagement. The wheels 647 and 648 are kept in their new positions by locking pawls 659.

The spur gears 641, 642 and 643 normally stand with their mutilated portions 644 opposite the gears 242, 243 and 244, and when operated, actuate the same. When the spur gear 641 or 642 has made a complete revolution, the mutilated portion again comes opposite the gear 242 or 243 and the gear 242 or 243 is returned to zero by the weight of the connected parts.

The wheels 243 and 244, it will be remembered, are provided with stop pins 262 and 263 which abut against the ratchet sectors 260 and 261.

For getting out the trial balance sheet, the machine is provided with a clutch, as follows:—

A lever 6580 has a finger piece 6590 that may be operated from outside the machine. At its inner end the lever 6580 is provided with pivots 660 which support it from the frame of the machine.

The lever 6580 is in the form of a fork, and has pins 661 which enter a groove cut in the hub of the cam disc 656.

The cam disc 656 is keyed to the shaft 29 in such a way that if the finger piece 6590 is pushed to the right, the cam disc 656 also moves to the right into co-operative relation with lever 653.

However, this movement aside of the cam disc 656, can only occur when the cam disc 656 is in a determined position. At the side of the cam disc 656 is a plate 662 which prevents this sideways movement above described at any moment during the revolution when an open part 663 of the plate 662 is not opposite the nose 664 of an arm 665 pinned to a shaft 666 mounted in bearings in the frames 10 and 11. When the opening 663 comes opposite nose 664, the cam disc 656 may be moved into register with lever 653, and at the same time a cam 667 into register with arm 665, cam 667 being secured to cam 656 and plate 662.

The arm 665 is fast on the rock shaft 666, and a second arm 668 is also fast on shaft 666 and connected by a pin and slot connection at 669, to a draw link 670. The member 670 is joined by the spring 671 to the end of the arm 668, the connection 669 being merely for safety purposes, and spring 671 always keeps the connection in the condition shown unless some part becomes inadvertently locked. A spring 672 acting on an arm 673 holds the system of elements up.

The member 670 has a slot 674 in its upper part, through which passes a pin 675 of the lever 63, which as hereinbefore stated operates the clutch 68.

To make the list of balances contained in the machine, the finger piece 6590 is moved to the right, having first set the motor in motion. Then as the cam disc 667 begins its rotary movement and depresses the nose 664 of the lever 665, the latter pulls the member 670 and this in turn moves the lever 63, which throws the clutch into operation, and sets in motion the shaft 33. Then, in the way already described, the amounts that were in the storing element No. 000 are carried to the main registers and with a continuous movement the same amount leaves the main registers and is carried to the storing element again, having first, however, been printed on the roll of paper, as has been explained. It should be noted that cam 667 holds nose 664 depressed long enough so that the clutch is not thrown out at the end of the first portion of movement of shaft 33.

As the shaft 29 continues its rotation, and before concluding a revolution the cam 656 pushes the lever 653. This lifts the link 652, and this first moves the pawl 650 into engagement with ratchet wheel 6490 and thereafter advances 6490 one tooth, where it is held by locking pawl 658. When the wheel 6490 advances one tooth, the wheels 242 and 252 advance one tooth, and also by reason of the pawls 265 and 255 the ratchets 260 and 261 and gears 253 and 254 also advance one tooth, and as gears 252, 253 and 254 are in connection with the bars 232, 233 and 234 of the account selector, the three aligned slots thereof come into the second account position. Then the shaft 29 begins its second revolution, and pushes the arm 665 again, whereupon the shaft 33 is set in motion again, and the amounts in the storing sheet No. 1 are transmitted to the main registers, returning immediately after being printed on the paper roll, to the storing element.

The clutch leaves the shaft 33 at rest, and at this movement the cam 656 again advances the wheel 6490 one more tooth.

One revolution of the shaft 29 corresponds to more than one revolution of the shaft 33 but, as after each revolution of the shaft 33 this declutches automatically, it follows that in reality each revolution of the shaft 29 corresponds to one revolution of the shaft 33 plus a period of declutched condition of shaft 33. During this declutched period the operation of the account selector for selecting the next account is carried out by means of the cam 656.

When the wheel 6490 has completed one revolution, the wheel 242 is free, because it is again opposite the point of the wheel 641 where one tooth is missing, and then, impelled by the weight of the connected parts it falls to its original position of zero.

However, the single tooth 645 of the wheel 641 has advanced the wheel 647 and consequently the wheel 642 one tooth, and thereby wheel 243 has also been advanced one tooth, and by virtue of the pin 262 stopping ratchet disc 260, the bars 233 and 234, as also the racks thereof, do not return to their original position of zero, but also are held advanced by one tooth.

At this moment, the aligned slots of bars 232, 233 and 234 are opposite the No. 10 account.

As the shaft 33 continues its rotary movement the amounts contained in the storing sheet No. 10 are carried to the main registers and printed, and immediately brought back to the storing element. So, successively, each revolution of the shaft 29 effects a revolution of the shaft 33, and an advance in the wheel 6490. It follows, that all the amounts contained in the storing sheets from the Number 11 to the Number 99 will be carried to the main registers, printed and returned to the storing elements, seriatim.

On passing from No. 99, the wheels 641 and 642 each bring the mutilated portion 644 opposite respective gears 642 and 643, and they both return to zero, although tooth 646 having carried one to gear 648 and thereby to gears 643 and 244, the pin 263 prevents complete return of the ratchet 261. In this manner, the device is set for account No. 100.

So successively, are printed the amounts contained in the storing sheets, from No. 101 to No. 999.

It will be noted, that the trip members 285, 286, and 287 must be rocked to trip the respective pawls during automatic balancing, so that the respective ratchet discs 259, 260 and 261 may be free to return as required. For this purpose, a cam 6740 secured on shaft 33 strikes the rear arm 6750 of lever 2820 and rock the front end of the same against the pin 284 thereby rocking the trips 285, 286, and 287 to effective position, and also operating member 277 to effect releasing of the account indicator wheels. Secured to shaft 276 or formed integral with member 285 is a forwardly extending arm 676, the front end of which is adapted to be latched down by a latch member 677 pivoted on shaft 272 and urged toward latching position by a spring 678. This latch cannot act until the second operation of cam 6740 when a list of balances beginning with "000" account is run. The reason for this is that there is a pin 679 on the hundreds bar 238, which pin when bar 238 is in lowest position, stands on a rock lever 680, the lower arm of which is connected by a link 681 to the lower part of a lever 682 which carries a pin 683 controlling movement of lever 677. Upon the bar 238 being raised toward the end of the first operation, the latch 677 is freed, but is too late to become effective until the ensuing operation, after which it remains effective until the bar 238 returns to its lowest or "0" position.

It may be desirable at this point, to point out that in addition to unlocking certain parts, as hereinbefore mentioned, operation of lever 271 also releases pawls 659 and 658. It has been described, that operation of lever 271 rocks lever 278. Lever 278 is fast on a rock shaft 684 which carries arms 685 provided with pins 686 overlying the tails of pawls 659. Shaft 684 also carries an arm 687 which extends over a pin 688 on an extension of pawl 658. Hence rocking of member 278 rocks shaft 684, arm 685 and arm 687, thereby withdrawing pawls 659 and 658.

It is desirable, that when either of the ratchet discs 259 or 260 returns to its zero position during the run of the automatic balance, that the blow delivered to pins 262 or 263 should be cushioned. To this end, the pawls 659 are mounted on plates 689 depending from and pivoted on shaft 649. These plates are held in engagement with a stop rod 690 by springs 691. When one of the disks 259 or 260 returns to zero, the disc 260 or 261 strikes its associated pin 262 or 263 and tries to return the associated gear 243 or 244. This puts a strain against gears 642 or 643 and 647 or 648 and consequently against the correlated pawl 659 which gives a little but is at once returned by its spring 691. The gears 647 and 648 are maintained against accidental displacement at any time by spring detents 692.

*Partial balance listing (Figs. 1, 11, 47, 48, 49, 52, and 80)*

It is possible to start the automatic balance listing with any desired account and proceed from that account, seriatim. For this purpose, the machine is provided with a lever 693 which is provided with a finger piece 694 and is pivoted on shaft 272. The lever 693 is secured to a segment 695 formed with a cam slot 696 into which extends an anti-friction roll 697 carried by a lever 698, which is pivoted to frame 11 at 699 and which is connected by a pin 700 to a link member 701 pivotally connected to one arm of a bell crank 702, the other arm of which is forked to straddle a pin 703 on shaft 640. When the member 694 is pushed downwards, cam 696 rocks lever 698 causing 640 to move slightly to the right thereby moving gears 641, 642 and 643 sufficiently to engage their unmutilated ten-tooth portions with gears 242, 243, and 244.

Now the operator moves the levers 248, 249, and 250 upwards until the account with which it is desired to begin the list of balances has been selected. The wheels 641, 642 and 643 have revolved also until they respectively arrive at the positions corresponding to the number of the account with which it is desired to begin the list of balances.

A lever 704 has a fork embracing lever 6580 and is pivoted at 705 to a cross piece of the frame of the machine, and at its other extremity has a pin and slot connection 706 to the lower end of a link 707 which is pivotally connected at 708 to a second segment member 709, pivoted loosely on shaft 272 and formed with a cam slot 710 of reverse form to the slot 696. Roller 697 extends through both slots 710 and 696, and when lever 6580 is moved to the right roller 697 is forced back to normal, moving the shaft 640 back to its original position, although the gears 641, 642 and 643 remain in their changed relation, so as to start the run with the desired account.

*Balance listing interlocks (Figs. 1, 11, 47, 48, 49, and 52)*

The following interlocks are provided: (1) Lever 693 cannot be operated unless the selector bars are at "0" or lowest position. (2) Lever 271 cannot be operated until lever 6580 returns to its left-hand position. (3) Lever 6580 cannot be moved to the right until after lever 693 has been moved down.

Secured to lever 693 and member 695 are pins 711 and 712, which stand opposite the jaw of a latch 713, when lever 693 is in its normal and moved positions, respectively.

The latch 713 is freely pivoted on rod 714 and has its lower arm connected by a link 715 to the lower arm of lever 682. Consequently, whenever the bar 238 is not in lowest position, (i. e. whenever the selector is not cleared), the latch 713 will engage either pin 711 or pin 712 according to whether normal work or automatic balance listing is set for.

We have already noted the locking latch 330 for lever 271. This latch 330 has an arm 716 which is connected by a link 717 to the lever 704, so that when the lever 6580 is moved to the right, latch 330 is rendered effective and remains so until lever 6580 is again moved to the left.

Connected to plate 695 is a link 718, the other end of which is pivotally connected to a latch 719 adapted to hook over lever 6580 and hold the latter in left-hand position. When plate 695 moves down, the latch 719 is rocked to release lever 6580, and when 695 is again moved up, the latch is rocked to effective position. A manipulative latch 720 normally holds lever 693 against accidental or inadvertent depression.

*Accumulating debits and credits during automatic trial balance (Figs. 62, 64, 67, 69, and 86 to 90)*

Supported by the frames 14 and 15 above the rear ends of the type bars, is a cradle comprising side frames 721 and 722, which are pivotally supported on a shaft 723 having bearings in frames 14 and 15. The cradle is supported by one or more strong springs 724 and is limited as to movement from this source by a stop 725.

As before mentioned, the balance printing bars 421 are formed with upright extensions 478 which carry racks 727 adapted to engage with respective rack segments 728. The several segments 728 are pivoted on a rod 729 carried by a pair of sub-frames 730 also pivoted on shaft 723, and supported by springs 731 with faces 732 in contact with cams 733 mounted on a rock shaft 734. A detent bar 735 is normally drawn into the teeth of segments 728 by springs 736, said bar 735 being carried by a pair of arms 737 slidably mounted on shaft 723 and each provided with a pin 738, engaging a cam 739 on rock shaft 734. A crank handle 740 is secured to shaft 734 and by turning handle 740 to the position shown in Fig. 69, shaft 734 is rocked so as to cause cams 739 to remove the detent plate 735 from segments 728, and to cause cams 733 to rock frames 730 to bring segments 728 into mesh with racks 727.

Secured to rock shaft 734 is an arm 741 to which is pivoted a link 742 connected at its lower end to an arm 743 fixed to a shaft 744 which carries a clutch bail 745, the pins of which enter a groove 746 in the hub of a gear 747, which constantly meshes with a gear 748 fast on shaft 458, of the printing unit. The hub of gear 747 is free on a sleeve 749 rotatable on a stud 750, and is formed with clutch teeth 751 adapted to engage clutch notches in a cam 752 keyed to sleeve 749. Sleeve 749 has secured to it or formed integrally with it a sprocket wheel 753. From the racks 727, cam 752 and sprocket 753, all of the effective movements in this unit are obtained.

Pivotally secured to each segment 728 is a link 754, the upper end of which is pivotally connected to a respective actuator disc 755, so that as the bars 421 move forward to print an old balance, a proportionate movement is transmitted through segments 728 and links 754 to discs 755, and as the balance is restored the actuator discs 755 are moved back to normal. On this return movement, discs 755 actuate one or the other of two accumulators according to whether the balance is a debit or a credit. The means for determining which kind of entry to make will now be considered.

Mounted in the frames 721 and 722 is a plurality of credit accumulator wheels 756 and a plurality of debit accumulator wheels 757, each of which is geared to a respective credit or debit indicator dial 758 or 759. Upon rocking the cradle counterclockwise (as viewed from the right), the credit accumulator wheels 756 may be brought into engagement with actuators 755, while upon rocking the cradle in the opposite direction the debit accumulators are engaged.

Freely pivoted to frame 722 at 760 is an arm 761 carrying a roller 762 which rides on a bar 763 carried by the upright 478 of the printing bar 421 of highest order. A spring 764 tends constantly to lift the rear end of arm 761. Arm 761 also carries a pin 765 upon which rests an arm 766 fast on shaft 723. Also fast on shaft 723 is a depending arm 767 carrying an adjustable contactor 768 which rides on cam 752.

As long as the balances are positive or credit, the roller 762 remains on the top of bar 763 and the rocking of arm 767 by the high part of cam 752 causes arm 766 to depress roller 765, moving arm 761 about pin 762 thereby rocking the cradle counter-clockwise and throwing the credit accumulator wheel 756 into mesh with actuators 755. But when the balance is a negative or debit balance, the bar 763 passes beyond roller 762 and then the cradle is rocked clockwise by springs 724 so as to engage the debit accumulator wheels 757 with the actuator 755. This engagement movement is limited by stop 725 so as not to "freeze" the debit gears in the actuator gears. Downward movement of arm 766 on pin 761 merely rocks arm 761 idly downward.

It should be noted that pin 762 is slidably mounted in arm 761, and is normally held extended into the plane of member 763 by a leaf spring 769. The rear end of member 763 is formed with a bevelled edge at 770. When a negative or debit balance is read, and pin 762 is moved down in back of member 763 by action of arm 766, then the pin 762 comes opposite the edge 770, and during return of the type bars 421 to normal the bevelled portion 770 encounters pin 762 and pushes the same into its arm 761 against the tension of spring 769. Near the close of the operation, the contactor or follower 768 moves from a very high to a very low portion of cam 752, so that spring 764 is permitted to raise arm 761 enough to permit pin 762 to escape from bar 763 and be thrust into normal condition by spring 769. As soon as this has occurred, member 768 rides onto an intermediate portion of cam 752 which rocks arms 767, 766, and 761 sufficiently to bring the cradle into its intermediate position with both sets of accumulator wheels disengaged.

Turning now to the carrying or tens-transfer mechanism of the credit accumulators, each accumulator wheel 756 has twenty teeth, though more or less could be used, this number being convenient for illustrative purposes; and secured to each accumulator 756 is a two-tooth or tappet disc 771 the tappets of which are indicated at 772. With the accumulator in "0" position, one or the other of these tappets stands just in rear of a lug 773 of a rocking member 774 of which there is one between each adjacent pair of accumulator wheels 756. A detent spring 775 for each member 774 holds the same in either of two positions to which it may be moved. A respective spring-pressed pawl 776 is pivoted to each rocker 774 and engages the teeth of the adjacent wheel 756 of higher order.

When one of the wheels 756 completes ten teeth of movement, one of its associated tappets 772 will have engaged the respective cam 773 and raised that rocker 774 to its upper position, bring the associated pawl 776 into the next higher tooth of the higher order accumulator 756, and bringing a lug or cam 777 of the moved rocker into the path of a respective pin 778. The several pins 778 are arranged helically on a shaft 779, so as to engage the set lugs 77, seriatim, beginning with the lowest. When shaft 779 is given a revolution, the respective pin 778 will engage any raised lug 777 returning the respective rocker to normal and causing its pawl 776 to effect a one-step movement of the accumulator of higher order. The means for rotating shaft 779 will be considered presently.

Turning now to the carrying mechanism for the debit accumulators 757, it will be recalled that debits involve entering complements. Thus a debit balance of "3" will effect a positive movement of "6" in the type bar 421. This is compensated for in printing by shifting the firing pins to complemental type as already described. But in the case of the debit registers 757, it is necessary to effect a carry as soon as any register is turned and to add the "fugitive one" to the lowest order accumulator. The carrying mechanism is therefore the same as in the credit accumulators except that with the debit accumulators at zero, their tappets 772 are positioned to cause a carry as soon as any accumulator is turned one space, and the following mechanism is provided for adding a 'fugitive one" to the lowest order accumulator at each operation.

An additional member 774 is provided, which has its pawl 776 engaged with the gear 757 of lowest denominational order, and an additional pin 778 is provided on the debit carry shaft 780. This pawl 776 of lowest order is operable by a finger 781 secured to the main frame 14 and bent so as to encounter and shift the lowest debit pawl 776 whenever the cradle is swung to debit adding position. After the pin 781 has operated its associated member 776, the ensuing operation of shaft 780 which occurs after disengagement returns this member 776 with a resulting addition of one unit to the lowest denominational debit accumulator.

The following means is provided for giving the clearing shafts 779 and 780 one rotation at the end of each cycle of operation. The sprocket 753 is connected by a chain 782 to a sprocket wheel 783 freely mounted on shaft 723 and connected by a torsion spring 784 to a sprocket wheel 785 also free on shaft 723. Mounted on the frame 14 is a stud 786 which carries a pawl 787 adapted to co-act with a lug 788 on the hub of sprocket 783 for preventing retrograde movement of the latter when the debit and credit accumulators are out of action. There is also mounted on stud 786 a pawl 789 which engages a nose 790 on the hub of sprocket wheel 785 for preventing movement of the latter until the desired time. A trip pawl 791 is also mounted on a stud 786, which is adapted to be operated by a lug 792 on the hub of member 783 near the end of the revolution of the latter, for bringing trip member 791 against an adjustment screw 793 to move pawl 789 so as to release sprocket 785 for a revolution under impulse of spring 784. The sprocket 785 is connected by a chain 794 to sprocket wheels 795 and 796 secured to the debit and credit carry shafts 780 and 779, respectively.

It will now be seen, that during an operation of sprocket 753, chain 782 will rotate sprocket 783, storing power in spring 784. As the end of the cycle approaches, lug 792 strikes pawl 791, tripping pawl 789 so that wheel 785 may make one revolution, at the end of which lug 792 having passed beyond pawl 791, lug 790 is again intercepted by pawl 789. The revolution of wheel 785 drives chain 794 to effect a revolution of shafts 779 and 780, completing any carry which may have been set. In order that this movement may be an even one and not too rapid, a gear 797 is secured to shaft 780, and meshes with a pinion 798 carried by a bracket from frame 14. The shaft of pinion 798 carries a governor body 799, here shown as air resistance blades.

The sets of accumulators 756 and 757 are cleared or set to zero by hand. Each of the accumulator wheels 756 and 757 carries a respective spring pressed pawl 800, the free end of which is pressed into contact with the respective accumulator supporting shafts 801 or 802. The shafts are provided with grooves 803 which, when the shafts are rotated, engage pawls 800 and turn the associated accumulators. Each of the shafts 801 and 802 is extended to the left and carries a slotted connection member 804, in which is pivoted one end of a member 805, the other end of which is bifurcated to engage a pin 806 in a slotted stub shaft 807. The shafts 807 carry respective clearing knobs 808 and 809. This flexible connection permits the necessary cradle movements for additions. A respective spring 810 keeps each of the members 804 turned with a pin 811 in engagement with a stop pin 812. To clear one of the sets of accumulators, one turns the respective knob 808 or 809 in the direction of the arrows Fig. 69, until the respective pin 811 encounters a stop pin 813 at which time the shaft 801 or 802 will have been turned nine steps and will have moved to zero positions any of the respective accumulator wheels not previously at zero. The respective spring 810 returns the associated parts to normal upon releasing the clearing knob.

There is, however, one feature of difference between the clearing of the credit accumulators and the clearing of the debit accumulators. It will be remembered that one set of tappets 772 of the debit accumulators stand just ready to operate on the lugs 773 of their carrying members when in zero position; hence the clearing of the debit accumulators never brings a tappet 772 into contact with its lug 773. But in the case of the credit accumulators, one set of tappets stands just beyond lugs 773 when the credit accumulator wheels are at zero; and consequently if any of these accumulators are cleared from any significant position, one of its tappets would trip the respective carry members in passing to zero, if means were not provided to prevent this. On account of this, the carry members 774 for the credit accumulators are pivoted on a shaft 814 carried by a pair of rock levers 815 pivoted on studs or shoulder screws 816 from the frames 721 and 722. Fixedly secured to the shaft 801 are a pair of eccentric disks 817 engaging the lower arms of levers 815. Springs 818 keep the arms of levers 815 in engagement with the eccentric disks 817.

When the knob 808 and, consequently, shaft 801, are turned for the clearing of the credit accumulators, the turning of eccentrics 817 permits springs 818 to rock levers 815, so that all of the members 774 carried thereby are rocked until their lugs 773 are out of the paths of the respective tappets 772. When the clearing is completed and the shaft 801 returns to normal, the eccentrics 817 force the levers 815 and connected parts back to normal. Since the tappets 772 do not approach lugs 773 until near the end of the clearing movement of shaft 801, there is plenty of time for eccentrics 817 to become effective.

*Electrical interlock (Figs. 96 and 97)*

We have already noted the electrical interlock between the levers 63 and 63A of the clutch mechanism for shafts 31 and 33. This interlock is only part of a general interlock system in the machine, which system may be divided roughly under four headings as follows:—(1) An interlock whereby shaft 31 may not be actuated until shaft 33 has made its first portion of movement and whereby shaft 33 may not be actuated while shaft 31 is in motion. (2) An interlock whereby shaft 31 may not be actuated when the setting levers 78 are not set in proper position. (3) An interlock whereby shaft 33 may not be actuated when a compensating carry is set, thereby enforcing such carry before the return of the balance to the storage elements. (4) An interlock whereby when either the debit and credit accumulator mechanism or the automatic balance listing has been set, the machine cannot be operated until the other of these two mechanisms has also been set.

The diagrams show the machine as wired for direct current, although with the necessary obvious alterations, alternating current could be used. The supply lines are shown at 825 and 826 and are connected by leads to a plug 827 which is removably connected to fuses 828 connected to positive and negative terminals 829 and 830. Leads 831 pass to the motor 16 and are connected to terminals 829 and 830 by any suitable switching mechanism such as switch 832. The positive terminal 829 is connected by a lead 833 to the movable contact carrier 376 of the double acting switch. Member 376 is normally in contact with the contact member 377 which passes current to the movable contact carrier 836 of another double acting switch. Member 836 is normally in contact with a contact member 837 which passes current to a lead 838 connected to the movable contact carrier 839 of a third double acting switch. The member 839 normally contacts a contact member 840 connected by a lead 841 to a contact member 842 normally engaged by a movable contact carrier 843 of a fourth double acting switch. Member 843 is connected by a lead 844 to one side of magnet 74, the other side of magnet 74 being connected by a lead 834 to one side of switch 75. The other side of switch 75 is connected by a lead 845 to the return lead 846 connected to the negative terminal 830.

It will, from the above traced circuit, be understood that, as switch 75 is normally closed, magnet 74 will normally be operated so that shaft 33 will be free for operation, and a lamp 847 which is wired in parallel with magnet 74 will be lighted.

When shaft 33 has been moved to its intermediate position, it will be recalled that it causes closing of switch 75A. This in no manner effects the circuit above described, but merely closes a second circuit which will now be traced. At the point where lead 833 connects to member 376, a lead 847 is connected, and runs to the first of a series of switches the movable contact member of each of which is indicated by the reference character 848, and the stationary contact member of each is indicated by the reference character 849, these switches being connected in series and each being associated with the actuating disk 79 of a respective denominational order. The stationary member 849 of the switch associated with the lowest order, is connected by a lead 850 to one side of switch 75A, the other side being connected by a lead 851 to one side of the magnet 74A. The other side of this magnet is connected to lead 845 which is connected to the return 846. A lamp 852 is connected in parallel with magnet 74A, and when the above circuit is complete, magnet 74A is energized, shaft 31 is operable, and lamp 852 indicates this condition.

If any one of the actuating disks 79 has been improperly operated by being moved to an interdigital position, one of its teeth will have pressed against a respective roller 853 rocking a suitably insulated arm 854 to move the respective member 848 out of contact with its co-operative contact 849. When the disk is moved to a digital position the roller 853 is permitted to move between teeth of the disk under impulse of a spring 855 and the contact is made.

With the two circuits above traced, in closed condition the machine is operable either to restore the balance to storage or to add or subtract therefrom. If upon entering an item the sign of the balance in the main accumulators changes, it is necessary to effect a compensating carry, and to enforce this the circuit thru magnet 74 must be broken and a warning signal should be operated.

When a compensating carry is set in the main register, the switch member 376 is moved by means presently described from contact with member 377 to contact with a member 378 thus breaking the circuit thru magnet 74 so that shaft 33 is locked against operation. At the same time the current passes from 376 to 378 thru a lead 857 to one side of a warning signal lamp 858 the other side of which is connected by a lead 859 to the return line 846.

In like manner when a compensating carry is set in the double entry register, the member 836 is moved out of contact with member 837 thereby breaking the circuit thru magnet 74, and into contact with a member 860 which is connected to lead 857, thereby completing a circuit thru the warning signal lamp 858.

The means for operating members 376 and 836 are identical so the same reference characters apply to both. The rock arm 364 is extended beyond shaft 365 as clearly shown in Fig. 23, and formed as an arcuate body 373 having a central notch 862 in which is normally seated the rounded end 863 of the contact breaker 374, suitably insulated. When the arm 364 is rocked in either direction, the element 863 is forced out of its seat 862, thereby rocking member 374 to move the member 376 or 836 as the case may be, out of its normal contact with member 377 or 837 into contact with member 378 or 860. As soon as the carry has been effected, the member 376 or 836 (both being spring members), forces the element 863 back into its seat, 862 and returns to its normal contact.

Since it is desirable to enforce concomitant operation of the automatic balance listing mechanism and the debit and credit balance accumulators, the following means have been devised. The switch, which includes elements 839 and 840, is located at the debit-credit balance accumulators, and the switch which includes elements 842 and 843 is located at the automatic balance listing lever 6580. Since the circuit which includes magnet 74 also includes the elements 843 and 839, it is obvious that if either of these is moved out of contact with its respective element 842 or 840 the circuit will be broken thru magnet 74 and shaft 33 cannot be operated. However, if contact 843 is moved to engage contact 865 and contact 839 is moved to engage contact 866, then a circuit will be closed thru magnet 74 as follows:—From 829 over 833, 376, 377, 836, 837, 838, 839, 866, a lead 867, 865, 843, 844, 74, 834, 75, 845 and 846 to 830.

Mounted on the lever 6580 is a suitably insulated nose 868 which, when lever 6580 is moved to the right, strikes member 843 and moves it out of contact with member 842 and into contact with member 865. When nose 868 is moved to the left, member 843 springs back into contact with member 842.

Mounted on shaft 734 is a cam 869 suitably insulated and normally holding member 839 in contact with member 840. Upon rocking shaft 734 to render the debit-credit balance accumulators effective, cam 869 is withdrawn from member 839 permitting the latter to move into contact with member 866.

While I have described what I consider to be a highly desirable embodiment of my invention, it is obvious that many changes in form could be made without departing from the spirit of my invention, and I therefore do not limit myself to the exact form herein shown and described nor to anything less than the whole of my invention as hereinbefore set forth and as hereinafter claimed.

I claim:

1. In a machine of the character set forth, the combination of a register; a plurality of account-storing sets; means, including a clutch, whereby amounts may be transferred from an account-storing set to said register; means, including a clutch, whereby items may be entered on said register; and means controllable by the first said clutch for preventing operation of the second said clutch until an amount-transferring operation of the first said means has been effected.

2. In combination, registering mechanism, a shaft for operating said mechanism, means for effecting a rotation of said shaft in two increments of movement, a second shaft for operating said mechanism, driving means for said second shaft; means for preventing driving of said second shaft; and means operable by the first said shaft for disabling said preventing means when the first said shaft has completed its first increment of movement.

3. In a machine of the character set forth, the combination of a register; a plurality of account-storing sets; a rotatable member; means for rotating said member a portion of a revolution for effecting transfer of an amount from said sets to said register and another portion of a revolution for effecting transfer of an amount from said register to said sets; a second rotatable member operable to enter items on said register; and means controllable by the first said member for preventing operation of the second said member while the first said member is operating and while the first said member is in normal position.

4. In a machine of the character set forth, the combination of a register; a plurality of account-storing sets; a rotatable member; means for rotating said member a portion of a revolution for effecting transfer of an amount from said sets to said register and another portion of a revolution for effecting transfer of an amount from said register to said sets; a second rotatable member operable to enter items on said register; means controllable by the first said member for preventing operation of the second said member while the first said member is operating and while the first said member is in normal position, and means controllable by the said second member for preventing operation of the first said member during operation of said second member.

5. In a machine of the character set forth, the combination of a register, a plurality of account-storing sets, a rotatable member for effecting transfer of amounts between said register and sets, a rotatable member for effecting entering of items in said register, and electrical means operable by each of said rotatable members for blocking operation of the other of said rotatable members.

6. In a calculating machine, the combination with driving mechanism, of mechanism manually settable in one direction to set up positive items and in the opposite direction to set up negative items, a register, and means operable by said driving mechanism for moving said register into engagement with said settable mechanism, return said settable mechanism to normal, and disengage said register from said settable mechanism, whereby positive and negative items may be entered on said register at the will of the operator.

7. In a calculating machine, the combination with driving mechanism, of a plurality of disk actuators manually rotatable in one direction to set up positive items and in the opposite direction to set up negative items, a register for receiving items from said actuators, and means operable by said driving mechanism to return said actuators from any set position to normal.

8. In a calculating machine, the combination with driving mechanism and a register, of manually settable actuating disks movable in either of two directions for setting up positive and negative amounts, respectively, an actuator return device movable in one direction, a second actuator return device movable in the opposite direction, and means whereby said driving device may concomitantly operate both of said actuator return devices.

9. In a calculating machine, the combination with driving mechanism and a register, of actuators for said register, manipulative members movable in opposite directions for setting up positive and negative amounts on said actuators, a pair of oppositely movable members, and means whereby said driving mechanism may effect operation of said movable members for returning said manipulative members to normal and moving said actuators to effect entry of positive and negative items on said register according to the setting of said manipulative members.

10. In a calculating machine, the combination of a register including a plurality of denominational register elements, respective actuators for said register elements, manipulative setting means for setting up items to be entered in said register, driving means, and means automatically operable by said driving means for moving said actuators in one direction when a positive item has been set up and for moving said actuators in the opposite direction when a negative item has been set up.

11. In a calculating machine, the combination of a register including a plurality of denomination register elements, respective actuators for said register elements manipulative setting means for setting up items to be entered in said register, driving means, and means automatically operable by said driving means for moving said registering elements simultaneously into mesh with said actuators and for moving said registering elements simultaneously out of mesh with said actuators and for thereafter moving said registering elements seriatim to normal position.

12. An account storing device comprising a support sheet, a plurality of racks slidably supported thereon, a device cooperative with all of said racks for retaining the same in set positions, means acting on said racks to force the same into engagement with said device, and means secured to said device for moving the latter to ineffective position.

13. In a calculating machine, the combination of a plurality of horizontally disposed account sheets, a plurality of denominational racks slidably supported by each of said sheets, a register, a keyboard whereon values may be set up, means for transferring values from said keyboard to said register, and means for transferring values from said register to said racks.

14. In a calculating machine, the combination of a plurality of horizontally disposed account sheets, a plurality of denominational racks slidably supported by each of said sheets, a register, a keyboard whereon values may be set up, means for moving said register into cooperative relation with members connected to said keyboard for receiving values set up on said keyboard, and means for moving said register into cooperative relation with said racks for transferring values from said register to said racks.

15. In a calculating machine, the combination of an account storing set, a register, and means operatively associated with said account storing set and said register and operable for driving the register whereby an amount stored in said set may be transferred to said register and said account set be driven through said register to cleared condition.

16. In a calculating machine, the combination of an account storing set, a register, means operatively associated with said account storing set and said register and operable for driving the register whereby an amount stored in said set may be transferred to said register, and means controllable by each order of said set for rendering each corresponding order of the first said means ineffective as said set is moved to zero.

17. In a calculating machine, the combination of a set of account storing racks of successive denominational orders, a plurality of register wheels of like denominational orders, means for connecting said wheels to the respective denominational racks, and means for driving said wheels to clear said racks and coincidentally transfer values from said racks to the respective wheels.

18. In a calculating machine, the combination of a set of account storing racks of successive denominational orders, a plurality of register wheels of like denominational orders, means for connecting said wheels to the respective denominational racks, means for driving said wheels to transfer values from said racks to the respective wheels, and individual means controllable by each of said racks for removing its wheel from the operation of said driving means as the rack reaches zero position.

19. In a calculating machine, the combination of a plurality of sets of account storing racks, the racks of each set being of successive denominational orders and the racks of like denominational orders being in alignment; a plurality of register wheels of denominational orders corresponding to said racks; means common to each of said wheels and the racks of like denomination for connecting said wheel and racks; means for driving said wheels to extract amounts from said racks and means individual to each denomination and each common to all racks of a denomination for stopping the corresponding register wheel when a rack reaches zero position.

20. In a calculating machine, the combination of a plurality of account storing elements of successive denominational orders, a register including registering elements of successive denominational orders, individual means for operatively connecting each of said storing elements with a respective one of said registering elements for transferring values from one to the other, individually operable locking elements for said means, locking means common to all of said individual means, and means for effecting operation of said individual means in accordance with values transferred and for effecting operation of said common locking means at the close of a transfer operation.

21. In a calculating machine, the combination of an account storing element, a registering element, driving means therebetween, a detent for stopping said driving means when a value has been transferred from said storing element, and a second detent element operable to center said driving means after the first said detent has become effective.

22. In a calculating machine, the combination of an account storing rack, a register wheel, a printing member, connections from said rack to said wheel including a gear engageable with said wheel and a gear connected to said printing member, means cooperative with the first said gear for centering the teeth thereof to insure proper engagement with said wheel, and means cooperative with the second said gear for insuring proper positioning of said printing member.

23. In a calculating machine, the combination of an account storing rack, a register wheel, a printing member, connections from said rack to said wheel including a gear engageable with said wheel and a gear connected to said printing member, means cooperative with the first said gear for centering the teeth thereof to insure proper engagement with said wheel, means cooperative with the second said gear for insuring proper positioning of said printing member, and means for simultaneously actuating the first and second said means.

24. The combination of elements to be selected, a plurality of manipulative denominational members for selecting desired ones of said elements, and means whereby manipulation of one of said members will cause a similar movement of the member of next higher denominational value.

25. The combination of elements to be selected, a plurality of manipulative denominational members for selecting desired ones of said elements, and means interposed between said members whereby manipulation of a lower order member may enforce movement of a higher order member and whereby manipulation of a higher order member may be effected independently of a lower order member.

26. The combination of elements to be selected, a plurality of manipulative denominational members for selecting desired ones of said elements, and a one-way connection between each of said members and its next adjacent member whereby each member of lower order may drive the member of next higher order.

27. The combination with elements to be selected, of a plurality of manipulative members, selecting members movable from normal to each of a plurality of selecting positions by respective ones of said manipulative members, means for detaining said selecting members in any position to which they may be moved, and means for releasing said selecting members from the detaining means seriatim.

28. The combination with elements to be selected, of a plurality of manipulative members, selecting members movable from normal to each of a plurality of selecting positions by respective ones of said manipulative members, means for detaining said selecting members in any position to which they may be moved, and manipulative means for releasing said selecting members from the detaining means seriatim.

29. The combination with elements to be selected, of a plurality of manipulative members, selecting members movable from normal to each of a plurality of selecting positions by respective ones of said manipulative members, means for detaining said selecting members in any position to which they may be moved, and automatic means for releasing said selecting members from the detaining means seriatim.

30. The combination with elements to be selected, of a plurality of manipulative members, selecting members movable from normal to each of a plurality of selecting positions by respective ones of said manipulative members, means for detaining said selecting members in any position to which they may be moved, automatic means for releasing said selecting members from the detaining means seriatim, manipulative means for effecting releasing of said selecting members, and automatic means for locking said manipulative means when said automatic means is operative.

31. The combination of a plurality of selecting latches, a plurality of vernier bars for selecting one of said latches for operation, and means for rendering the selected latch effective.

32. The combination of a plurality of selecting latches, a plurality of vernier bars for selecting one of said latches for operation, means for rendering the selected latch effective, and means for operating said latch.

33. The combination of a plurality of selecting latches, a plurality of vernier bars for selecting one of said latches for operation, and normally in position to select one of said latches, means for causing said vernier bars to select any other desired one of said latches, and means normally operable to render the normally selected latch effective and common to all of said latches for rendering any selected one effective.

34. In a calculating machine, the combination of a register, a plurality of account sets normally disconnected from said register, means common to all of said sets for transferring values between said register and account sets, a plurality of manipulative denominational members for selecting desired ones of said sets, and means whereby manipulation of one of said members will cause a similar movement of the member of next higher denominational value.

35. In a calculating machine, the combination of a register, a plurality of account sets normally disconnected from said register, means common to all of said sets for transferring values between said register and account sets, a plurality of manipulative denominational members for selecting desired ones of said elements, and means interposed between said members whereby manipulation of a higher order member may be effected without effecting operation of a lower order member and whereby manipulation of a lower order member may enforce movement of a higher order member.

36. In a calculating machine, the combination of a register, a plurality of account sets normally disconnected from said register, means common to all of said sets for transferring values between said register and account sets, a selecting element for each account set, a plurality of denominational members for selecting desired ones of the selecting elements, and a one-way connection between each of said members and its next higher adjacent member.

37. In a calculating machine, the combination of a register, a plurality of account sets normally disconnected from said register, means common to all of said sets for transferring values between said register and account sets, a plurality of selecting elements, one for each account set and operable to connect the account set with the register, a plurality of manipulative members, selecting members movable from normal to each of a plurality of selecting positions by respective ones of said manipulative members for selecting desired ones of said selecting elements, means for detaining said selecting members in any position to which they may be moved, and means for releasing said selecting members from the detaining means seriatim.

38. In a calculating machine, the combination of a register, a plurality of account sets normally disconnected from said register, means common to all of said sets for transferring values between said register and account sets, a plurality of manipulative members, selecting members movable from normal to each of a plurality of selecting positions by respective ones of said manipulative members for selecting desired ones of said selecting elements, means for detaining said selecting members in any position to which they may be moved, and manipulative means for releasing said selecting members from the detaining means seriatim.

39. In a calculating machine, the combination of a register, a plurality of account sets normally disconnected from said register, means common to all of said sets for transferring values between said register and account sets, a plurality of selecting elements, one for each account set and operable to connect the account set with the register, a plurality of manipulative members, selecting members movable from normal to each of a plurality of selecting positions by respective ones of said manipulative members for selecting desired ones of said selecting elements, means for detaining said selecting members in any position to which they may be moved, automatic means for releasing said selecting members from the detaining means seriatim, manipulative means for effecting releasing of said selecting members, and automatic means for locking said manipulative means when said automatic means is operative.

40. In a calculating machine, the combination of a register, a plurality of account sets normally disconnected from said register, means common to all of said sets for transferring values between said register and account sets, a plurality of selectable elements one for each account set and operable to connect the account set with the register, a plurality of vernier bars for selecting a desired one of said selectable elements, a plurality of gears one for each of said vernier bars, a ratchet member associated with each of said gears and a manipulative member for operating each of said ratchet members for effecting movement of the respective vernier bars.

41. In a calculating machine, the combination of a register, a plurality of account sets normally disconnected from said register, means common to all of said sets for transferring values between said register and account sets, a plurality of selectable elements one for each account set and operable to connect the account set with the register, a plurality of vernier bars for selecting a desired one of said selectable elements, a plurality of gears one for each of said vernier bars, a ratchet member associated with each of said gears, a manipulative member for operating each of said ratchet members for effecting movement of the respective vernier bars, and means whereby one of said ratchet members may operate a ratchet member of the next higher order.

42. In a calculating machine, the combination of a register, a plurality of account sets normally disconnected from said register, means common to all of said sets for transferring values between said register and account sets, a plurality of selectable elements one for each account set and operable to connect the account set with the register, a plurality of vernier bars for selecting a desired one of said selectable elements, a plurality of gears one for each of said vernier bars, a ratchet member associated with each of said gears, a manipulative member for operating each of said ratchet members for effecting movement of the respective vernier bars, means whereby one of said ratchet members may operate a ratchet member of the next higher order, and an auxiliary vernier bar carried by one of the first said vernier bars and operable by another of the first said vernier bars.

43. In a calculating machine, the combination of a register, a plurality of account sets normally disconnected from said register, means common to all of said sets for transferring values between said register and account sets, a plurality of selectable elements one for each account set and each operable to connect its account set to the register, a plurality of vernier bars normally positioned to select one of said selectable elements and operable to select any other desired one of said elements, means for moving said vernier bars to effect such selection, and means for operating the selected element.

44. In a calculating machine, the combination of a register, a plurality of account sets normally disconnected from said register, means common to all of said sets for transferring values between said register and account sets, a plurality of latches, one for each of said sets and operable to effect connecting of its set to the register, a plurality of vernier bars for selecting one of said latches for operation, and means for rendering the selected latch effective.

45. In a calculating machine, the combination of a register, a plurality of account sets normally disconnected from said register, means common to all of said sets for transferring values between said register and account sets, a plurality of latches, one for each of said sets and operable to effect connecting of its set to the register, a plurality of vernier bars for selecting one of said latches for operation, means for rendering the selected latch effecting, and means for operating the selected latch when rendered effective.

46. In a machine of the class described, the combination of an account storing set adapted to receive items arbitrarily designated as representing positive and negative values, a register, means for transferring said items between said register and storing set, and means associated with said register for sensing the items transferred from said set, and for indicating the numerical values and the algebraic signs thereof.

47. In a machine of the class described, the combination of an account storing set, a register, means for transferring values between said register and storing set, and a cam associated with said register and effective for sensing the positive or negative character of values thus transferred.

48. In a machine of the class described, the combination of an account storing set, a register, means for transferring values between said register and storing set, and indicators for indicating values thus transferred, a cam operable by one of said indicators, and mechanism cooperating therewith for indicating the algebraic sign of a value transferred to said register.

49. In a machine of the class described, the combination of an account storing set, a register, means for transferring values between said register and storing set, indicators for indicating values thus transferred, a movable indicator plate, and means operable by one of said indicators for moving said plate in accordance with the sign of the indication.

50. In a machine of the class described, the combination of an account storing set, a register, means for transferring values between said register and storing set, indicators for indicating values thus transferred, a movable indicator plate, and means for moving said plate in accordance with the sign of the indication.

51. In a machine of the class described, the combination of an account set operable to store positive and negative values, register wheels, mechanism for transferring values from said account set to said register wheels by turning the latter in one direction regardless of the sign of the value transferred, and means associated with one of said wheels for determining the sign of the value transferred.

52. In a machine of the class described, the combination of an account set operable to store positive and negative values, register wheels, mechanism for transferring values from said account set to said register wheels by turning the latter in one direction regardless of the sign of the value transferred, means associated with said wheels for determining the sign of the value transferred, and means operable to add and subtract values from said register wheels and to concomitantly operate the first said means whereby when the value on said wheels is changed in sign such change in sign is automatically determined.

53. In a machine of the class described, the combination of a main register capable of accumulating positive and negative balances, a double-entry register capable of accumulating positive and negative balances, item entering mechanism for concomitantly entering items on said main register with one sign and one said double-entry register with the reverse sign, means for transferring from the double-entry register to the main register by operating the double-entry register in one direction regardless of its sign, a plurality of account sets, and means for transferring balances from said main register to any desired one of said account sets.

54. In a machine of the class described, the combination of a main register, a double-entry register, means for concomitantly entering an item in said main register and the same item with its sign changed in the double-entry register, compensating carrying mechanism for each of said registers, and means for enforcing an extra carry-cycle when the sign changes in either of said registers.

55. In a calculating machine the combination of a plurality of account sets capable of storing positive and negative balances, a register, means for transferring balances from said sets to said register, a type bar carrying two characters of types and operable by said transferring means, means cooperative with said type bars for determining the sign of the balance, and means for taking an impression from one character of type if the sign is positive and from the other character of type if the sign is negative.

56. In a calculating machine, the combination of a plurality of account sets capable of storing positive and negative balances, a register, means for transferring balances from said sets to said register, type bars operable by said means for setting up the balances as transferred, two different styles of type carried by said type bars, striking means for said type, means cooperative with one of said type bars for determining the sign of the balance set up, and means cooperative with the sign determining means for shifting said striking means to print from the style of type associated with the sign determined.

57. In a calculating machine, the combination of a plurality of account sets capable of storing positive and negative balances, a register, means for transferring balances from said sets to said register, type bars operable by said means for setting up the balances as transferred, hammers, firing pins interposed between said hammers and type bars, means controlled by one of said type bars for shifting said firing pins, and means for causing said hammers to make a printing blow.

58. In a calculating machine, the combination of a plurality of account sets capable of storing positive and negative balances, a register, means for transferring balances from said sets to said register, type bars operable by said means for setting up the balances as transferred, hammers, firing pins interposed between said hammers and type bars, means controlled by one of said type bars for shifting said firing pins, a printing shaft, and means operable by said shaft to cause said hammers to make a printing blow.

59. In a calculating machine, the combination of a plurality of account sets capable of storing positive and negative balances, a register, means for transferring balances from said sets to said register, type bars operable by said means for setting up the balances as transferred, hammers, firing pins interposed between said hammers and type bars, means controlled by one of said type bars for shifting said firing pins, a printing shaft, and means operable by said shaft to cause said hammers to make two printing blows at each complete cycle of the said shaft.

60. In a calculating machine, the combination of a plurality of account sets capable of storing positive and negative balances, a register, means for transferring balances from said sets to said register, type bars operable by said means for setting up the balances as transferred, hammers, firing pins interposed between said hammers and type bars, means controlled by one of said type bars for shifting said firing pins, a printing shaft, means operable by said shaft to cause said hammers to make two printing blows in a single complete cycle of said shaft and means for preventing the second blow.

61. In a calculating machine, the combination of a plurality of account sets capable of storing positive and negative balances, a register, means for transferring balances from said sets to said register, type bars operable by said means for setting up the balances as transferred, hammers, firing pins interposed between said hammers and type bars, means controlled by one of said type bars for shifting said firing pins, a printing shaft, means operable by said shaft to cause said hammers to make two printing blows in a single complete cycle of said shaft, means for preventing the second blow, and means for disabling the preventing means.

62. In a calculating machine, the combination of a plurality of account sets capable of storing positive and negative balances, a register, means for transferring balances from said sets to said register, type bars operable by said means for setting up the balances as transferred, hammers, firing pins interposed between said hammers and type bars, means controlled by one of said type bars for shifting said firing pins, a printing shaft, means operable by said shaft to cause said hammers to make two printing blows in a single complete cycle of said shaft, means for preventing the second blow, means for automatically disabling the preventing means, and means for automatically reenabling the preventing means.

63. In a machine of the character set forth, the combination of account storage mechanism, a register, means for transferring an account from said mechanism to said register and from said register to said mechanism, type bars for setting up accounts thus transferred, printing mechanism for printing the accounts set up and including a shaft and devices for effecting printing twice in a complete cycle, means normally preventing the second printing by said devices of said printing mechanism, item entering means associated with said register, and means operable by said item entering means for disabling the preventing means.

64. In a machine of the character set forth, the combination of account storage mechanism, a register, means for transferring an account from said mechanism to said register and from said register to said mechanism, type bars for setting up accounts thus transferred, printing mechanism for printing the accounts set up and including a shaft and devices for effecting printing twice in a complete cycle, means normally preventing the second printing by said devices of said printing mechanism, item entering and printing mechanism associated with said register, and means operable by said item entering and printing means for disabling the preventing means.

65. The combination of a plurality of type bars, positive and negative type thereon, means for operating said type bars to set up matter to be printed, and means operable by said type bars to determine printing from said positive or negative type.

66. The combination of a plurality of type bars, positive and negative type thereon, hammer mechanism to drive said type to print, means for operating said type bars to set up matter to be printed, and means operable by said type bars and associated with said hammer mechanism for determining whether said hammer mechanism shall drive type of a positive or negative character.

67. The combination of printing type, means for moving said type to printing position, means for effecting a printing impression, a shaft, means carried by said shaft for effecting two operations of the first said means at a single cycle of said shaft, and means normally effective to prevent the second operation of the first said means.

68. The combination of printing type, means for moving said type to printing position, means for effecting a printing impression, a shaft, means carried by said shaft for effecting two operations of the first said means at a single cycle of said shaft, means normally effective to prevent the second operation of the first said means, and means for automatically disabling the preventing means.

69. The combination of two sets of printing bars, a respective shaft associated with each of said sets of bars, means operable by each of said shafts for effecting two printing operations at each cycle of the shaft, and a platen operable by said means at each printing operation.

70. The combination with means for setting up new and old balances, means for setting up items, and means for setting up double-entries, of a platen, means operable by the above said means for moving said platen to print-receiving position upon printing an old balance, a new balance, an item, and a double-entry, and means for effecting printing of the matter set up.

71. In a machine of the class set forth, the combination of a register, a plurality of account sets, means for passing values from said account sets to said register and vice versa, item setting means, means for entering set items on said register, means for selecting the account set to coact with said register, printing mechanism having a connection to said means for passing values and a connection to said item setting means and a connection to said selecting means, and means for concomitantly breaking all of said connections so that said register and account sets may be operated without corresponding printing.

72. In a machine of the class described, the combination of a plurality of account sets, printing mechanism associated therewith, manipulative means for selecting any desired one of said account sets, means for causing said printing mechanism to print the balance on the selected account set, and automatic means for operating said manipulative means to select one after another of said account sets and to effect operation of the second said means after each selection.

73. In a machine of the class described, the combination of a plurality of account sets, printing mechanism, a plurality of vernier bars for calling any desired account set into coactive relation with said printing mechanism and means for automatically operating said vernier bars to call one after another of said account sets into coactive relation with said printing mechanism.

74. In a machine of the class described, the combination of a plurality of account sets, printing mechanism, a plurality of vernier bars for calling any desired account into coactive relation with said printing mechanism, manipulative means for setting said vernier bars, and automatic means controlling said manipulative means for setting said vernier bars.

75. In a machine of the class described, the combination of a plurality of account sets, printing mechanism, a plurality of vernier bars for calling any desired account set into coactive relation to said printing mechanism, a plurality of gears for actuating said vernier bars, and means whereby one of said gears may turn the next adjacent gear upon completing a predetermined number of steps of movement.

76. In a machine of the class described, the combination of a plurality of account sets, printing mechanism, a plurality of vernier bars for calling any desired account set into coactive relation to said printing mechanism, a plurality of gears for actuating said vernier bars, means whereby one of said gears may turn the next adjacent gear upon completing a predetermined number of steps of movement, and automatic means for actuating one of said gears.

77. The combination of a plurality of devices to be selected, a plurality of vernier bars for selecting any desired device, and automatic means for operating said vernier bars to select said devices seriatim.

78. The combination of a plurality of devices to be selected, a plurality of vernier bars for selecting any desired one of said devices, manual means for operating said vernier bars, automatically operable means for operating said vernier bars, and manual means for determining which of the first two means shall control.

79. The combination of a plurality of devices to be selected, a plurality of vernier bars for selecting any desired one of said devices, manual means for operating said vernier bars, and automatically operable means controlling said manual means for operating said vernier bars to select said devices seriatim.

80. The combination of a plurality of devices to be selected, a plurality of vernier bars for selecting any desired one of said devices, automatically operable means for operating said vernier bars to select said devices seriatim, and manipulative means cooperative with said automatically operable means to start the automatic selection with any desired one of said devices.

81. In a machine of the class described, the combination of a plurality of account sets, debit and credit accumulators associated therewith, and means for effecting selective control of said accumulators by one after another of said account sets.

82. In a machine of the class described, the combination of a plurality of account sets adapted to store debit and credit balances, debit and credit accumulators, means for calling any of said account sets into control of said accumulators, and means for determining the character of balance from said sets and rendering the respective accumulator effective to receive the same.

83. In a machine of the class described, the combination of a plurality of account sets adapted to store debit and credit balances, debit and credit accumulators, means for calling said account sets seriatim into control of said accumulators, and means for determining the character of each balance passed from the sets and rendering the respective accumulator effective to receive the same.

84. In a machine of the class described, the combination of a plurality of account sets adapted to store debit and credit balances, debit and credit accumulators, common actuating means for said accumulators, means for passing a balance from any one of said account sets to said actuating means, and means for determining the character of the balance passed and automatically connecting the respective accumulator with said actuating means.

85. In a machine of the class described, the combination of a plurality of account sets adapted to store debit and credit balances, debit and credit accumulators, common actuating means for said accumulators, means for automatically passing balances from said account sets seriatim to said actuating means, and means for determining the character of each balance as passed and automatically connecting the respective accumulator with said actuating means.

86. In a machine of the class described, the combination of a plurality of account sets adapted to store debit and credit balances, debit and credit accumulators, common actuating means for said accumulators, means for passing a balance from any one of said account sets to said actuating means, and then back to the respective account sets and means for determining the character of the balance passed and automatically connecting the respective accumulator with said actuating means.

87. In a machine of the class described, the combination of a plurality of account sets adapted to store debit and credit balances, debit and credit accumulators, common actuating means for said accumulators, means for automatically passing balances from said account sets seriatim to said actuating means, and then back to the respective account sets, and means for determining the character of each balance as passed and automatically connecting the respective accumulator with said actuating means.

88. In a machine of the class described, the combination of a plurality of account sets, printing mechanism, debit and credit accumulators associated with said account sets and printing mechanism, and means for selectively effecting control of said printing mechanism and accumulators by one after another of said account sets.

89. In a machine of the class described, the combination of a plurality of account sets adapted to store debit and credit balances, debit and credit accumulators, debit and credit printing elements, means for passing balances from said account sets to said printing elements and accumulators, and means for determining the character of balance from said sets and rendering the respective accumulator and printing elements effective.

90. In a machine of the class described, the combination of a plurality of account sets adapted to store debit and credit balances, debit and credit accumulators, debit and credit printing elements, means for automatically passing balances from said account sets seriatim to said printing elements and accumulators, and means for distinguishing the character of each balance as passed and rendering the respective accumulator and printing elements effective.

91. In a machine of the class described, the combination of a plurality of account sets adapted to store debit and credit balances, debit and credit accumulators, actuating mechanism common to said accumulators, printing mechanism controllable by any one of said sets to print the balance stored therein and including type bars operable to concomitantly actuate said actuating mechanism.

92. In a machine of the class described, the combination of a plurality of account sets adapted to store debit and credit balances, debit and credit accumulators, means for passing balances from said account sets to said accumulators, separate carrying mechanism for each accumulator and each including a shaft, and means for rotating both of said shafts at each passing of a balance.

FRANCISCO CAMPOS.